(12) United States Patent
Cappannari et al.

(10) Patent No.: US 12,372,727 B2
(45) Date of Patent: Jul. 29, 2025

(54) FEMALE FIBER OPTIC CONNECTORS HAVING A ROCKER LATCH ARM AND METHODS OF MAKING THE SAME

(71) Applicant: CORNING RESEARCH & DEVELOPMENT CORPORATION, Corning, NY (US)

(72) Inventors: Stephen Paul Cappannari, Mooresville, NC (US); Michael De Jong, Colleyville, TX (US); Ashley Wesley Jones, Denton, TX (US); Przemyslaw Andrzej Kukian, Lodz (PL); Alvin John McDonald, Lenoir, NC (US); Gordon Mueller-Schlomka, Berlin (DE); Hieu Vinh Tran, Charlotte, NC (US); Shane Chad Woody, Mooresville, NC (US)

(73) Assignee: CORNING RESEARCH & DEVELOPMENT CORPORATION, Corniing, NY (US)

( * ) Notice: Subject to any disclaimer, the term of this patent is extended or adjusted under 35 U.S.C. 154(b) by 290 days.

(21) Appl. No.: 18/139,075

(22) Filed: Apr. 25, 2023

(65) Prior Publication Data

US 2023/0258876 A1 Aug. 17, 2023

Related U.S. Application Data

(63) Continuation of application No. PCT/US2021/056976, filed on Oct. 28, 2021.
(Continued)

(51) Int. Cl.
*G02B 6/38* (2006.01)

(52) U.S. Cl.
CPC ......... *G02B 6/3831* (2013.01); *G02B 6/3849* (2013.01); *G02B 6/38875* (2021.05); *G02B 6/3893* (2013.01)

(58) Field of Classification Search
None
See application file for complete search history.

(56) References Cited

U.S. PATENT DOCUMENTS 3,074,107 A 1/1963 Kiyoshi et al.
3,532,783 A 10/1970 Pusey et al.
(Continued)

FOREIGN PATENT DOCUMENTS

AU 2006232206 A1 10/2006
CN 1060911 A 5/1992
(Continued)

OTHER PUBLICATIONS

Brown, "What is Transmission Welding?" Laser Plasti Welding website, 6 pgs, Retrieved on Dec. 17, 2018 from: http://www.laserplasticwelding.com/what-is-transmission-welding.
(Continued)

*Primary Examiner* — Jerry Rahll
(74) *Attorney, Agent, or Firm* — Michael E. Carroll, Jr.

(57) ABSTRACT

Female fiber optic connectors having a connection port opening for receiving a fiber optic plug and cable assemblies comprising the female fiber optic connector along with methods of making the same. The female fiber optic connectors comprise an actuator such as a rocker latch arm used for releasing or securing an external fiber optic plug that may be received in the connection port. A main barrel of the female fiber optic connector comprises a connection port suitable for receiving an external fiber optic plug connector. The female fiber optic connectors disclosed advantageously allow for an quick and easy connection with an external fiber
(Continued)

optic plug connector for ruggedized or other desired applications. Methods for terminating the optical fibers of a cable to the female fiber optic connector for forming cable assemblies are also disclosed.

51 Claims, 44 Drawing Sheets

Related U.S. Application Data

(60) Provisional application No. 63/107,962, filed on Oct. 30, 2020.

(56) References Cited

U.S. PATENT DOCUMENTS

| | | |
|---|---|---|
| 3,792,284 A | 2/1974 | Kaelin |
| 3,912,362 A | 10/1975 | Hudson |
| 4,003,297 A | 1/1977 | Mott |
| 4,077,567 A | 3/1978 | Ginn et al. |
| 4,148,557 A | 4/1979 | Garvey |
| 4,167,303 A | 9/1979 | Bowen et al. |
| 4,168,109 A | 9/1979 | Dumire |
| 4,188,088 A | 2/1980 | Andersen et al. |
| 4,336,977 A | 6/1982 | Monaghan et al. |
| 4,354,731 A | 10/1982 | Mouissie |
| 4,373,777 A | 2/1983 | Borsuk et al. |
| 4,413,880 A | 11/1983 | Forrest et al. |
| 4,423,922 A | 1/1984 | Porter |
| 4,440,471 A | 4/1984 | Knowles |
| 4,461,537 A | 7/1984 | Raymer et al. |
| 4,515,434 A | 5/1985 | Margolin et al. |
| 4,547,937 A | 10/1985 | Collins |
| 4,560,232 A | 12/1985 | O'Hara |
| 4,615,581 A | 10/1986 | Morimoto |
| 4,634,214 A | 1/1987 | Cannon et al. |
| 4,634,858 A | 1/1987 | Gerdt et al. |
| 4,684,205 A | 8/1987 | Margolin et al. |
| 4,688,200 A | 8/1987 | Poorman et al. |
| 4,690,563 A | 9/1987 | Barton et al. |
| 4,699,458 A | 10/1987 | Ohtsuki et al. |
| 4,705,352 A | 11/1987 | Margolin et al. |
| 4,711,752 A | 12/1987 | Deacon et al. |
| 4,715,675 A | 12/1987 | Kevern et al. |
| 4,723,827 A | 2/1988 | Shaw et al. |
| 4,741,590 A | 5/1988 | Caron |
| 4,763,983 A | 8/1988 | Keith |
| 4,783,137 A | 11/1988 | Kosman et al. |
| 4,842,363 A | 6/1989 | Margolin et al. |
| 4,844,570 A | 7/1989 | Tanabe |
| 4,854,664 A | 8/1989 | McCartney |
| 4,856,867 A | 8/1989 | Gaylin |
| 4,877,303 A | 10/1989 | Caldwell et al. |
| 4,902,238 A | 2/1990 | Iacobucci |
| 4,913,514 A | 4/1990 | Then |
| 4,921,413 A | 5/1990 | Blew |
| 4,944,568 A | 7/1990 | Danbach et al. |
| 4,960,318 A | 10/1990 | Nilsson et al. |
| 4,961,623 A | 10/1990 | Midkiff et al. |
| 4,964,688 A | 10/1990 | Caldwell et al. |
| 4,979,792 A | 12/1990 | Weber et al. |
| 4,994,134 A | 2/1991 | Knecht et al. |
| 4,995,836 A | 2/1991 | Toramoto |
| 5,007,860 A | 4/1991 | Robinson et al. |
| 5,016,968 A | 5/1991 | Hammond et al. |
| 5,028,114 A | 7/1991 | Krausse et al. |
| 5,058,984 A | 10/1991 | Bulman et al. |
| 5,067,783 A | 11/1991 | Lampert |
| 5,073,042 A | 12/1991 | Mulholland et al. |
| 5,076,656 A | 12/1991 | Briggs et al. |
| 5,085,492 A | 2/1992 | Kelsoe et al. |
| 5,088,804 A | 2/1992 | Grinderslev |
| 5,091,990 A | 2/1992 | Leung et al. |
| 5,095,176 A | 3/1992 | Harbrecht et al. |
| 5,129,023 A | 7/1992 | Anderson et al. |
| 5,131,735 A | 7/1992 | Berkey et al. |
| 5,134,677 A | 7/1992 | Leung et al. |
| 5,136,683 A | 8/1992 | Aoki et al. |
| 5,142,602 A | 8/1992 | Cabato et al. |
| 5,146,519 A | 9/1992 | Miller et al. |
| 5,155,900 A | 10/1992 | Grois et al. |
| 5,162,397 A | 11/1992 | Descamps et al. |
| 5,180,890 A | 1/1993 | Pendergrass et al. |
| 5,189,718 A | 2/1993 | Barrett et al. |
| 5,210,810 A | 5/1993 | Darden et al. |
| 5,212,752 A | 5/1993 | Stephenson et al. |
| 5,214,732 A | 5/1993 | Beard et al. |
| 5,224,187 A | 6/1993 | Davisdon |
| 5,226,832 A | 7/1993 | Dejardin et al. |
| 5,231,685 A | 7/1993 | Hanzawa et al. |
| 5,245,683 A | 9/1993 | Belenkiy et al. |
| 5,263,105 A | 11/1993 | Johnson et al. |
| 5,263,239 A | 11/1993 | Ziemek |
| 5,276,750 A | 1/1994 | Manning |
| 5,313,540 A | 5/1994 | Ueda et al. |
| 5,315,679 A | 5/1994 | Baldwin et al. |
| 5,317,663 A | 5/1994 | Beard et al. |
| 5,321,917 A | 6/1994 | Franklin et al. |
| 5,329,603 A | 7/1994 | Watanabe et al. |
| 5,367,594 A | 11/1994 | Essert et al. |
| 5,371,823 A | 12/1994 | Barrett et al. |
| 5,375,183 A | 12/1994 | Edwards et al. |
| 5,381,494 A | 1/1995 | O'Donnell et al. |
| 5,390,269 A | 2/1995 | Palecek et al. |
| 5,390,272 A | 2/1995 | Repta et al. |
| 5,394,494 A | 2/1995 | Jennings et al. |
| 5,394,497 A | 2/1995 | Erdman et al. |
| 5,408,570 A | 4/1995 | Cook et al. |
| 5,416,874 A | 5/1995 | Giebel et al. |
| 5,425,121 A | 6/1995 | Cooke et al. |
| 5,452,388 A | 9/1995 | Rittle et al. |
| 5,519,799 A | 5/1996 | Murakami et al. |
| 5,553,186 A | 9/1996 | Allen |
| 5,557,696 A | 9/1996 | Stein |
| 5,569,050 A | 10/1996 | Lloyd |
| 5,588,077 A | 12/1996 | Woodside |
| 5,600,747 A | 2/1997 | Yamakawa et al. |
| 5,603,631 A | 2/1997 | Kawahara et al. |
| 5,608,828 A | 3/1997 | Coutts et al. |
| 5,631,993 A | 5/1997 | Cloud et al. |
| 5,647,045 A | 7/1997 | Robinson et al. |
| 5,673,346 A | 9/1997 | Iwano et al. |
| 5,682,451 A | 10/1997 | Lee et al. |
| 5,694,507 A | 12/1997 | Walles |
| 5,748,821 A | 5/1998 | Schempp et al. |
| 5,761,359 A | 6/1998 | Chudoba et al. |
| 5,781,681 A | 7/1998 | Manning |
| 5,781,686 A | 7/1998 | Robinson et al. |
| 5,782,892 A | 7/1998 | Castle et al. |
| 5,789,701 A | 8/1998 | Wettengel et al. |
| 5,790,740 A | 8/1998 | Cloud et al. |
| 5,791,918 A | 8/1998 | Pierce |
| 5,796,895 A | 8/1998 | Jennings et al. |
| RE35,935 E | 10/1998 | Cabato et al. |
| 5,818,993 A | 10/1998 | Chudoba et al. |
| 5,857,050 A | 1/1999 | Jiang et al. |
| 5,862,290 A | 1/1999 | Burek et al. |
| 5,867,621 A | 2/1999 | Luther et al. |
| 5,876,071 A | 3/1999 | Aldridge |
| 5,883,999 A | 3/1999 | Cloud et al. |
| 5,884,000 A | 3/1999 | Cloud et al. |
| 5,884,001 A | 3/1999 | Cloud et al. |
| 5,884,002 A | 3/1999 | Cloud et al. |
| 5,884,003 A | 3/1999 | Cloud et al. |
| 5,887,099 A | 3/1999 | Csipkes et al. |
| 5,913,001 A | 6/1999 | Nakajima et al. |
| 5,920,669 A | 7/1999 | Knecht et al. |
| 5,923,804 A | 7/1999 | Rosson |
| 5,925,191 A | 7/1999 | Stein et al. |
| 5,926,596 A | 7/1999 | Edwards et al. |
| 5,960,141 A | 9/1999 | Sasaki et al. |
| 5,961,344 A | 10/1999 | Rosales et al. |
| 5,971,626 A | 10/1999 | Knodell et al. |
| 5,993,070 A | 11/1999 | Tamekuni et al. |

(56) References Cited

U.S. PATENT DOCUMENTS

| | | |
|---|---|---|
| RE36,592 E | 2/2000 | Giebel et al. |
| 6,030,129 A | 2/2000 | Rosson |
| 6,035,084 A | 3/2000 | Haake et al. |
| 6,045,270 A | 4/2000 | Weiss et al. |
| 6,079,881 A | 6/2000 | Roth |
| 6,094,517 A | 7/2000 | Yuuki |
| 6,108,482 A | 8/2000 | Roth |
| 6,112,006 A | 8/2000 | Foss |
| 6,149,313 A | 11/2000 | Giebel et al. |
| 6,151,432 A | 11/2000 | Nakajima et al. |
| D435,513 S | 12/2000 | Cheng |
| RE37,028 E | 1/2001 | Cooke et al. |
| 6,173,097 B1 | 1/2001 | Throckmorton et al. |
| 6,179,482 B1 | 1/2001 | Takizawa et al. |
| 6,188,822 B1 | 2/2001 | McAlpine et al. |
| 6,193,421 B1 | 2/2001 | Tamekuni et al. |
| RE37,079 E | 3/2001 | Stephenson et al. |
| RE37,080 E | 3/2001 | Stephenson et al. |
| 6,200,040 B1 | 3/2001 | Edwards et al. |
| 6,206,579 B1 | 3/2001 | Selfridge et al. |
| 6,206,581 B1 | 3/2001 | Driscoll et al. |
| 6,220,762 B1 | 4/2001 | Kanai et al. |
| 6,224,268 B1 | 5/2001 | Manning et al. |
| 6,224,270 B1 | 5/2001 | Nakajima et al. |
| 6,229,944 B1 | 5/2001 | Yokokawa et al. |
| 6,234,683 B1 | 5/2001 | Waldron et al. |
| 6,234,685 B1 | 5/2001 | Carlisle et al. |
| 6,249,628 B1 | 6/2001 | Rutterman et al. |
| 6,256,438 B1 | 7/2001 | Gimblet |
| 6,261,006 B1 | 7/2001 | Selfridge |
| 6,264,374 B1 | 7/2001 | Selfridge et al. |
| 6,269,214 B1 | 7/2001 | Naudin et al. |
| 6,287,016 B1 | 9/2001 | Weigel |
| 6,293,710 B1 | 9/2001 | Lampert et al. |
| 6,298,190 B2 | 10/2001 | Waldron et al. |
| 6,304,698 B1 | 10/2001 | Morris |
| 6,305,849 B1 | 10/2001 | Roehrs et al. |
| 6,321,013 B1 | 11/2001 | Hardwick et al. |
| 6,340,249 B1 | 1/2002 | Hayes et al. |
| 6,356,390 B1 | 3/2002 | Hall, Jr. |
| 6,356,690 B1 | 3/2002 | McAlpine et al. |
| 6,357,929 B1 | 3/2002 | Roehrs et al. |
| 6,371,660 B1 | 4/2002 | Roehrs et al. |
| 6,375,363 B1 | 4/2002 | Harrison et al. |
| 6,379,054 B2 | 4/2002 | Throckmorton et al. |
| 6,386,891 B1 | 5/2002 | Howard et al. |
| 6,402,388 B1 | 6/2002 | Imazu et al. |
| 6,404,962 B1 | 6/2002 | Hardwick et al. |
| 6,409,391 B1 | 6/2002 | Chang |
| D460,043 S | 7/2002 | Fan Wong |
| 6,422,764 B1 | 7/2002 | Marrs et al. |
| 6,427,035 B1 | 7/2002 | Mahony |
| 6,428,215 B1 | 8/2002 | Nault |
| 6,439,780 B1 | 8/2002 | Mudd et al. |
| 6,443,626 B1 | 9/2002 | Foster |
| 6,466,725 B2 | 10/2002 | Battey et al. |
| 6,487,344 B1 | 11/2002 | Naudin et al. |
| 6,496,641 B1 | 12/2002 | Mahony |
| 6,501,888 B2 | 12/2002 | Gimblet et al. |
| 6,522,804 B1 | 2/2003 | Mahony |
| 6,529,663 B1 | 3/2003 | Parris et al. |
| 6,533,468 B2 | 3/2003 | Nakajima et al. |
| 6,536,956 B2 | 3/2003 | Luther et al. |
| 6,539,147 B1 | 3/2003 | Mahony |
| 6,540,410 B2 | 4/2003 | Childers et al. |
| 6,542,652 B1 | 4/2003 | Mahony |
| 6,542,674 B1 | 4/2003 | Gimblet |
| 6,546,175 B1 | 4/2003 | Wagman et al. |
| 6,554,489 B2 | 4/2003 | Kent et al. |
| D474,743 S | 5/2003 | Cheng |
| 6,579,014 B2 | 6/2003 | Melton et al. |
| 6,599,026 B1 | 7/2003 | Fahrnbauer et al. |
| 6,599,027 B2 | 7/2003 | Miyake et al. |
| 6,614,980 B1 | 9/2003 | Mahony |
| 6,618,526 B2 | 9/2003 | Jackman et al. |
| 6,619,697 B2 | 9/2003 | Griffioen et al. |
| 6,621,964 B2 | 9/2003 | Quinn et al. |
| 6,625,375 B1 | 9/2003 | Mahony |
| 6,629,782 B2 | 10/2003 | McPhee et al. |
| 6,644,862 B1 | 11/2003 | Berto et al. |
| 6,648,520 B2 | 11/2003 | McDonald et al. |
| 6,668,127 B1 | 12/2003 | Mahony |
| 6,672,774 B2 | 1/2004 | Theuerkorn et al. |
| 6,678,442 B2 | 1/2004 | Gall et al. |
| 6,678,448 B2 | 1/2004 | Moisel et al. |
| 6,685,361 B1 | 2/2004 | Rubino et al. |
| 6,695,489 B2 | 2/2004 | Nault |
| 6,702,475 B1 | 3/2004 | Giobbio et al. |
| 6,714,708 B2 | 3/2004 | McAlpine et al. |
| 6,714,710 B2 | 3/2004 | Gimblet |
| 6,729,773 B1 | 5/2004 | Finona et al. |
| 6,738,555 B1 | 5/2004 | Cooke et al. |
| 6,748,146 B2 | 6/2004 | Parris |
| 6,748,147 B2 | 6/2004 | Quinn et al. |
| 6,771,861 B2 | 8/2004 | Wagner et al. |
| 6,785,450 B2 | 8/2004 | Wagman et al. |
| 6,789,950 B1 | 9/2004 | Loder et al. |
| 6,809,265 B1 | 10/2004 | Gladd et al. |
| 6,841,729 B2 | 1/2005 | Sakabe et al. |
| 6,848,838 B2 | 2/2005 | Doss et al. |
| 6,856,748 B1 | 2/2005 | Elkins et al. |
| 6,877,906 B2 | 4/2005 | Mizukami et al. |
| 6,880,219 B2 | 4/2005 | Griffioen et al. |
| 6,899,467 B2 | 5/2005 | McDonald et al. |
| 6,908,233 B2 | 6/2005 | Nakajima et al. |
| 6,909,821 B2 | 6/2005 | Ravasio et al. |
| 6,916,120 B2 | 7/2005 | Zimmel et al. |
| 6,918,704 B2 | 7/2005 | Marrs et al. |
| 6,944,387 B2 | 9/2005 | Howell et al. |
| 6,962,445 B2 | 11/2005 | Zimmel et al. |
| 6,970,629 B2 | 11/2005 | Lail et al. |
| 6,983,095 B2 | 1/2006 | Reagan et al. |
| 7,001,081 B2 | 2/2006 | Cox et al. |
| 7,011,454 B2 | 3/2006 | Caveney et al. |
| 7,013,074 B2 | 3/2006 | Battey et al. |
| 7,025,507 B2 | 4/2006 | De Marchi |
| 7,033,191 B1 | 4/2006 | Cao |
| 7,044,650 B1 | 5/2006 | Tran et al. |
| 7,052,185 B2 | 5/2006 | Rubino et al. |
| 7,079,734 B2 | 7/2006 | Seddon et al. |
| 7,085,468 B2 | 8/2006 | Forrester |
| 7,088,899 B2 | 8/2006 | Reagan et al. |
| 7,090,406 B2 | 8/2006 | Melton et al. |
| 7,090,407 B2 | 8/2006 | Melton et al. |
| 7,090,409 B2 | 8/2006 | Nakajima et al. |
| D528,505 S | 9/2006 | Caveney et al. |
| 7,103,255 B2 | 9/2006 | Reagan et al. |
| 7,103,257 B2 | 9/2006 | Donaldson et al. |
| 7,104,702 B2 | 9/2006 | Barnes et al. |
| 7,111,990 B2 | 9/2006 | Melton et al. |
| 7,113,679 B2 | 9/2006 | Melton et al. |
| 7,118,283 B2 | 10/2006 | Nakajima et al. |
| 7,118,284 B2 | 10/2006 | Nakajima et al. |
| 7,120,347 B2 | 10/2006 | Blackwell et al. |
| 7,137,742 B2 | 11/2006 | Theuerkorn et al. |
| 7,146,089 B2 | 12/2006 | Reagan et al. |
| 7,146,090 B2 | 12/2006 | Vo et al. |
| 7,150,567 B1 | 12/2006 | Luther et al. |
| 7,165,893 B2 | 1/2007 | Schmitz |
| 7,171,102 B2 | 1/2007 | Reagan et al. |
| 7,178,990 B2 | 2/2007 | Caveney et al. |
| 7,184,634 B2 | 2/2007 | Hurley et al. |
| 7,195,403 B2 | 3/2007 | Oki et al. |
| 7,200,317 B2 | 4/2007 | Reagan et al. |
| 7,201,518 B2 | 4/2007 | Holmquist |
| 7,204,644 B2 | 4/2007 | Barnes et al. |
| 7,213,975 B2 | 5/2007 | Khemakhem et al. |
| 7,213,980 B2 | 5/2007 | Oki et al. |
| 7,228,047 B1 | 6/2007 | Szilagyi et al. |
| 7,232,260 B2 | 6/2007 | Takahashi et al. |
| 7,236,670 B2 | 6/2007 | Lail et al. |
| 7,241,056 B1 | 7/2007 | Kuffel et al. |
| 7,260,301 B2 | 8/2007 | Barth et al. |
| 7,261,472 B2 | 8/2007 | Suzuki et al. |

(56) References Cited

U.S. PATENT DOCUMENTS

| | | |
|---|---|---|
| 7,266,265 B2 | 9/2007 | Gall et al. |
| 7,266,274 B2 | 9/2007 | Elkins et al. |
| 7,270,487 B2 | 9/2007 | Billman et al. |
| 7,277,614 B2 | 10/2007 | Cody et al. |
| 7,279,643 B2 | 10/2007 | Morrow et al. |
| 7,292,763 B2 | 11/2007 | Smith et al. |
| 7,302,152 B2 | 11/2007 | Luther et al. |
| 7,318,677 B2 | 1/2008 | Dye |
| 7,326,091 B2 | 2/2008 | Nania et al. |
| 7,330,629 B2 | 2/2008 | Cooke et al. |
| 7,333,708 B2 | 2/2008 | Blackwell et al. |
| 7,336,873 B2 | 2/2008 | Lail et al. |
| 7,341,382 B2 | 3/2008 | Dye |
| 7,346,256 B2 | 3/2008 | Marrs et al. |
| 7,349,605 B2 | 3/2008 | Noonan et al. |
| 7,357,579 B2 | 4/2008 | Feldner |
| 7,357,582 B2 | 4/2008 | Oki et al. |
| 7,366,416 B2 | 4/2008 | Ramachandran et al. |
| 7,394,964 B2 | 7/2008 | Tinucci et al. |
| 7,397,997 B2 | 7/2008 | Ferris et al. |
| 7,400,815 B2 | 7/2008 | Mertesdorf et al. |
| D574,775 S | 8/2008 | Amidon |
| 7,407,332 B2 | 8/2008 | Oki et al. |
| 7,428,366 B2 | 9/2008 | Mullaney et al. |
| 7,444,056 B2 | 10/2008 | Allen et al. |
| 7,454,107 B2 | 11/2008 | Miller et al. |
| 7,463,803 B2 | 12/2008 | Cody et al. |
| 7,467,896 B2 | 12/2008 | Melton et al. |
| 7,469,091 B2 | 12/2008 | Mullaney et al. |
| 7,477,824 B2 | 1/2009 | Reagan et al. |
| 7,480,437 B2 | 1/2009 | Ferris et al. |
| 7,484,898 B2 | 2/2009 | Katagiyama et al. |
| 7,485,804 B2 | 2/2009 | Dinh et al. |
| 7,489,849 B2 | 2/2009 | Reagan et al. |
| 7,492,996 B2 | 2/2009 | Kowalczyk et al. |
| D588,549 S | 3/2009 | Lee et al. |
| 7,497,896 B2 | 3/2009 | Bromet et al. |
| 7,512,304 B2 | 3/2009 | Gronvall et al. |
| 7,520,678 B2 | 4/2009 | Khemakhem et al. |
| 7,539,387 B2 | 5/2009 | Mertesdorf et al. |
| 7,539,388 B2 | 5/2009 | Mertesdorf et al. |
| 7,542,645 B1 | 6/2009 | Hua et al. |
| 7,559,702 B2 | 7/2009 | Fujiwara et al. |
| 7,565,055 B2 | 7/2009 | Lu et al. |
| 7,568,845 B2 | 8/2009 | Caveney et al. |
| 7,572,065 B2 | 8/2009 | Lu et al. |
| 7,580,607 B2 | 8/2009 | Jones et al. |
| 7,591,595 B2 | 9/2009 | Lu et al. |
| 7,614,797 B2 | 11/2009 | Lu et al. |
| 7,621,675 B1 | 11/2009 | Bradley |
| 7,627,222 B2 | 12/2009 | Reagan et al. |
| 7,628,545 B2 | 12/2009 | Cody et al. |
| 7,628,548 B2 | 12/2009 | Benjamin et al. |
| 7,641,398 B2 | 1/2010 | O'Riorden et al. |
| 7,646,958 B1 | 1/2010 | Reagan et al. |
| 7,653,282 B2 | 1/2010 | Blackwell et al. |
| 7,654,747 B2 | 2/2010 | Theuerkorn et al. |
| 7,654,748 B2 | 2/2010 | Kuffel et al. |
| 7,654,849 B2 * | 2/2010 | Gordon ............ H01R 13/6275 439/350 |
| 7,658,549 B2 | 2/2010 | Elkins et al. |
| 7,661,995 B2 | 2/2010 | Nania et al. |
| 7,677,812 B2 | 3/2010 | Castagna et al. |
| 7,677,814 B2 | 3/2010 | Lu et al. |
| 7,680,388 B2 | 3/2010 | Reagan et al. |
| 7,695,197 B2 | 4/2010 | Gurreri |
| 7,708,476 B2 | 5/2010 | Liu |
| 7,709,733 B1 | 5/2010 | Plankell |
| 7,712,971 B2 | 5/2010 | Lee et al. |
| 7,713,679 B2 | 5/2010 | Ishiduka et al. |
| 7,722,262 B2 | 5/2010 | Caveney et al. |
| 7,726,998 B2 | 6/2010 | Siebens |
| 7,738,759 B2 | 6/2010 | Parikh et al. |
| 7,740,409 B2 | 6/2010 | Bolton et al. |
| 7,742,117 B2 | 6/2010 | Lee et al. |
| 7,742,670 B2 | 6/2010 | Benjamin et al. |
| 7,744,286 B2 | 6/2010 | Lu et al. |
| 7,744,288 B2 | 6/2010 | Lu et al. |
| 7,747,117 B2 | 6/2010 | Greenwood et al. |
| 7,751,666 B2 | 7/2010 | Parsons et al. |
| 7,753,596 B2 | 7/2010 | Cox |
| 7,762,726 B2 | 7/2010 | Lu et al. |
| 7,785,015 B2 | 8/2010 | Melton et al. |
| 7,785,019 B2 | 8/2010 | Lewallen et al. |
| RE41,743 E | 9/2010 | Naudin et al. |
| 7,802,926 B2 | 9/2010 | Leeman et al. |
| 7,805,044 B2 | 9/2010 | Reagan et al. |
| 7,806,599 B2 | 10/2010 | Margolin et al. |
| 7,811,006 B2 | 10/2010 | Milette et al. |
| 7,820,090 B2 | 10/2010 | Morrow et al. |
| D626,506 S | 11/2010 | Giefers et al. |
| 7,844,148 B2 | 11/2010 | Jenkins et al. |
| 7,844,158 B2 | 11/2010 | Gronvall et al. |
| 7,844,160 B2 | 11/2010 | Reagan et al. |
| 7,869,681 B2 | 1/2011 | Battey et al. |
| RE42,094 E | 2/2011 | Barnes et al. |
| 7,881,576 B2 | 2/2011 | Melton et al. |
| 7,889,961 B2 | 2/2011 | Cote et al. |
| 7,891,882 B2 | 2/2011 | Kuffel et al. |
| 7,903,923 B2 | 3/2011 | Gronvall et al. |
| 7,903,925 B2 | 3/2011 | Cooke et al. |
| 7,918,609 B2 | 4/2011 | Melton et al. |
| 7,933,517 B2 | 4/2011 | Ye et al. |
| 7,938,670 B2 | 5/2011 | Nania et al. |
| 7,941,027 B2 | 5/2011 | Mertesdorf et al. |
| 7,942,590 B2 | 5/2011 | Lu et al. |
| 7,959,361 B2 | 6/2011 | Lu et al. |
| 8,002,476 B2 | 8/2011 | Caveney et al. |
| 8,002,566 B1 | 8/2011 | Baumann et al. |
| 8,005,335 B2 | 8/2011 | Reagan et al. |
| 8,023,793 B2 | 9/2011 | Kowalczyk et al. |
| 8,025,445 B2 | 9/2011 | Rambow et al. |
| 8,041,178 B2 | 10/2011 | Lu et al. |
| 8,052,333 B2 | 11/2011 | Kuffel et al. |
| 8,055,167 B2 | 11/2011 | Park et al. |
| 8,083,418 B2 | 12/2011 | Fujiwara et al. |
| 8,111,966 B2 | 2/2012 | Holmberg et al. |
| 8,137,002 B2 | 3/2012 | Lu et al. |
| 8,147,147 B2 | 4/2012 | Khemakhem et al. |
| 8,157,454 B2 | 4/2012 | Ito et al. |
| 8,164,050 B2 | 4/2012 | Ford et al. |
| 8,202,008 B2 | 6/2012 | Lu et al. |
| 8,213,761 B2 | 7/2012 | Gronvall et al. |
| 8,218,935 B2 | 7/2012 | Reagan et al. |
| 8,224,145 B2 | 7/2012 | Reagan et al. |
| 8,229,263 B2 | 7/2012 | Parris et al. |
| 8,231,282 B2 | 7/2012 | Kuffel et al. |
| D665,359 S | 8/2012 | Yamauchi et al. |
| 8,238,706 B2 | 8/2012 | Kachmar |
| 8,238,709 B2 | 8/2012 | Solheid et al. |
| 8,249,450 B2 | 8/2012 | Conner |
| 8,256,971 B2 | 9/2012 | Caveney et al. |
| 8,267,596 B2 | 9/2012 | Theuerkorn |
| 8,272,792 B2 | 9/2012 | Coleman et al. |
| RE43,762 E | 10/2012 | Smith et al. |
| 8,301,003 B2 | 10/2012 | De et al. |
| 8,301,004 B2 | 10/2012 | Cooke et al. |
| 8,317,411 B2 | 11/2012 | Fujiwara et al. |
| 8,348,519 B2 | 1/2013 | Kuffel et al. |
| 8,363,999 B2 | 1/2013 | Mertesdorf et al. |
| 8,376,629 B2 | 2/2013 | Cline et al. |
| 8,376,632 B2 | 2/2013 | Blackburn et al. |
| 8,402,587 B2 | 3/2013 | Sugita et al. |
| 8,408,811 B2 | 4/2013 | De et al. |
| 8,414,196 B2 | 4/2013 | Lu et al. |
| 8,439,577 B2 | 5/2013 | Jenkins |
| 8,465,235 B2 | 6/2013 | Jenkins et al. |
| 8,466,262 B2 | 6/2013 | Siadak et al. |
| 8,472,773 B2 | 6/2013 | De Jong |
| 8,480,312 B2 | 7/2013 | Smith et al. |
| 8,494,329 B2 | 7/2013 | Nhep et al. |
| 8,496,384 B2 | 7/2013 | Kuffel et al. |
| 8,506,173 B2 | 8/2013 | Lewallen et al. |
| 8,520,996 B2 | 8/2013 | Cowen et al. |

(56) References Cited

U.S. PATENT DOCUMENTS

| | | |
|---|---|---|
| 8,534,928 B2 | 9/2013 | Cooke et al. |
| 8,536,516 B2 | 9/2013 | Ford et al. |
| 8,556,522 B2 | 10/2013 | Cunningham |
| 8,556,645 B2 | 10/2013 | Crain |
| 8,573,855 B2 | 11/2013 | Nhep |
| 8,591,124 B2 | 11/2013 | Griffiths et al. |
| 8,622,627 B2 | 1/2014 | Elkins et al. |
| 8,622,634 B2 | 1/2014 | Arnold et al. |
| 8,634,688 B2 | 1/2014 | Bryon et al. |
| 8,635,733 B2 | 1/2014 | Bardzilowski |
| 8,662,760 B2 | 3/2014 | Cline et al. |
| 8,668,512 B2 | 3/2014 | Chang |
| 8,678,668 B2 | 3/2014 | Cooke et al. |
| 8,687,930 B2 | 4/2014 | McDowell et al. |
| 8,702,324 B2 | 4/2014 | Caveney et al. |
| 8,714,835 B2 | 5/2014 | Kuffel et al. |
| 8,727,638 B2 | 5/2014 | Lee et al. |
| 8,737,837 B2 | 5/2014 | Conner et al. |
| 8,755,654 B1 | 6/2014 | Danley et al. |
| 8,755,663 B2 | 6/2014 | Makrides-Saravanos et al. |
| 8,758,046 B2 | 6/2014 | Pezzetti et al. |
| 8,764,316 B1 | 7/2014 | Barnette et al. |
| 8,768,133 B2 | 7/2014 | Bryon et al. |
| 8,770,861 B2 | 7/2014 | Smith et al. |
| 8,770,862 B2 | 7/2014 | Lu et al. |
| D711,320 S | 8/2014 | Yang et al. |
| 8,798,430 B2 | 8/2014 | Bryon et al. |
| D712,360 S | 9/2014 | Su et al. |
| 8,821,036 B2 | 9/2014 | Shigehara |
| 8,837,894 B2 | 9/2014 | Holmberg et al. |
| 8,864,390 B2 | 10/2014 | Chen et al. |
| 8,870,469 B2 | 10/2014 | Kachmar |
| 8,879,883 B2 | 11/2014 | Parikh et al. |
| 8,882,364 B2 | 11/2014 | Busse et al. |
| 8,917,966 B2 | 12/2014 | Thompson et al. |
| 8,944,703 B2 | 2/2015 | Song et al. |
| 8,974,124 B2 | 3/2015 | Chang |
| 8,992,097 B2 | 3/2015 | Koreeda et al. |
| 8,998,502 B2 | 4/2015 | Benjamin et al. |
| 8,998,506 B2 | 4/2015 | Pepin et al. |
| 9,011,858 B2 | 4/2015 | Siadak et al. |
| 9,039,293 B2 | 5/2015 | Hill et al. |
| 9,075,205 B2 | 7/2015 | Pepe et al. |
| 9,081,154 B2 | 7/2015 | Zimmel et al. |
| 9,146,364 B2 | 9/2015 | Chen et al. |
| D741,803 S | 10/2015 | Davidson, Jr. |
| 9,151,906 B2 | 10/2015 | Kobayashi et al. |
| 9,151,909 B2 | 10/2015 | Chen et al. |
| 9,158,074 B2 | 10/2015 | Anderson et al. |
| 9,158,075 B2 | 10/2015 | Benjamin et al. |
| 9,182,567 B2 | 11/2015 | Mullaney |
| 9,188,759 B2 | 11/2015 | Conner |
| 9,207,410 B2 | 12/2015 | Lee et al. |
| 9,207,421 B2 | 12/2015 | Conner |
| 9,213,150 B2 | 12/2015 | Matsui et al. |
| 9,223,106 B2 | 12/2015 | Coan et al. |
| 9,239,441 B2 | 1/2016 | Melton et al. |
| D749,519 S | 2/2016 | Su et al. |
| 9,268,102 B2 | 2/2016 | Daems et al. |
| 9,274,286 B2 | 3/2016 | Caveney et al. |
| 9,279,951 B2 | 3/2016 | McGranahan et al. |
| 9,285,550 B2 | 3/2016 | Nhep et al. |
| 9,297,974 B2 | 3/2016 | Valderrabano et al. |
| 9,297,976 B2 | 3/2016 | Hill et al. |
| 9,310,570 B2 | 4/2016 | Busse et al. |
| 9,316,791 B2 | 4/2016 | Durrant et al. |
| 9,322,998 B2 | 4/2016 | Miller |
| 9,360,640 B2 | 6/2016 | Ishigami et al. |
| 9,383,539 B2 | 7/2016 | Power et al. |
| 9,400,364 B2 | 7/2016 | Hill et al. |
| 9,405,068 B2 | 8/2016 | Graham et al. |
| 9,417,403 B2 | 8/2016 | Mullaney et al. |
| 9,423,584 B2 | 8/2016 | Coan et al. |
| 9,429,732 B2 | 8/2016 | Ahmed et al. |
| 9,435,969 B2 | 9/2016 | Lambourn et al. |
| 9,442,257 B2 | 9/2016 | Lu |
| 9,450,393 B2 | 9/2016 | Thompson et al. |
| 9,459,412 B2 | 10/2016 | Katoh |
| 9,482,819 B2 | 11/2016 | Li et al. |
| 9,482,829 B2 | 11/2016 | Lu et al. |
| 9,513,444 B2 | 12/2016 | Barnette et al. |
| 9,513,451 B2 | 12/2016 | Corbille et al. |
| 9,535,229 B2 | 1/2017 | Ott et al. |
| 9,541,711 B2 | 1/2017 | Raven et al. |
| 9,551,842 B2 | 1/2017 | Theuerkorn |
| 9,557,504 B2 | 1/2017 | Holmberg et al. |
| 9,581,775 B2 | 2/2017 | Kondo et al. |
| 9,588,304 B2 | 3/2017 | Durrant et al. |
| 9,595,786 B1 | 3/2017 | Takano et al. |
| D783,618 S | 4/2017 | Wu et al. |
| 9,612,407 B2 | 4/2017 | Kobayashi et al. |
| 9,618,704 B2 | 4/2017 | Dean et al. |
| 9,618,718 B2 | 4/2017 | Islam |
| 9,624,296 B2 | 4/2017 | Siadak et al. |
| 9,625,660 B2 | 4/2017 | Daems et al. |
| 9,638,871 B2 | 5/2017 | Bund et al. |
| 9,645,331 B1 | 5/2017 | Kim |
| 9,645,334 B2 | 5/2017 | Ishii et al. |
| 9,651,741 B2 | 5/2017 | Isenhour et al. |
| 9,664,862 B2 | 5/2017 | Lu et al. |
| 9,678,285 B2 | 6/2017 | Hill et al. |
| 9,678,293 B2 | 6/2017 | Coan et al. |
| 9,684,136 B2 | 6/2017 | Cline et al. |
| 9,684,138 B2 | 6/2017 | Lu |
| 9,696,500 B2 | 7/2017 | Barnette et al. |
| 9,711,868 B2 | 7/2017 | Scheucher |
| 9,720,193 B2 | 8/2017 | Nishimura |
| 9,733,436 B2 | 8/2017 | Van et al. |
| 9,739,951 B2 | 8/2017 | Busse et al. |
| 9,762,322 B1 | 9/2017 | Amundson |
| 9,766,416 B1 | 9/2017 | Kim |
| 9,772,457 B2 | 9/2017 | Hill et al. |
| 9,804,343 B2 | 10/2017 | Hill et al. |
| 9,810,855 B2 | 11/2017 | Cox et al. |
| 9,810,856 B2 | 11/2017 | Graham et al. |
| 9,829,658 B2 | 11/2017 | Nishimura |
| 9,829,668 B2 | 11/2017 | Claessens et al. |
| 9,851,522 B2 | 12/2017 | Reagan et al. |
| 9,857,540 B2 | 1/2018 | Ahmed et al. |
| 9,864,151 B2 | 1/2018 | Lu |
| 9,878,038 B2 | 1/2018 | Siadak et al. |
| D810,029 S | 2/2018 | Robert et al. |
| 9,885,841 B2 | 2/2018 | Pepe et al. |
| 9,891,391 B2 | 2/2018 | Watanabe |
| 9,905,933 B2 | 2/2018 | Scheucher |
| 9,910,224 B2 | 3/2018 | Liu et al. |
| 9,910,236 B2 | 3/2018 | Cooke et al. |
| 9,921,375 B2 | 3/2018 | Compton et al. |
| 9,927,580 B2 | 3/2018 | Bretz et al. |
| 9,927,581 B1 | 3/2018 | Rosson et al. |
| 9,933,582 B1 | 4/2018 | Lin |
| 9,939,591 B2 | 4/2018 | Mullaney et al. |
| 9,964,713 B2 | 5/2018 | Barnette et al. |
| 9,964,715 B2 | 5/2018 | Lu |
| 9,977,194 B2 | 5/2018 | Waldron et al. |
| 9,977,198 B2 | 5/2018 | Bund et al. |
| 9,983,374 B2 | 5/2018 | Li et al. |
| 9,989,711 B2 | 6/2018 | Ott et al. |
| 10,007,068 B2 | 6/2018 | Hill et al. |
| 10,031,302 B2 | 7/2018 | Ji et al. |
| 10,036,859 B2 | 7/2018 | Daems et al. |
| 10,038,946 B2 | 7/2018 | Smolorz |
| 10,042,136 B2 | 8/2018 | Reagan et al. |
| 10,061,090 B2 | 8/2018 | Coenegracht |
| 10,061,091 B2 | 8/2018 | Kempeneers et al. |
| 10,073,224 B2 | 9/2018 | Tong et al. |
| D830,304 S | 10/2018 | Choi |
| 10,094,986 B2 | 10/2018 | Barnette et al. |
| 10,101,538 B2 | 10/2018 | Lu et al. |
| 10,107,968 B2 | 10/2018 | Tong et al. |
| 10,109,927 B2 | 10/2018 | Scheucher |
| 10,114,176 B2 | 10/2018 | Gimblet et al. |
| 10,126,508 B2 | 11/2018 | Compton et al. |
| 10,180,541 B2 | 1/2019 | Coenegracht et al. |

(56) References Cited

U.S. PATENT DOCUMENTS

| | | |
|---|---|---|
| 10,209,454 B2 | 2/2019 | Isenhour et al. |
| 10,215,930 B2 | 2/2019 | Mullaney et al. |
| 10,235,184 B2 | 3/2019 | Walker |
| 10,261,268 B2 | 4/2019 | Theuerkorn |
| 10,268,011 B2 | 4/2019 | Courchaine et al. |
| 10,288,820 B2 | 5/2019 | Coenegracht |
| 10,288,821 B2 | 5/2019 | Isenhour |
| 10,317,628 B2 | 6/2019 | Van et al. |
| 10,324,263 B2 | 6/2019 | Bund et al. |
| 10,338,323 B2 | 7/2019 | Lu et al. |
| 10,353,154 B2 | 7/2019 | Ott et al. |
| 10,353,156 B2 | 7/2019 | Hill et al. |
| 10,359,577 B2 | 7/2019 | Dannoux et al. |
| 10,371,914 B2 | 8/2019 | Coan et al. |
| 10,379,298 B2 | 8/2019 | Pannoux et al. |
| 10,379,308 B2 | 8/2019 | Coate |
| 10,386,584 B2 | 8/2019 | Rosson |
| 10,401,575 B2 | 9/2019 | Daily et al. |
| 10,401,578 B2 | 9/2019 | Coenegracht |
| 10,401,584 B2 | 9/2019 | Coan et al. |
| 10,409,007 B2 | 9/2019 | Kadar-Kallen et al. |
| 10,422,962 B2 | 9/2019 | Coenegracht |
| 10,422,970 B2 | 9/2019 | Holmberg et al. |
| 10,429,593 B2 | 10/2019 | Baca et al. |
| 10,429,594 B2 | 10/2019 | Dannoux et al. |
| 10,434,173 B2 | 10/2019 | Siadak et al. |
| 10,439,295 B2 | 10/2019 | Scheucher |
| 10,444,442 B2 | 10/2019 | Takano et al. |
| 10,451,811 B2 | 10/2019 | Coenegracht et al. |
| 10,451,817 B2 | 10/2019 | Lu |
| 10,451,830 B2 | 10/2019 | Szumacher et al. |
| 10,488,597 B2 | 11/2019 | Parikh et al. |
| D868,694 S | 12/2019 | Rosson |
| 10,495,822 B2 | 12/2019 | Nhep |
| 10,502,916 B2 | 12/2019 | Coan et al. |
| 10,520,683 B2 | 12/2019 | Nhep |
| 10,539,745 B2 | 1/2020 | Kamada et al. |
| 10,545,298 B2 | 1/2020 | Bauco et al. |
| 10,578,821 B2 | 3/2020 | Ott et al. |
| 10,585,246 B2 | 3/2020 | Bretz et al. |
| 10,591,678 B2 | 3/2020 | Mullaney et al. |
| 10,605,998 B2 | 3/2020 | Rosson |
| 10,606,006 B2 | 3/2020 | Hill et al. |
| D880,423 S | 4/2020 | Obata et al. |
| 10,613,278 B2 | 4/2020 | Kempeneers et al. |
| 10,620,388 B2 | 4/2020 | Isenhour et al. |
| 10,641,967 B1 | 5/2020 | Cote et al. |
| 10,656,347 B2 | 5/2020 | Kato |
| 10,677,998 B2 | 6/2020 | Van et al. |
| 10,680,343 B2 | 6/2020 | Scheucher |
| 10,712,516 B2 | 7/2020 | Courchaine et al. |
| D892,742 S | 8/2020 | Hsu et al. |
| 10,739,534 B2 | 8/2020 | Murray et al. |
| 10,746,939 B2 | 8/2020 | Lu et al. |
| 10,761,274 B2 | 9/2020 | Pepe et al. |
| 10,768,382 B2 | 9/2020 | Cote et al. |
| 10,782,487 B2 | 9/2020 | Lu |
| 10,802,236 B2 | 10/2020 | Kowalczyk et al. |
| 10,830,967 B2 | 11/2020 | Pimentel et al. |
| 10,830,975 B2 | 11/2020 | Vaughn et al. |
| 10,852,498 B2 | 12/2020 | Hill et al. |
| 10,852,499 B2 | 12/2020 | Cooke et al. |
| 10,859,771 B2 | 12/2020 | Nhep |
| 10,859,781 B2 | 12/2020 | Hill et al. |
| 10,921,530 B2 | 2/2021 | Wong et al. |
| 10,921,531 B2 | 2/2021 | Wong et al. |
| 10,962,731 B2 | 3/2021 | Coenegracht |
| 10,976,500 B2 | 4/2021 | Ott et al. |
| 11,061,191 B2 | 7/2021 | Van Baelen et al. |
| 11,073,664 B2 | 7/2021 | Chang et al. |
| 11,105,986 B2 | 8/2021 | Coenegracht et al. |
| 11,112,567 B2 | 9/2021 | Higley et al. |
| 11,161,603 B2 | 11/2021 | Vallart et al. |
| 11,262,509 B2 | 3/2022 | Rosson |
| 11,290,188 B2 | 3/2022 | Watte et al. |
| 11,487,073 B2 | 11/2022 | Ripumaree et al. |
| 11,493,700 B2 | 11/2022 | Rosson |
| D982,519 S | 4/2023 | Gaidosch |
| 2001/0002220 A1 | 5/2001 | Throckmorton et al. |
| 2001/0012428 A1 | 8/2001 | Nakajima et al. |
| 2001/0019654 A1 | 9/2001 | Waldron et al. |
| 2001/0036342 A1 | 11/2001 | Knecht et al. |
| 2001/0036345 A1 | 11/2001 | Gimblet et al. |
| 2002/0012502 A1 | 1/2002 | Farrar et al. |
| 2002/0062978 A1 | 5/2002 | Sakabe et al. |
| 2002/0064364 A1 | 5/2002 | Battey et al. |
| 2002/0076165 A1 | 6/2002 | Childers et al. |
| 2002/0079697 A1 | 6/2002 | Griffioen et al. |
| 2002/0081077 A1 | 6/2002 | Nault |
| 2002/0122634 A1 | 9/2002 | Miyake et al. |
| 2002/0122653 A1 | 9/2002 | Donaldson et al. |
| 2002/0131721 A1 | 9/2002 | Gaio et al. |
| 2002/0159745 A1 | 10/2002 | Howell et al. |
| 2002/0172477 A1 | 11/2002 | Quinn et al. |
| 2002/0181893 A1 | 12/2002 | White et al. |
| 2003/0016440 A1 | 1/2003 | Zeidan et al. |
| 2003/0031447 A1 | 2/2003 | Nault |
| 2003/0059181 A1 | 3/2003 | Jackman et al. |
| 2003/0063866 A1 | 4/2003 | Melton et al. |
| 2003/0063867 A1 | 4/2003 | McDonald et al. |
| 2003/0063868 A1 | 4/2003 | Fentress |
| 2003/0063897 A1 | 4/2003 | Heo |
| 2003/0080555 A1 | 5/2003 | Griffioen et al. |
| 2003/0086664 A1 | 5/2003 | Moisel et al. |
| 2003/0094298 A1 | 5/2003 | Morrow et al. |
| 2003/0099448 A1 | 5/2003 | Gimblet |
| 2003/0103733 A1 | 6/2003 | Fleenor et al. |
| 2003/0123813 A1 | 7/2003 | Ravasio et al. |
| 2003/0128936 A1 | 7/2003 | Fahrnbauer et al. |
| 2003/0165311 A1 | 9/2003 | Wagman et al. |
| 2003/0201117 A1 | 10/2003 | Sakabe et al. |
| 2003/0206705 A1 | 11/2003 | McAlpine et al. |
| 2003/0210875 A1 | 11/2003 | Wagner et al. |
| 2004/0047566 A1 | 3/2004 | McDonald et al. |
| 2004/0052474 A1 | 3/2004 | Lampert et al. |
| 2004/0057676 A1 | 3/2004 | Doss et al. |
| 2004/0057681 A1 | 3/2004 | Quinn et al. |
| 2004/0072454 A1 | 4/2004 | Nakajima et al. |
| 2004/0076377 A1 | 4/2004 | Mizukami et al. |
| 2004/0076386 A1 | 4/2004 | Nechitailo |
| 2004/0086238 A1 | 5/2004 | Finona et al. |
| 2004/0096162 A1 | 5/2004 | Kocher et al. |
| 2004/0120662 A1 | 6/2004 | Lail et al. |
| 2004/0120663 A1 | 6/2004 | Lail et al. |
| 2004/0157449 A1 | 8/2004 | Hidaka et al. |
| 2004/0157499 A1 | 8/2004 | Nania et al. |
| 2004/0206542 A1 | 10/2004 | Gladd et al. |
| 2004/0223699 A1 | 11/2004 | Melton et al. |
| 2004/0223720 A1 | 11/2004 | Melton et al. |
| 2004/0228589 A1 | 11/2004 | Melton et al. |
| 2004/0240808 A1 | 12/2004 | Rhoney et al. |
| 2004/0247251 A1 | 12/2004 | Rubino et al. |
| 2004/0252954 A1 | 12/2004 | Ginocchio et al. |
| 2004/0262023 A1 | 12/2004 | Morrow et al. |
| 2005/0019031 A1 | 1/2005 | Ye et al. |
| 2005/0036744 A1 | 2/2005 | Caveney et al. |
| 2005/0036786 A1 | 2/2005 | Ramachandran et al. |
| 2005/0053342 A1 | 3/2005 | Melton et al. |
| 2005/0054237 A1 | 3/2005 | Gladd et al. |
| 2005/0084215 A1 | 4/2005 | Grzegorzewska et al. |
| 2005/0105873 A1 | 5/2005 | Reagan et al. |
| 2005/0123422 A1 | 6/2005 | Lilie |
| 2005/0129379 A1 | 6/2005 | Reagan et al. |
| 2005/0163448 A1 | 7/2005 | Blackwell et al. |
| 2005/0175307 A1 | 8/2005 | Battey et al. |
| 2005/0180697 A1 | 8/2005 | De Marchi |
| 2005/0213890 A1 | 9/2005 | Barnes et al. |
| 2005/0213892 A1 | 9/2005 | Barnes et al. |
| 2005/0213897 A1 | 9/2005 | Palmer et al. |
| 2005/0213899 A1 | 9/2005 | Hurley et al. |
| 2005/0213902 A1 | 9/2005 | Parsons |
| 2005/0213921 A1 | 9/2005 | Mertesdorf et al. |
| 2005/0226568 A1 | 10/2005 | Nakajima et al. |
| 2005/0232550 A1 | 10/2005 | Nakajima et al. |

(56) References Cited

U.S. PATENT DOCUMENTS

| | | |
|---|---|---|
| 2005/0232552 A1 | 10/2005 | Takahashi et al. |
| 2005/0232567 A1 | 10/2005 | Reagan et al. |
| 2005/0244108 A1 | 11/2005 | Billman et al. |
| 2005/0271344 A1 | 12/2005 | Grubish et al. |
| 2005/0281510 A1 | 12/2005 | Vo et al. |
| 2005/0281514 A1 | 12/2005 | Oki et al. |
| 2005/0286837 A1 | 12/2005 | Oki et al. |
| 2005/0286838 A1 | 12/2005 | Oki et al. |
| 2006/0002668 A1 | 1/2006 | Lail et al. |
| 2006/0008232 A1 | 1/2006 | Reagan et al. |
| 2006/0008233 A1 | 1/2006 | Reagan et al. |
| 2006/0008234 A1 | 1/2006 | Reagan et al. |
| 2006/0045428 A1 | 3/2006 | Theuerkorn et al. |
| 2006/0045430 A1 | 3/2006 | Theuerkorn et al. |
| 2006/0056769 A1 | 3/2006 | Khemakhem et al. |
| 2006/0056770 A1 | 3/2006 | Schmitz |
| 2006/0088247 A1 | 4/2006 | Tran et al. |
| 2006/0093278 A1 | 5/2006 | Elkins et al. |
| 2006/0093303 A1 | 5/2006 | Reagan et al. |
| 2006/0093304 A1 | 5/2006 | Battey et al. |
| 2006/0098932 A1 | 5/2006 | Battey et al. |
| 2006/0120672 A1 | 6/2006 | Cody et al. |
| 2006/0127016 A1 | 6/2006 | Baird et al. |
| 2006/0133748 A1 | 6/2006 | Seddon et al. |
| 2006/0133758 A1 | 6/2006 | Mullaney et al. |
| 2006/0133759 A1 | 6/2006 | Mullaney et al. |
| 2006/0140542 A1 | 6/2006 | Koreeda et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0165352 A1 | 7/2006 | Caveney et al. |
| 2006/0171638 A1 | 8/2006 | Dye |
| 2006/0171640 A1 | 8/2006 | Dye |
| 2006/0210750 A1 | 9/2006 | Morrow et al. |
| 2006/0233506 A1 | 10/2006 | Noonan et al. |
| 2006/0257092 A1 | 11/2006 | Lu et al. |
| 2006/0269204 A1 | 11/2006 | Barth et al. |
| 2006/0269208 A1 | 11/2006 | Allen et al. |
| 2006/0280420 A1 | 12/2006 | Blackwell et al. |
| 2006/0283619 A1 | 12/2006 | Kowalczyk et al. |
| 2006/0291787 A1 | 12/2006 | Seddon |
| 2007/0025665 A1 | 2/2007 | Dean et al. |
| 2007/0031100 A1 | 2/2007 | Garcia et al. |
| 2007/0031103 A1 | 2/2007 | Tinucci et al. |
| 2007/0036483 A1 | 2/2007 | Shin et al. |
| 2007/0041732 A1 | 2/2007 | Oki et al. |
| 2007/0047897 A1 | 3/2007 | Cooke et al. |
| 2007/0077010 A1 | 4/2007 | Melton et al. |
| 2007/0098343 A1 | 5/2007 | Miller et al. |
| 2007/0110374 A1 | 5/2007 | Oki et al. |
| 2007/0116413 A1 | 5/2007 | Cox |
| 2007/0127872 A1 | 6/2007 | Caveney et al. |
| 2007/0140642 A1 | 6/2007 | Mertesdorf et al. |
| 2007/0160327 A1 | 7/2007 | Lewallen et al. |
| 2007/0189674 A1 | 8/2007 | Scheibenreif et al. |
| 2007/0237484 A1 | 10/2007 | Reagan et al. |
| 2007/0263961 A1 | 11/2007 | Khemakhem et al. |
| 2007/0286554 A1 | 12/2007 | Kuffel et al. |
| 2008/0019641 A1 | 1/2008 | Elkins et al. |
| 2008/0020532 A1 | 1/2008 | Monfray et al. |
| 2008/0025670 A1 | 1/2008 | Castagna et al. |
| 2008/0044137 A1 | 2/2008 | Luther et al. |
| 2008/0044145 A1 | 2/2008 | Jenkins et al. |
| 2008/0069511 A1 | 3/2008 | Blackwell et al. |
| 2008/0080817 A1 | 4/2008 | Melton et al. |
| 2008/0112681 A1 | 5/2008 | Battey et al. |
| 2008/0131068 A1 | 6/2008 | Mertesdorf et al. |
| 2008/0138016 A1 | 6/2008 | Katagiyama et al. |
| 2008/0138025 A1 | 6/2008 | Reagan et al. |
| 2008/0142228 A1 | 6/2008 | Harvey et al. |
| 2008/0166906 A1 | 7/2008 | Nania et al. |
| 2008/0175541 A1 | 7/2008 | Lu et al. |
| 2008/0175542 A1 | 7/2008 | Lu et al. |
| 2008/0175544 A1 | 7/2008 | Fujiwara et al. |
| 2008/0175546 A1 | 7/2008 | Lu et al. |
| 2008/0175548 A1 | 7/2008 | Knecht et al. |
| 2008/0226252 A1 | 9/2008 | Mertesdorf et al. |
| 2008/0232743 A1 | 9/2008 | Gronvall et al. |
| 2008/0240658 A1 | 10/2008 | Leeman et al. |
| 2008/0260344 A1 | 10/2008 | Smith et al. |
| 2008/0260345 A1 | 10/2008 | Mertesdorf et al. |
| 2008/0264664 A1 | 10/2008 | Dinh et al. |
| 2008/0273837 A1 | 11/2008 | Margolin et al. |
| 2008/0310796 A1 | 12/2008 | Lu |
| 2008/0317415 A1 | 12/2008 | Hendrickson et al. |
| 2009/0003772 A1 | 1/2009 | Lu et al. |
| 2009/0003777 A1 | 1/2009 | Feldner |
| 2009/0034923 A1 | 2/2009 | Miller et al. |
| 2009/0041411 A1 | 2/2009 | Melton et al. |
| 2009/0041412 A1 | 2/2009 | Danley et al. |
| 2009/0060421 A1 | 3/2009 | Parikh et al. |
| 2009/0060423 A1 | 3/2009 | Melton et al. |
| 2009/0067791 A1 | 3/2009 | Greenwood et al. |
| 2009/0067849 A1 | 3/2009 | Oki et al. |
| 2009/0074363 A1 | 3/2009 | Parsons et al. |
| 2009/0074369 A1 | 3/2009 | Bolton et al. |
| 2009/0123115 A1 | 5/2009 | Gronvall et al. |
| 2009/0129729 A1 | 5/2009 | Caveney et al. |
| 2009/0136184 A1 | 5/2009 | Abernathy et al. |
| 2009/0148101 A1 | 6/2009 | Lu et al. |
| 2009/0148102 A1 | 6/2009 | Lu et al. |
| 2009/0148103 A1 | 6/2009 | Lu et al. |
| 2009/0148104 A1 | 6/2009 | Lu et al. |
| 2009/0148118 A1 | 6/2009 | Gronvall et al. |
| 2009/0148120 A1 | 6/2009 | Reagan et al. |
| 2009/0156041 A1 | 6/2009 | Radle |
| 2009/0162016 A1 | 6/2009 | Lu et al. |
| 2009/0185835 A1 | 7/2009 | Park et al. |
| 2009/0190895 A1 | 7/2009 | Reagan et al. |
| 2009/0238531 A1 | 9/2009 | Holmberg et al. |
| 2009/0245737 A1 | 10/2009 | Fujiwara et al. |
| 2009/0245743 A1 | 10/2009 | Cote et al. |
| 2009/0263097 A1 | 10/2009 | Solheid et al. |
| 2009/0297112 A1 | 12/2009 | Mertesdorf et al. |
| 2009/0317039 A1 | 12/2009 | Blazer et al. |
| 2009/0317045 A1 | 12/2009 | Reagan et al. |
| 2010/0008909 A1 | 1/2010 | Siadak et al. |
| 2010/0014813 A1 | 1/2010 | Ito et al. |
| 2010/0014824 A1 | 1/2010 | Lu et al. |
| 2010/0014867 A1 | 1/2010 | Ramanitra et al. |
| 2010/0015834 A1 | 1/2010 | Siebens |
| 2010/0021254 A1 | 1/2010 | Jenkins et al. |
| 2010/0034502 A1 | 2/2010 | Lu et al. |
| 2010/0040331 A1 | 2/2010 | Khemakhem et al. |
| 2010/0040338 A1 | 2/2010 | Sek |
| 2010/0054680 A1 | 3/2010 | Lochkovic et al. |
| 2010/0061685 A1 | 3/2010 | Kowalczyk et al. |
| 2010/0074578 A1 | 3/2010 | Imaizumi et al. |
| 2010/0080516 A1 | 4/2010 | Coleman et al. |
| 2010/0086260 A1 | 4/2010 | Parikh et al. |
| 2010/0086267 A1 | 4/2010 | Cooke et al. |
| 2010/0092129 A1 | 4/2010 | Conner |
| 2010/0092133 A1 | 4/2010 | Conner |
| 2010/0092136 A1 | 4/2010 | Nhep |
| 2010/0092146 A1 | 4/2010 | Conner et al. |
| 2010/0092169 A1 | 4/2010 | Conner et al. |
| 2010/0092171 A1 | 4/2010 | Conner |
| 2010/0129034 A1 | 5/2010 | Kuffel et al. |
| 2010/0144183 A1 | 6/2010 | Nania et al. |
| 2010/0172616 A1 | 7/2010 | Lu et al. |
| 2010/0197222 A1 | 8/2010 | Scheucher |
| 2010/0215321 A1 | 8/2010 | Jenkins |
| 2010/0220962 A1 | 9/2010 | Caveney et al. |
| 2010/0226615 A1 | 9/2010 | Reagan et al. |
| 2010/0232753 A1 | 9/2010 | Parris et al. |
| 2010/0247053 A1 | 9/2010 | Cowen et al. |
| 2010/0266242 A1 | 10/2010 | Lu et al. |
| 2010/0266244 A1 | 10/2010 | Lu et al. |
| 2010/0266245 A1 | 10/2010 | Sabo |
| 2010/0272399 A1 | 10/2010 | Griffiths et al. |
| 2010/0284662 A1 | 11/2010 | Reagan et al. |
| 2010/0290741 A1 | 11/2010 | Lu et al. |
| 2010/0303416 A1 | 12/2010 | Danley et al. |
| 2010/0303426 A1 | 12/2010 | Davis |

(56) References Cited

U.S. PATENT DOCUMENTS

| | | |
|---|---|---|
| 2010/0303427 A1 | 12/2010 | Rambow et al. |
| 2010/0310213 A1 | 12/2010 | Lewallen et al. |
| 2010/0322563 A1 | 12/2010 | Melton et al. |
| 2010/0329625 A1 | 12/2010 | Reagan et al. |
| 2011/0019964 A1 | 1/2011 | Nhep et al. |
| 2011/0033157 A1 | 2/2011 | Drouard |
| 2011/0044588 A1 | 2/2011 | Larson et al. |
| 2011/0047731 A1 | 3/2011 | Sugita et al. |
| 2011/0067452 A1 | 3/2011 | Gronvall et al. |
| 2011/0069932 A1 | 3/2011 | Overton et al. |
| 2011/0108719 A1 | 5/2011 | Ford et al. |
| 2011/0116749 A1 | 5/2011 | Kuffel et al. |
| 2011/0123157 A1 | 5/2011 | Belsan et al. |
| 2011/0123166 A1 | 5/2011 | Reagan et al. |
| 2011/0129185 A1 | 6/2011 | Lewallen et al. |
| 2011/0129186 A1 | 6/2011 | Lewallen et al. |
| 2011/0164854 A1 | 7/2011 | Desard et al. |
| 2011/0222826 A1 | 9/2011 | Blackburn et al. |
| 2011/0229098 A1 | 9/2011 | Abernathy et al. |
| 2011/0243506 A1 | 10/2011 | Hsu |
| 2011/0262099 A1 | 10/2011 | Castonguay et al. |
| 2011/0262100 A1 | 10/2011 | Reagan et al. |
| 2011/0299814 A1 | 12/2011 | Nakagawa |
| 2011/0305421 A1 | 12/2011 | Caveney et al. |
| 2012/0002925 A1 | 1/2012 | Nakagawa |
| 2012/0008909 A1 | 1/2012 | Mertesdorf et al. |
| 2012/0045179 A1 | 2/2012 | Theuerkorn |
| 2012/0057830 A1 | 3/2012 | Taira et al. |
| 2012/0063724 A1 | 3/2012 | Kuffel et al. |
| 2012/0063729 A1 | 3/2012 | Fujiwara et al. |
| 2012/0106912 A1 | 5/2012 | McGranahan et al. |
| 2012/0106913 A1 | 5/2012 | Makrides-Saravanos et al. |
| 2012/0134629 A1 | 5/2012 | Lu et al. |
| 2012/0183268 A1 | 7/2012 | De et al. |
| 2012/0213478 A1 | 8/2012 | Chen et al. |
| 2012/0251060 A1 | 10/2012 | Hurley |
| 2012/0251063 A1 | 10/2012 | Reagan et al. |
| 2012/0252244 A1 | 10/2012 | Elkins et al. |
| 2012/0257858 A1 | 10/2012 | Nhep |
| 2012/0275749 A1 | 11/2012 | Kuffel et al. |
| 2012/0321256 A1 | 12/2012 | Caveney et al. |
| 2013/0004122 A1 | 1/2013 | Kingsbury |
| 2013/0020480 A1 | 1/2013 | Ford et al. |
| 2013/0022317 A1 | 1/2013 | Norris et al. |
| 2013/0034333 A1 | 2/2013 | Holmberg et al. |
| 2013/0051734 A1 | 2/2013 | Shen et al. |
| 2013/0064506 A1 | 3/2013 | Eberle et al. |
| 2013/0094821 A1 | 4/2013 | Logan |
| 2013/0109213 A1 | 5/2013 | Chang |
| 2013/0114930 A1 | 5/2013 | Smith et al. |
| 2013/0136402 A1 | 5/2013 | Kuffel et al. |
| 2013/0170834 A1 | 7/2013 | Cho et al. |
| 2013/0209099 A1 | 8/2013 | Reagan et al. |
| 2013/0236139 A1 | 9/2013 | Chen et al. |
| 2013/0266562 A1 | 10/2013 | Siadak et al. |
| 2013/0315538 A1 | 11/2013 | Kuffel et al. |
| 2014/0016902 A1 | 1/2014 | Pepe et al. |
| 2014/0029897 A1 | 1/2014 | Shimazu et al. |
| 2014/0044397 A1 | 2/2014 | Hikosaka et al. |
| 2014/0050446 A1 | 2/2014 | Chang |
| 2014/0056561 A1 | 2/2014 | Lu et al. |
| 2014/0079356 A1 | 3/2014 | Pepin et al. |
| 2014/0133804 A1 | 5/2014 | Lu et al. |
| 2014/0133806 A1 | 5/2014 | Hill et al. |
| 2014/0133807 A1 | 5/2014 | Katoh |
| 2014/0133808 A1 | 5/2014 | Hill et al. |
| 2014/0153876 A1 | 6/2014 | Dendas et al. |
| 2014/0153878 A1 | 6/2014 | Mullaney |
| 2014/0161397 A1 | 6/2014 | Gallegos et al. |
| 2014/0205257 A1 | 7/2014 | Durrant et al. |
| 2014/0219609 A1 | 8/2014 | Nielson et al. |
| 2014/0219622 A1 | 8/2014 | Coan et al. |
| 2014/0233896 A1 | 8/2014 | Ishigami et al. |
| 2014/0241670 A1 | 8/2014 | Barnette et al. |
| 2014/0241671 A1 | 8/2014 | Koreeda et al. |
| 2014/0241689 A1 | 8/2014 | Bradley et al. |
| 2014/0254987 A1 | 9/2014 | Caveney et al. |
| 2014/0294395 A1 | 10/2014 | Waldron et al. |
| 2014/0314379 A1 | 10/2014 | Lu et al. |
| 2014/0328559 A1 | 11/2014 | Kobayashi et al. |
| 2014/0341511 A1 | 11/2014 | Daems et al. |
| 2014/0348467 A1 | 11/2014 | Cote et al. |
| 2014/0355936 A1 | 12/2014 | Bund et al. |
| 2015/0003787 A1 | 1/2015 | Chen et al. |
| 2015/0003788 A1 | 1/2015 | Chen et al. |
| 2015/0036982 A1 | 2/2015 | Nhep et al. |
| 2015/0110451 A1 | 4/2015 | Blazer et al. |
| 2015/0115545 A1 | 4/2015 | Kempeneers et al. |
| 2015/0144883 A1 | 5/2015 | Sendelweck |
| 2015/0153532 A1 | 6/2015 | Holmberg et al. |
| 2015/0168657 A1 | 6/2015 | Islam |
| 2015/0183869 A1 | 7/2015 | Siadak et al. |
| 2015/0185423 A1 | 7/2015 | Matsui et al. |
| 2015/0253527 A1 | 9/2015 | Hill et al. |
| 2015/0253528 A1 | 9/2015 | Corbille et al. |
| 2015/0268423 A1 | 9/2015 | Burkholder et al. |
| 2015/0268424 A1 | 9/2015 | Koreeda et al. |
| 2015/0268434 A1 | 9/2015 | Barnette et al. |
| 2015/0270626 A1 | 9/2015 | Bishop |
| 2015/0286011 A1 | 10/2015 | Nhep |
| 2015/0293310 A1 | 10/2015 | Kanno |
| 2015/0309274 A1 | 10/2015 | Hurley et al. |
| 2015/0316727 A1 | 11/2015 | Kondo et al. |
| 2015/0346435 A1 | 12/2015 | Kato |
| 2015/0346436 A1 | 12/2015 | Pepe et al. |
| 2016/0015885 A1 | 1/2016 | Pananen et al. |
| 2016/0018605 A1 | 1/2016 | Ott et al. |
| 2016/0041346 A1 | 2/2016 | Barnette et al. |
| 2016/0062053 A1 | 3/2016 | Mullaney |
| 2016/0085032 A1 | 3/2016 | Lu et al. |
| 2016/0109671 A1 | 4/2016 | Coan et al. |
| 2016/0116686 A1 | 4/2016 | Durrant et al. |
| 2016/0126667 A1 | 5/2016 | Droesbeke et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0154184 A1 | 6/2016 | Bund et al. |
| 2016/0154186 A1 | 6/2016 | Gimblet et al. |
| 2016/0161682 A1 | 6/2016 | Nishimura |
| 2016/0161688 A1 | 6/2016 | Nishimura |
| 2016/0161689 A1 | 6/2016 | Nishimura |
| 2016/0187590 A1 | 6/2016 | Lu |
| 2016/0202431 A1 | 7/2016 | Hill et al. |
| 2016/0209599 A1 | 7/2016 | Van et al. |
| 2016/0209602 A1 | 7/2016 | Theuerkorn |
| 2016/0209605 A1 | 7/2016 | Lu et al. |
| 2016/0216468 A1 | 7/2016 | Gimblet et al. |
| 2016/0238810 A1 | 8/2016 | Hubbard et al. |
| 2016/0246019 A1 | 8/2016 | Ishii et al. |
| 2016/0249019 A1 | 8/2016 | Westwick et al. |
| 2016/0259133 A1 | 9/2016 | Kobayashi et al. |
| 2016/0259134 A1 | 9/2016 | Daems et al. |
| 2016/0306122 A1 | 10/2016 | Tong et al. |
| 2016/0327754 A1 | 11/2016 | Hill et al. |
| 2016/0349458 A1 | 12/2016 | Murray et al. |
| 2016/0356963 A1 | 12/2016 | Liu et al. |
| 2016/0359266 A1 | 12/2016 | Wang et al. |
| 2017/0018875 A1 | 1/2017 | Bauer et al. |
| 2017/0023758 A1 | 1/2017 | Reagan et al. |
| 2017/0038538 A1 | 2/2017 | Isenhour et al. |
| 2017/0045699 A1 | 2/2017 | Coan et al. |
| 2017/0052325 A1 | 2/2017 | Mullaney et al. |
| 2017/0059784 A1 | 3/2017 | Gniadek et al. |
| 2017/0123163 A1 | 5/2017 | Lu et al. |
| 2017/0123165 A1 | 5/2017 | Barnette et al. |
| 2017/0131509 A1 | 5/2017 | Xiao et al. |
| 2017/0139158 A1 | 5/2017 | Coenegracht |
| 2017/0160492 A1 | 6/2017 | Lin et al. |
| 2017/0168248 A1 | 6/2017 | Hayauchi et al. |
| 2017/0168256 A1 | 6/2017 | Reagan et al. |
| 2017/0170596 A1 | 6/2017 | Goossens et al. |
| 2017/0176252 A1 | 6/2017 | Marple et al. |
| 2017/0176690 A1 | 6/2017 | Bretz et al. |
| 2017/0182160 A1 | 6/2017 | Siadak et al. |

(56) References Cited

U.S. PATENT DOCUMENTS

| | | |
|---|---|---|
| 2017/0212313 A1 | 7/2017 | Elenabaas et al. |
| 2017/0219782 A1 | 8/2017 | Nishimura |
| 2017/0235067 A1 | 8/2017 | Holmberg et al. |
| 2017/0238822 A1 | 8/2017 | Young et al. |
| 2017/0254961 A1 | 9/2017 | Kamada et al. |
| 2017/0254962 A1 | 9/2017 | Mueller-Schlomka et al. |
| 2017/0261696 A1 | 9/2017 | Compton et al. |
| 2017/0261698 A1 | 9/2017 | Compton et al. |
| 2017/0261699 A1 | 9/2017 | Compton et al. |
| 2017/0285275 A1 | 10/2017 | Hill et al. |
| 2017/0285279 A1 | 10/2017 | Daems et al. |
| 2017/0288315 A1 | 10/2017 | Scheucher |
| 2017/0293091 A1 | 10/2017 | Lu et al. |
| 2017/0307828 A1 | 10/2017 | Elenbaas |
| 2017/0336587 A1 | 11/2017 | Coan et al. |
| 2017/0343741 A1 | 11/2017 | Coenegracht et al. |
| 2017/0343745 A1 | 11/2017 | Rosson |
| 2017/0351037 A1 | 12/2017 | Watanabe et al. |
| 2017/0363817 A1 | 12/2017 | Kempeneers et al. |
| 2018/0003902 A1 | 1/2018 | Rosson et al. |
| 2018/0031774 A1 | 2/2018 | Van et al. |
| 2018/0079569 A1 | 3/2018 | Simpson |
| 2018/0081127 A1 | 3/2018 | Coenegracht |
| 2018/0143386 A1 | 5/2018 | Coan et al. |
| 2018/0151960 A1 | 5/2018 | Scheucher |
| 2018/0180831 A1 | 6/2018 | Blazer et al. |
| 2018/0224610 A1 | 8/2018 | Pimentel et al. |
| 2018/0239094 A1 | 8/2018 | Barnette et al. |
| 2018/0246283 A1 | 8/2018 | Pepe et al. |
| 2018/0259721 A1 | 9/2018 | Bund et al. |
| 2018/0267243 A1 | 9/2018 | Nhep et al. |
| 2018/0267265 A1 | 9/2018 | Zhang et al. |
| 2018/0321448 A1 | 11/2018 | Wu et al. |
| 2018/0329149 A1 | 11/2018 | Mullaney et al. |
| 2018/0348447 A1 | 12/2018 | Nhep et al. |
| 2018/0372962 A1 | 12/2018 | Isenhour et al. |
| 2019/0004251 A1 | 1/2019 | Dannoux et al. |
| 2019/0004252 A1 | 1/2019 | Rosson |
| 2019/0004255 A1 | 1/2019 | Dannoux et al. |
| 2019/0004256 A1 | 1/2019 | Rosson |
| 2019/0004258 A1 | 1/2019 | Dannoux et al. |
| 2019/0011641 A1 | 1/2019 | Isenhour et al. |
| 2019/0014987 A1 | 1/2019 | Sasaki et al. |
| 2019/0018210 A1 | 1/2019 | Coan et al. |
| 2019/0033531 A1 | 1/2019 | Taira et al. |
| 2019/0033532 A1 | 1/2019 | Gimblet et al. |
| 2019/0038743 A1 | 2/2019 | Siadak et al. |
| 2019/0041584 A1 | 2/2019 | Coenegracht et al. |
| 2019/0041585 A1 | 2/2019 | Bretz et al. |
| 2019/0041595 A1 | 2/2019 | Reagan et al. |
| 2019/0058259 A1 | 2/2019 | Scheucher |
| 2019/0107677 A1 | 4/2019 | Coenegracht et al. |
| 2019/0147202 A1 | 5/2019 | Harney |
| 2019/0162910 A1 | 5/2019 | Gurreri |
| 2019/0162914 A1 | 5/2019 | Baca et al. |
| 2019/0170961 A1 | 6/2019 | Coenegracht et al. |
| 2019/0187396 A1 | 6/2019 | Finnegan et al. |
| 2019/0235177 A1 | 8/2019 | Lu et al. |
| 2019/0250338 A1 | 8/2019 | Mullaney et al. |
| 2019/0258010 A1 | 8/2019 | Anderson et al. |
| 2019/0271817 A1 | 9/2019 | Coenegracht |
| 2019/0324217 A1 | 10/2019 | Lu et al. |
| 2019/0339460 A1 | 11/2019 | Dannoux et al. |
| 2019/0339461 A1 | 11/2019 | Dannoux et al. |
| 2019/0339475 A1 | 11/2019 | Takano et al. |
| 2019/0361177 A1 | 11/2019 | Aoshima et al. |
| 2019/0369336 A1 | 12/2019 | Van et al. |
| 2019/0369345 A1 | 12/2019 | Reagan et al. |
| 2019/0374637 A1 | 12/2019 | Siadak et al. |
| 2020/0003963 A1 | 1/2020 | Izumi et al. |
| 2020/0012051 A1 | 1/2020 | Coenegracht et al. |
| 2020/0036101 A1 | 1/2020 | Scheucher |
| 2020/0049922 A1 | 2/2020 | Rosson |
| 2020/0057205 A1 | 2/2020 | Dannoux et al. |
| 2020/0057222 A1 | 2/2020 | Dannoux et al. |
| 2020/0057223 A1 | 2/2020 | Dannoux et al. |
| 2020/0057224 A1 | 2/2020 | Dannoux et al. |
| 2020/0057723 A1 | 2/2020 | Chirca et al. |
| 2020/0096705 A1 | 3/2020 | Rosson |
| 2020/0096709 A1 | 3/2020 | Rosson |
| 2020/0096710 A1 | 3/2020 | Rosson |
| 2020/0103599 A1 | 4/2020 | Rosson |
| 2020/0103608 A1 | 4/2020 | Hill et al. |
| 2020/0110229 A1 | 4/2020 | Dannoux et al. |
| 2020/0110234 A1 | 4/2020 | Holmberg et al. |
| 2020/0116949 A1 | 4/2020 | Rosson |
| 2020/0116952 A1 | 4/2020 | Rosson |
| 2020/0116953 A1 | 4/2020 | Rosson |
| 2020/0116954 A1 | 4/2020 | Rosson |
| 2020/0116955 A1 | 4/2020 | Ho et al. |
| 2020/0116958 A1 | 4/2020 | Dannoux et al. |
| 2020/0116962 A1 | 4/2020 | Dannoux et al. |
| 2020/0124805 A1 | 4/2020 | Rosson et al. |
| 2020/0124812 A1 | 4/2020 | Pannoux et al. |
| 2020/0132939 A1 | 4/2020 | Coenegracht et al. |
| 2020/0132941 A1 | 4/2020 | Otsuka et al. |
| 2020/0150356 A1 | 5/2020 | Lu |
| 2020/0174201 A1 | 6/2020 | Cote et al. |
| 2020/0174214 A1 | 6/2020 | Alves et al. |
| 2020/0183097 A1 | 6/2020 | Chang et al. |
| 2020/0192042 A1 | 6/2020 | Coan et al. |
| 2020/0209492 A1 | 7/2020 | Rosson |
| 2020/0218017 A1 | 7/2020 | Coenegracht |
| 2020/0225422 A1 | 7/2020 | Van et al. |
| 2020/0225424 A1 | 7/2020 | Coenegracht |
| 2020/0241211 A1 | 7/2020 | Shonkwiler et al. |
| 2020/0301090 A1 | 9/2020 | Petersen et al. |
| 2020/0348476 A1 | 11/2020 | Hill et al. |
| 2020/0371306 A1 | 11/2020 | Mosier et al. |
| 2020/0393629 A1 | 12/2020 | Hill et al. |
| 2021/0132302 A1 | 5/2021 | Wong et al. |
| 2021/0149124 A1 | 5/2021 | Higley et al. |
| 2021/0149140 A1 | 5/2021 | Jensen |
| 2021/0278607 A1 | 9/2021 | Cote et al. |
| 2021/0278687 A1 | 9/2021 | Tsuchiya |
| 2021/0288609 A1 | 9/2021 | Yan et al. |
| 2021/0318499 A1 | 10/2021 | Cote et al. |
| 2022/0236497 A1 | 7/2022 | Calvin et al. |

FOREIGN PATENT DOCUMENTS

| | | |
|---|---|---|
| CN | 1071012 A | 4/1993 |
| CN | 1213783 A | 4/1999 |
| CN | 1231430 A | 10/1999 |
| CN | 1114839 C | 7/2003 |
| CN | 1646962 A | 7/2005 |
| CN | 1833188 A | 9/2006 |
| CN | 1922523 A | 2/2007 |
| CN | 1985205 A | 6/2007 |
| CN | 101084461 A | 12/2007 |
| CN | 101111790 A | 1/2008 |
| CN | 101195453 A | 6/2008 |
| CN | 201408274 Y | 2/2010 |
| CN | 201522561 U | 7/2010 |
| CN | 101806939 A | 8/2010 |
| CN | 101846773 A | 9/2010 |
| CN | 101866034 A | 10/2010 |
| CN | 101939680 A | 1/2011 |
| CN | 201704194 U | 1/2011 |
| CN | 102141655 A | 8/2011 |
| CN | 102346281 A | 2/2012 |
| CN | 202282523 U | 6/2012 |
| CN | 203224645 U | 10/2013 |
| CN | 203396982 U | 1/2014 |
| CN | 103713362 A | 4/2014 |
| CN | 103782209 A | 5/2014 |
| CN | 104007514 A | 8/2014 |
| CN | 104064903 A | 9/2014 |
| CN | 104280830 A | 1/2015 |
| CN | 104603656 A | 5/2015 |
| CN | 104704411 A | 6/2015 |
| CN | 105467529 A | 4/2016 |
| CN | 105492946 A | 4/2016 |
| CN | 105683795 A | 6/2016 |

(56) References Cited

FOREIGN PATENT DOCUMENTS

| | | |
|---|---|---|
| CN | 106716205 A | 5/2017 |
| CN | 106873086 A | 6/2017 |
| CN | 110608208 A | 12/2019 |
| CN | 110954996 A | 4/2020 |
| DE | 3537684 A1 | 4/1987 |
| DE | 3737842 C1 | 9/1988 |
| DE | 19805554 A1 | 8/1998 |
| EP | 0012566 A1 | 6/1980 |
| EP | 0026553 A1 | 4/1981 |
| EP | 0122566 A2 | 10/1984 |
| EP | 0130513 A2 | 1/1985 |
| EP | 0244791 A2 | 11/1987 |
| EP | 0462362 A2 | 12/1991 |
| EP | 0468671 A1 | 1/1992 |
| EP | 0469671 A1 | 2/1992 |
| EP | 0547778 A1 | 6/1993 |
| EP | 0547788 A1 | 6/1993 |
| EP | 0762171 A1 | 3/1997 |
| EP | 0782025 A1 | 7/1997 |
| EP | 0855610 A2 | 7/1998 |
| EP | 0856751 A1 | 8/1998 |
| EP | 0856761 A1 | 8/1998 |
| EP | 0940700 A2 | 9/1999 |
| EP | 0949522 A2 | 10/1999 |
| EP | 0957381 A1 | 11/1999 |
| EP | 0978746 A1 | 2/2000 |
| EP | 0997757 A2 | 5/2000 |
| EP | 1065542 A1 | 1/2001 |
| EP | 1122566 A2 | 8/2001 |
| EP | 1243957 A2 | 9/2002 |
| EP | 1258758 A2 | 11/2002 |
| EP | 1391762 A1 | 2/2004 |
| EP | 1431786 A2 | 6/2004 |
| EP | 1438622 A2 | 7/2004 |
| EP | 1678537 A1 | 7/2006 |
| EP | 1759231 A1 | 3/2007 |
| EP | 1810062 A1 | 7/2007 |
| EP | 2069845 A2 | 6/2009 |
| EP | 2149063 A1 | 2/2010 |
| EP | 2150847 A1 | 2/2010 |
| EP | 2193395 A1 | 6/2010 |
| EP | 2255233 A1 | 12/2010 |
| EP | 2333597 A2 | 6/2011 |
| EP | 2362253 A1 | 8/2011 |
| EP | 2401641 A1 | 1/2012 |
| EP | 2609458 A1 | 7/2013 |
| EP | 2622395 A1 | 8/2013 |
| EP | 2734879 A1 | 5/2014 |
| EP | 2815259 A1 | 12/2014 |
| EP | 2817667 A1 | 12/2014 |
| EP | 2992372 A1 | 3/2016 |
| EP | 3022596 A1 | 5/2016 |
| EP | 3064973 A2 | 9/2016 |
| EP | 3101740 A1 | 12/2016 |
| EP | 3207223 A1 | 8/2017 |
| EP | 3234672 A1 | 10/2017 |
| EP | 3245545 A1 | 11/2017 |
| EP | 3265859 A1 | 1/2018 |
| EP | 3336992 A1 | 6/2018 |
| EP | 3362830 A1 | 8/2018 |
| EP | 3427096 A1 | 1/2019 |
| EP | 3443395 A1 | 2/2019 |
| EP | 3535614 A1 | 9/2019 |
| EP | 3537197 A1 | 9/2019 |
| EP | 3646074 A1 | 5/2020 |
| EP | 3646079 A1 | 5/2020 |
| EP | 3403125 B1 | 7/2021 |
| ES | 1184287 U | 5/2017 |
| FR | 2485754 A1 | 12/1981 |
| GB | 2022284 A | 12/1979 |
| GB | 2154333 A | 9/1985 |
| GB | 2169094 A | 7/1986 |
| GB | 6192781 | 2/2022 |
| GB | 6192782 | 2/2022 |
| GB | 6192783 | 2/2022 |
| GB | 6192784 | 2/2022 |
| IN | 201404194 Y | 2/2010 |
| JP | 52-030447 A | 3/1977 |
| JP | 58-142308 A | 8/1983 |
| JP | 61-145509 A | 7/1986 |
| JP | 62-054204 A | 3/1987 |
| JP | 63-020111 A | 1/1988 |
| JP | 63-078908 A | 4/1988 |
| JP | 63-089421 A | 4/1988 |
| JP | 03-063615 A | 3/1991 |
| JP | 03-207223 A | 9/1991 |
| JP | 05-106765 A | 4/1993 |
| JP | 05-142439 A | 6/1993 |
| JP | 05-297246 A | 11/1993 |
| JP | 06-320111 A | 11/1994 |
| JP | 07-318758 A | 12/1995 |
| JP | 08-050211 A | 2/1996 |
| JP | 08-054522 A | 2/1996 |
| JP | 08-062432 A | 3/1996 |
| JP | 08-292331 A | 11/1996 |
| JP | 09-049942 A | 2/1997 |
| JP | 09-135526 A | 5/1997 |
| JP | 09-159867 A | 6/1997 |
| JP | 09-203831 A | 8/1997 |
| JP | 09-325223 A | 12/1997 |
| JP | 09-325249 A | 12/1997 |
| JP | 10-170781 A | 6/1998 |
| JP | 10-332953 A | 12/1998 |
| JP | 10-339826 A | 12/1998 |
| JP | 11-064682 A | 3/1999 |
| JP | 11-119064 A | 4/1999 |
| JP | 11-248979 A | 9/1999 |
| JP | 11-271582 A | 10/1999 |
| JP | 11-281861 A | 10/1999 |
| JP | 11-326693 A | 11/1999 |
| JP | 11-337768 A | 12/1999 |
| JP | 11-352368 A | 12/1999 |
| JP | 2000-002828 A | 1/2000 |
| JP | 2001-116968 A | 4/2001 |
| JP | 2001-290051 A | 10/2001 |
| JP | 2002-520987 A | 7/2002 |
| JP | 3296698 B2 | 7/2002 |
| JP | 2002-250987 A | 9/2002 |
| JP | 2003-009331 A | 1/2003 |
| JP | 2003-070143 A | 3/2003 |
| JP | 2003-121699 A | 4/2003 |
| JP | 2003-177279 A | 6/2003 |
| JP | 2003-302561 A | 10/2003 |
| JP | 2004-361521 A | 12/2004 |
| JP | 2005-024789 A | 1/2005 |
| JP | 2005-031544 A | 2/2005 |
| JP | 2005-077591 A | 3/2005 |
| JP | 2005-114860 A | 4/2005 |
| JP | 2005-520987 A | 7/2005 |
| JP | 2006-023502 A | 1/2006 |
| JP | 2006-146084 A | 6/2006 |
| JP | 2006-259631 A | 9/2006 |
| JP | 2006-337637 A | 12/2006 |
| JP | 2007-078740 A | 3/2007 |
| JP | 2007-121859 A | 5/2007 |
| JP | 2008-191422 A | 8/2008 |
| JP | 2008-250360 A | 10/2008 |
| JP | 2009-265208 A | 11/2009 |
| JP | 2010-152084 A | 7/2010 |
| JP | 2010-191420 A | 9/2010 |
| JP | 2011-018003 A | 1/2011 |
| JP | 2011-033698 A | 2/2011 |
| JP | 2013-041089 A | 2/2013 |
| JP | 2013-156580 A | 8/2013 |
| JP | 2014-085474 A | 5/2014 |
| JP | 2014-095834 A | 5/2014 |
| JP | 2014-134746 A | 7/2014 |
| JP | 5537852 B2 | 7/2014 |
| JP | 5538328 B2 | 7/2014 |
| JP | 2014-157214 A | 8/2014 |
| JP | 2014-219441 A | 11/2014 |
| JP | 2015-125217 A | 7/2015 |
| JP | 2016-109816 A | 6/2016 |
| JP | 2016-109817 A | 6/2016 |

(56) References Cited

FOREIGN PATENT DOCUMENTS

| | | |
|---|---|---|
| JP | 2016-109819 A | 6/2016 |
| JP | 2016-156916 A | 9/2016 |
| JP | 3207223 U | 11/2016 |
| JP | 3207233 U | 11/2016 |
| KR | 10-2013-0081087 A | 7/2013 |
| RU | 2402794 C1 | 10/2010 |
| TW | 222688 B | 4/1994 |
| WO | 94/25885 A1 | 11/1994 |
| WO | 98/36304 A1 | 8/1998 |
| WO | 01/27660 A2 | 4/2001 |
| WO | 01/92927 A2 | 12/2001 |
| WO | 01/92937 A1 | 12/2001 |
| WO | 02/25340 A1 | 3/2002 |
| WO | 03/36358 A2 | 5/2003 |
| WO | 2004/061509 A1 | 7/2004 |
| WO | 2005/045494 A1 | 5/2005 |
| WO | 2005/066674 A2 | 7/2005 |
| WO | 2006/009597 A1 | 1/2006 |
| WO | 2006/052420 A1 | 5/2006 |
| WO | 2006/113726 A1 | 10/2006 |
| WO | 2006/123777 A1 | 11/2006 |
| WO | 2008/027201 A2 | 3/2008 |
| WO | 2008/029072 A1 | 3/2008 |
| WO | 2008/150408 A1 | 12/2008 |
| WO | 2008/150423 A1 | 12/2008 |
| WO | 2009/042066 A1 | 4/2009 |
| WO | 2009/113819 A1 | 9/2009 |
| WO | 2009/117060 A1 | 9/2009 |
| WO | 2009/126411 A1 | 10/2009 |
| WO | 2009/148797 A1 | 12/2009 |
| WO | 2009/154990 A2 | 12/2009 |
| WO | 2010/092009 A1 | 8/2010 |
| WO | 2010/099141 A1 | 9/2010 |
| WO | 2011/044090 A2 | 4/2011 |
| WO | 2011/047111 A1 | 4/2011 |
| WO | 2012/027313 A1 | 3/2012 |
| WO | 2012/037727 A1 | 3/2012 |
| WO | 2012/044741 A1 | 4/2012 |
| WO | 2012/074688 A2 | 6/2012 |
| WO | 2012/163052 A1 | 12/2012 |
| WO | 2013/016042 A1 | 1/2013 |
| WO | 2013/055714 A1 | 4/2013 |
| WO | 2013/083729 A2 | 6/2013 |
| WO | 2013/122752 A1 | 8/2013 |
| WO | 2013/126488 A1 | 8/2013 |
| WO | 2013/177016 A1 | 11/2013 |
| WO | 2014/151259 A1 | 9/2014 |
| WO | 2014/167447 A1 | 10/2014 |
| WO | 2014/179411 A1 | 11/2014 |
| WO | 2014/197894 A1 | 12/2014 |
| WO | 2015/009435 A1 | 1/2015 |
| WO | 2015/144883 A1 | 10/2015 |
| WO | 2015/047508 A1 | 12/2015 |
| WO | 2015/197588 A1 | 12/2015 |
| WO | 2016/059320 A1 | 4/2016 |
| WO | 2016/073862 A2 | 5/2016 |
| WO | 2016/095213 A1 | 6/2016 |
| WO | 2016/100078 A1 | 6/2016 |
| WO | 2016/115288 A1 | 7/2016 |
| WO | 2016/156610 A1 | 10/2016 |
| WO | 2016/168389 A1 | 10/2016 |
| WO | 2017/063107 A1 | 4/2017 |
| WO | 2017/146722 A1 | 8/2017 |
| WO | 2017/155754 A1 | 9/2017 |
| WO | 2017/178920 A1 | 10/2017 |
| WO | 2018/083561 A1 | 5/2018 |
| WO | 2018/175123 A1 | 9/2018 |
| WO | 2018/204864 A1 | 11/2018 |
| WO | 2019/005190 A2 | 1/2019 |
| WO | 2019/005191 A1 | 1/2019 |
| WO | 2019/005192 A1 | 1/2019 |
| WO | 2019/005193 A1 | 1/2019 |
| WO | 2019/005194 A1 | 1/2019 |
| WO | 2019/005195 A1 | 1/2019 |
| WO | 2019/005196 A1 | 1/2019 |
| WO | 2019/005197 A1 | 1/2019 |
| WO | 2019/005198 A1 | 1/2019 |
| WO | 2019/005199 A1 | 1/2019 |
| WO | 2019/005200 A1 | 1/2019 |
| WO | 2019/005201 A1 | 1/2019 |
| WO | 2019/005202 A1 | 1/2019 |
| WO | 2019/005203 A1 | 1/2019 |
| WO | 2019/005204 A1 | 1/2019 |
| WO | 2019/005789 A1 | 1/2019 |
| WO | 2019/006121 A1 | 1/2019 |
| WO | 2019/006176 A1 | 1/2019 |
| WO | 2019/006191 A1 | 1/2019 |
| WO | 2019/036339 A1 | 2/2019 |
| WO | 2019/126333 A1 | 6/2019 |
| WO | 2019/195652 A1 | 10/2019 |
| WO | 2020/101850 A1 | 5/2020 |
| WO | 2020/242847 A1 | 12/2020 |
| WO | 2022/115271 A1 | 6/2022 |

OTHER PUBLICATIONS

Clearfield, "Fieldshield Optical Fiber Protection System: Installation Manual." for part No. 016164. Last Updated Dec. 2014. 37 pgs.

Clearfield, "FieldShield SC and LC Pushable Connectors," Last Updated Jun. 1, 2018, 2 pgs.

Clearfield, "FieldShield SmarTerminal: Hardened Pushable Connectors" Last Updated Jun. 29, 2018, 2 pgs.

CoolShirt fittings, https://www.amazon.com/Cool-Shirt-5014-0001-Release-Connectors/dp/B01LXBXYJ9, Sep. 23, 2016 (Year: 2016).

Corning Cable Systems, "SST Figure-8 Drop Cables 1-12 Fibers", Preliminary Product Specifications, 11 pgs. (2002).

Corning Cable Systems, "SST-Drop (Dielectric) Cables 1-12 Fibers", Product Specifications, 2 pgs. (2002).

Digital Optical Audio Cable Toslink Cable. Date: Jun. 27, 2019 [online], [Site visited Mar. 2, 2021], Available from Internet URL: https://www.amazon.com/dp/B07TJMP4TP/ (Year: 2019).

Faulkner et al. "Optical networks for local lopp applications," J. Lightwave Technol.0733-8724 7(11), 17411751 (1989).

Fiber Systems International: Fiber Optic Solutions, data, "TFOCA-11 4-Channel Fiber Optic Connector" sheet. 2003, 2 pgs.

Gold Plated Toslink. Date: Feb. 5, 2015. [online], [Site visited Mar. 2, 2021], Available from Internet URL: https://www.amazon.com/dp/B00T8HWV62/ (Year: 2015).

Liu et al., "Variable optical power splitters create new apps", Retrieved from: https://www.lightwaveonline.com/fttx/pon-systems/article/16648432/variable-optical-power-splitters-create-new-apps, 2005, 14 pages.

Infolite—Design and Data Specifications, 1 pg. Retrieved Feb. 21, 2019.

Nawata, "Multimode and Single-Mode Fiber Connectors Technology"; IEEE Journal of Quantum Electronics, vol. QE-16, No. 6 Published Jun. 1980.

Optical connector. (Design—(Copyrights) Questel) orbit.com. [Online PDF compilation of references selected by 3 [examiner] 20 pgs. Print Dates Range Mar. 9, 2003-May 25, 2015. [Retrieved Feb. 3, 2021] https://www.orbit.com/export/UCZAH96B/pdf4/81c7766a-d250-4555-a8f1-3bdf9dc 1 bd6c-185304.pdf (Year: 2021).

Ramanitra et al. "Optical access network using a self-latching variable splitter remotely powered through an optical fiber link," Optical Engineering 46(4) p. 45007-1-9, Apr. 2007.

Ratnam et al. "Burst switching using variable optical splitter based switches with wavelength conversion," ICIIS 2017—Poeceedings Jan. 2018, pp. 1-6.

Schneier, Bruce; "Applied Cryptography: Protocols, Algorithms, and Source Code in C," Book. 1995 SEC. 10.3, 12.2, 165 Pgs.

Stratos: Lightwave., "Innovation Brought to Light", Hybrid HMA Series, Hybrid Multi Application, 2 Pgs, Jul. 16, 2002.

UPC Optic Fiber Quick Connector. Date: May 13, 2016 [online], [Site visited Mar. 2, 2021], Available from Internet URL: https://www.amazon.com/dp/B01FLUV5DE/ (Year: 2016).

Wang et al. "Opto-VLSI-based dynamic optical splitter," Electron. Lett.0013-5194 10.1049/el:20046715 40(22), F14451446 (2004).

(56) References Cited

OTHER PUBLICATIONS

Xiao et al. "1xN wavelength selective adaptive optical power splitter for wavelength-division-multiplexed passive optical networks," Optics & Laser Technology 68, pp. 160-164, May 2015.

* cited by examiner

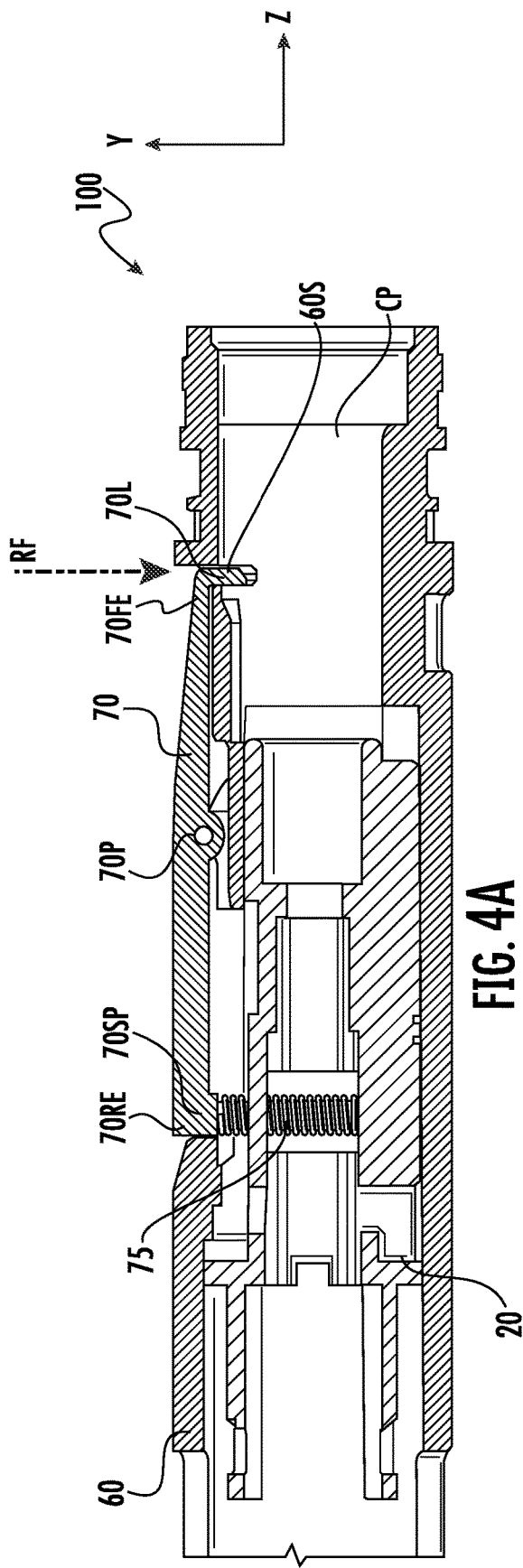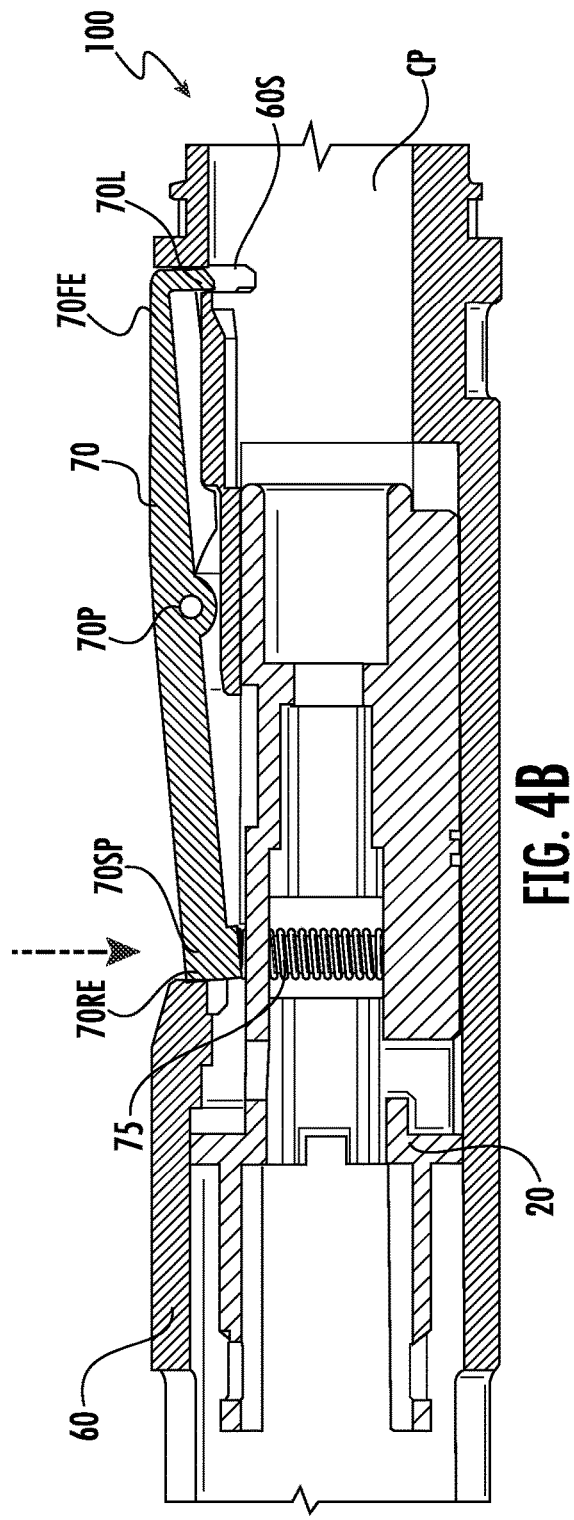
FIG. 4A
FIG. 4B

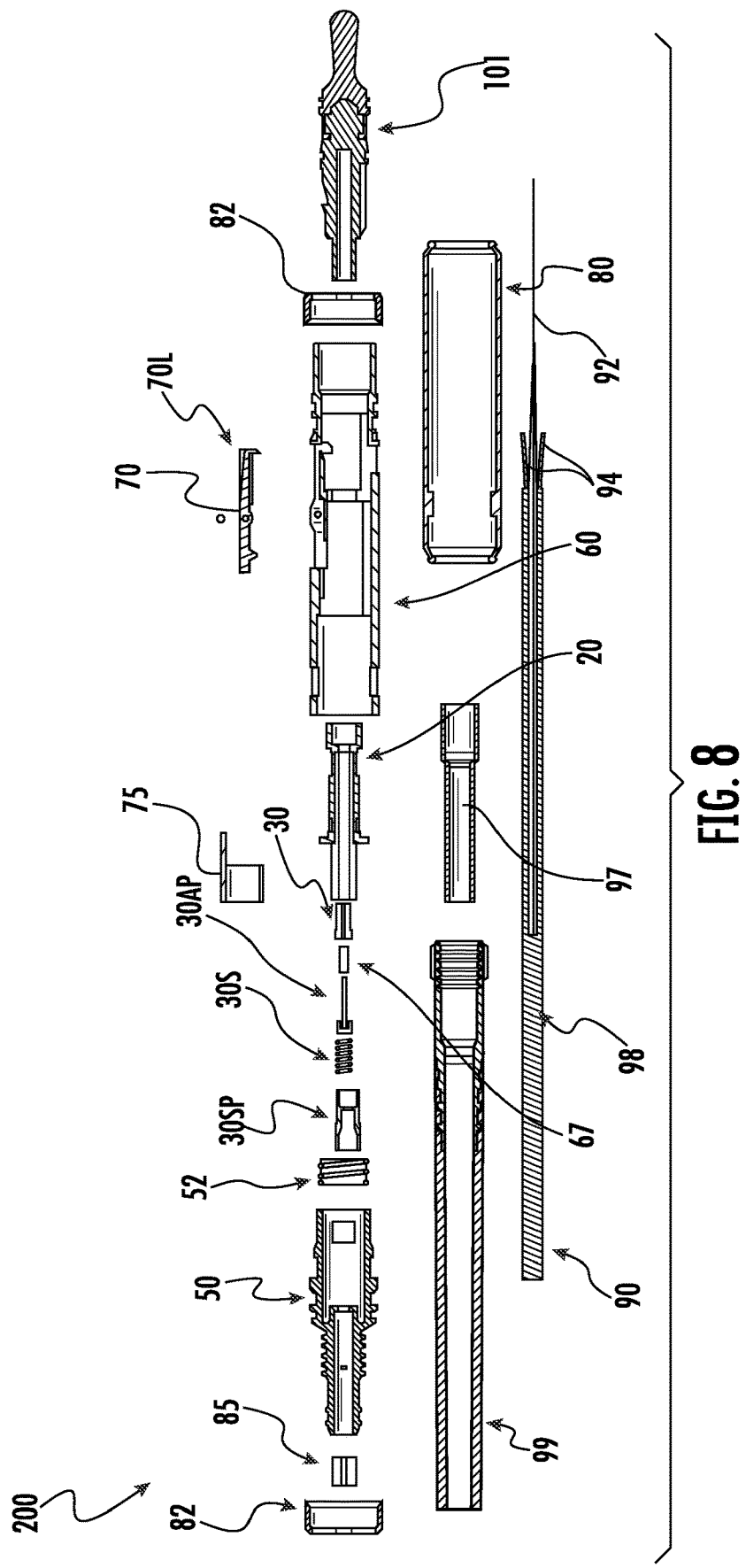

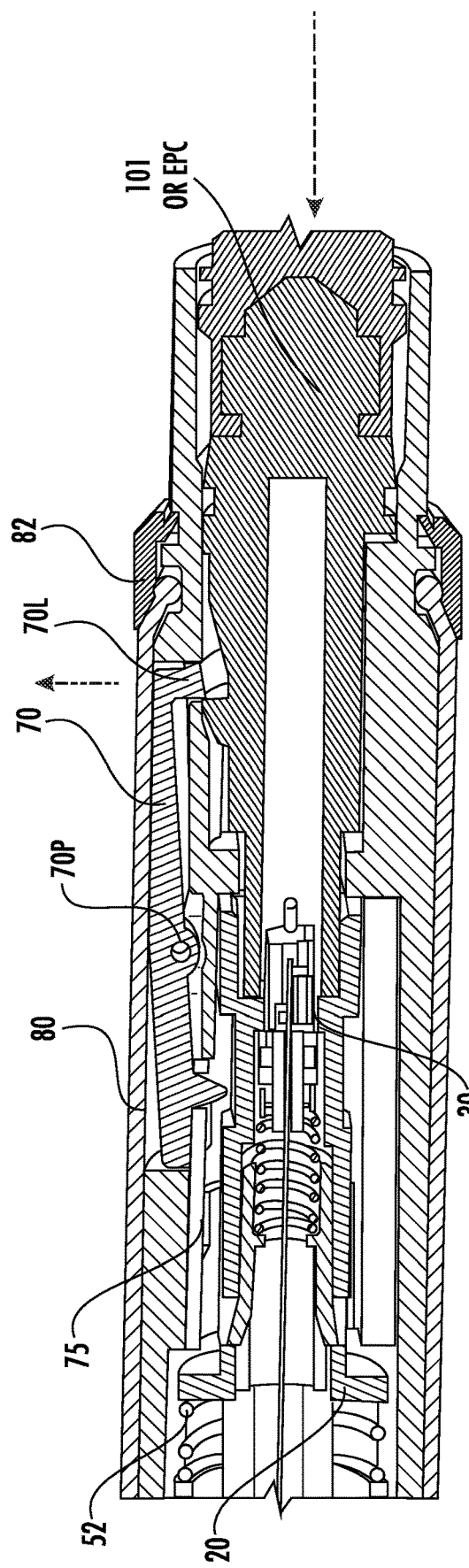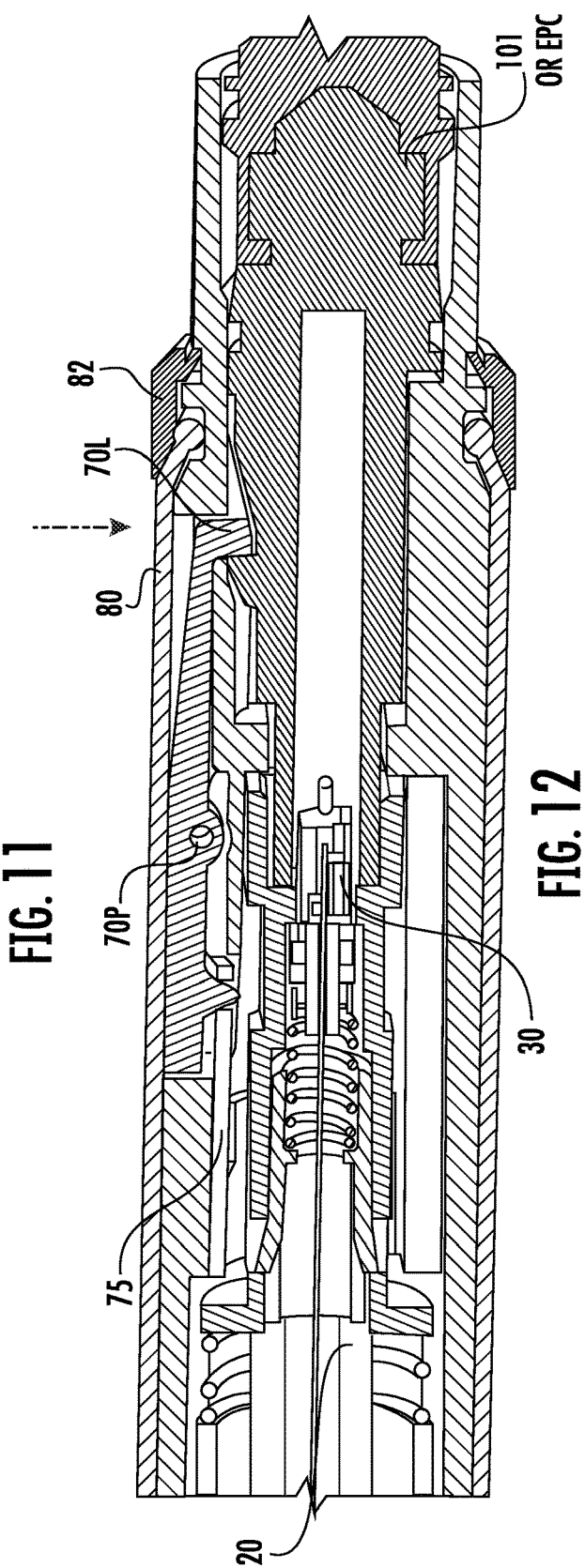

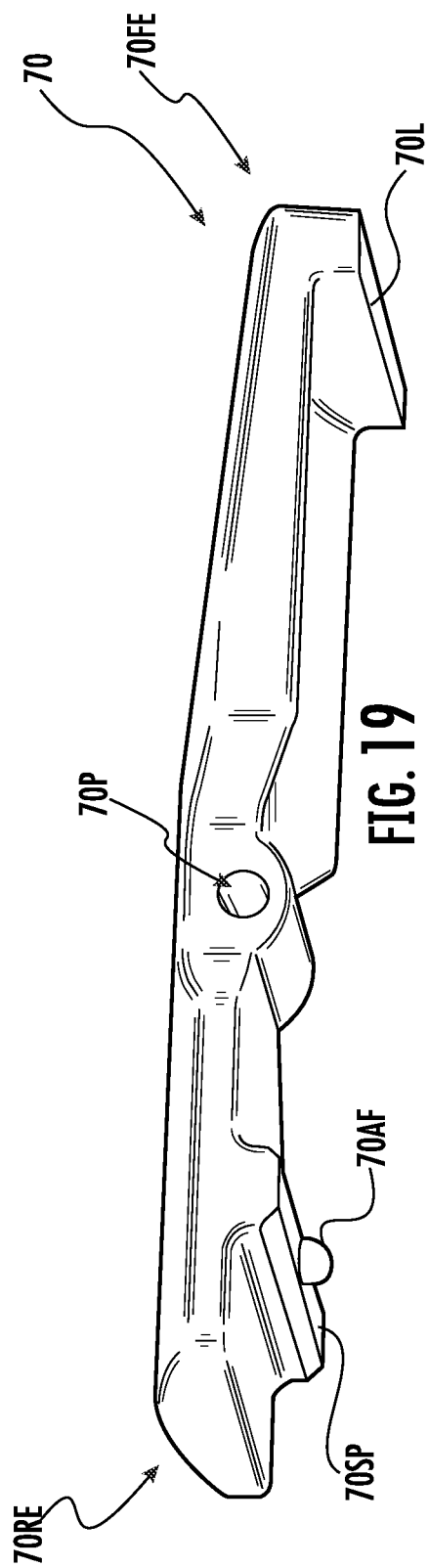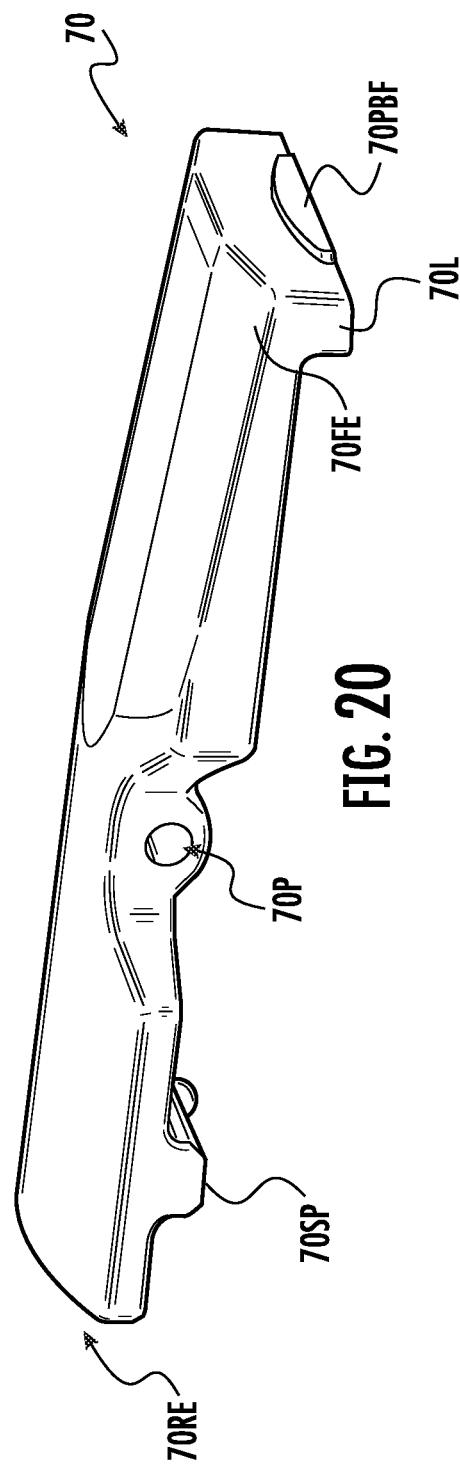

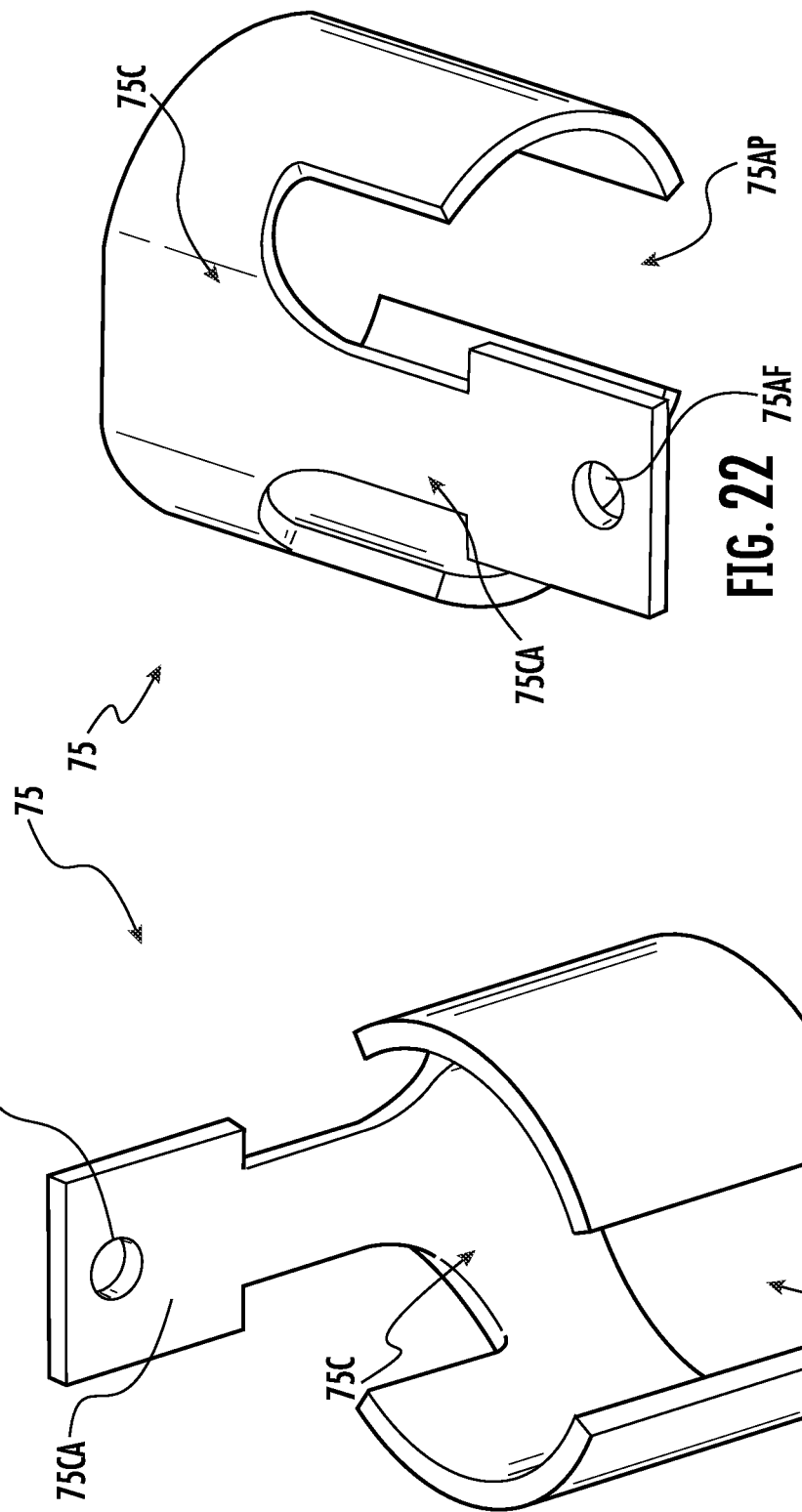

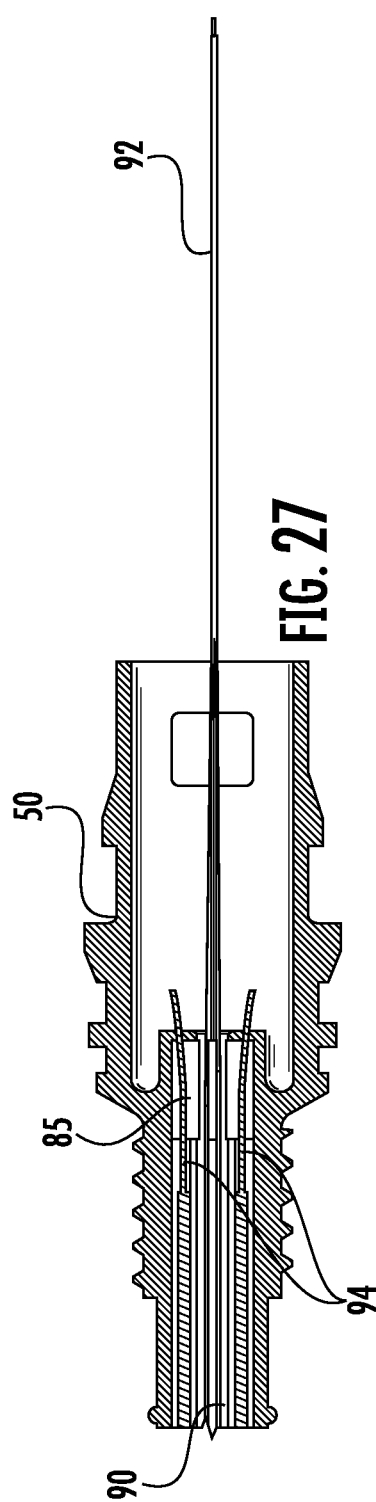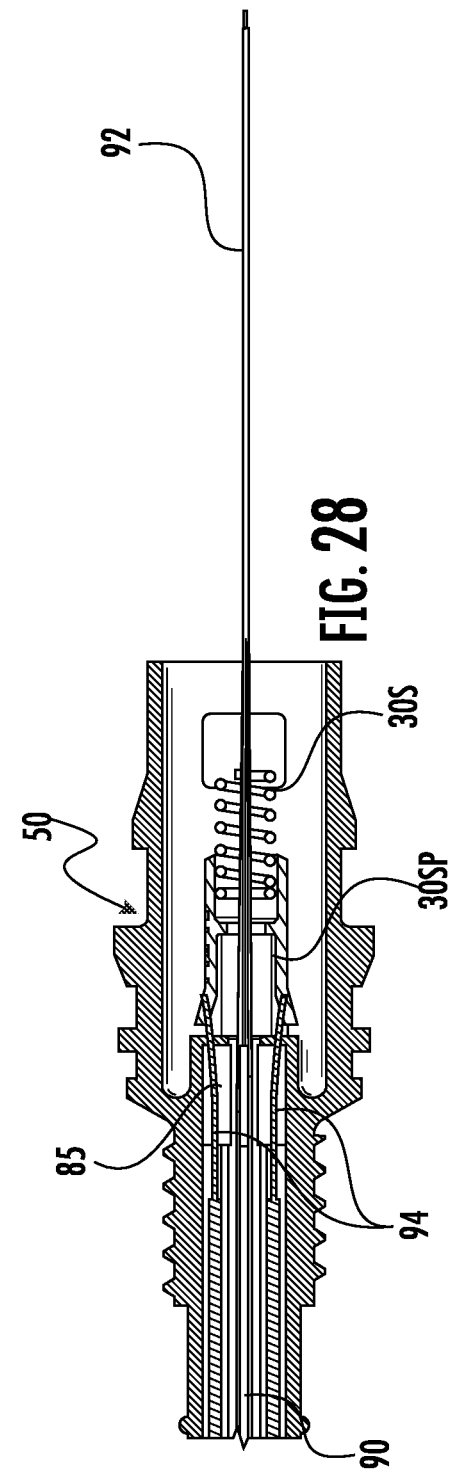

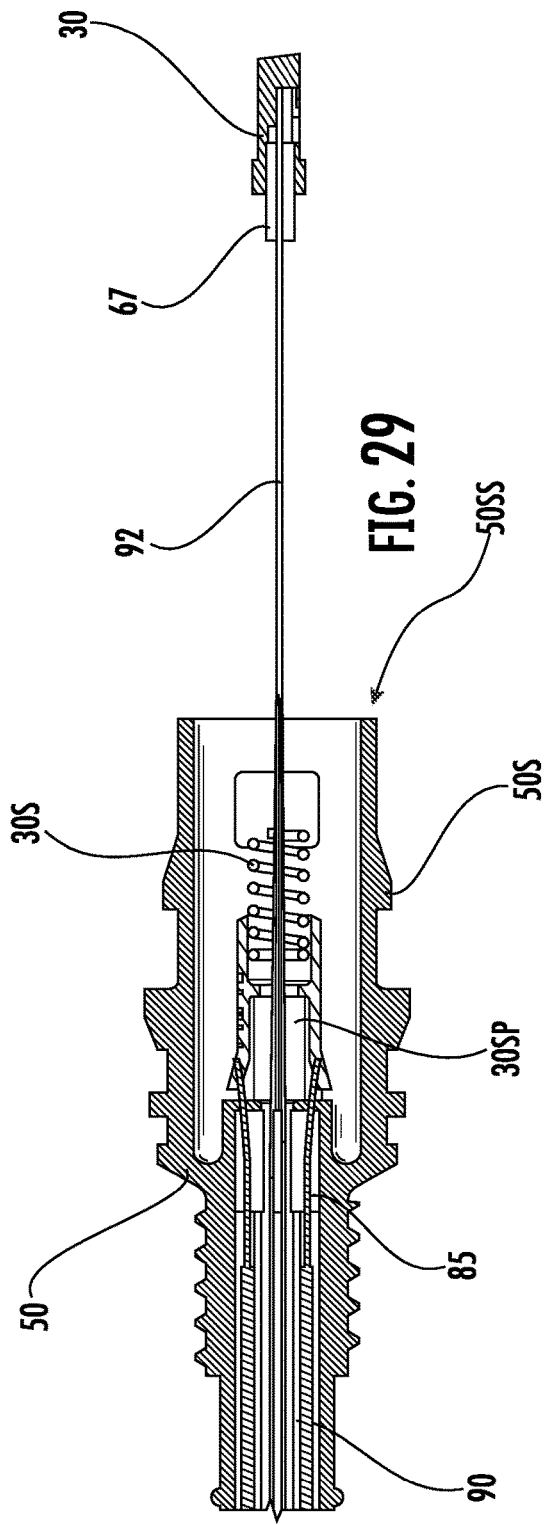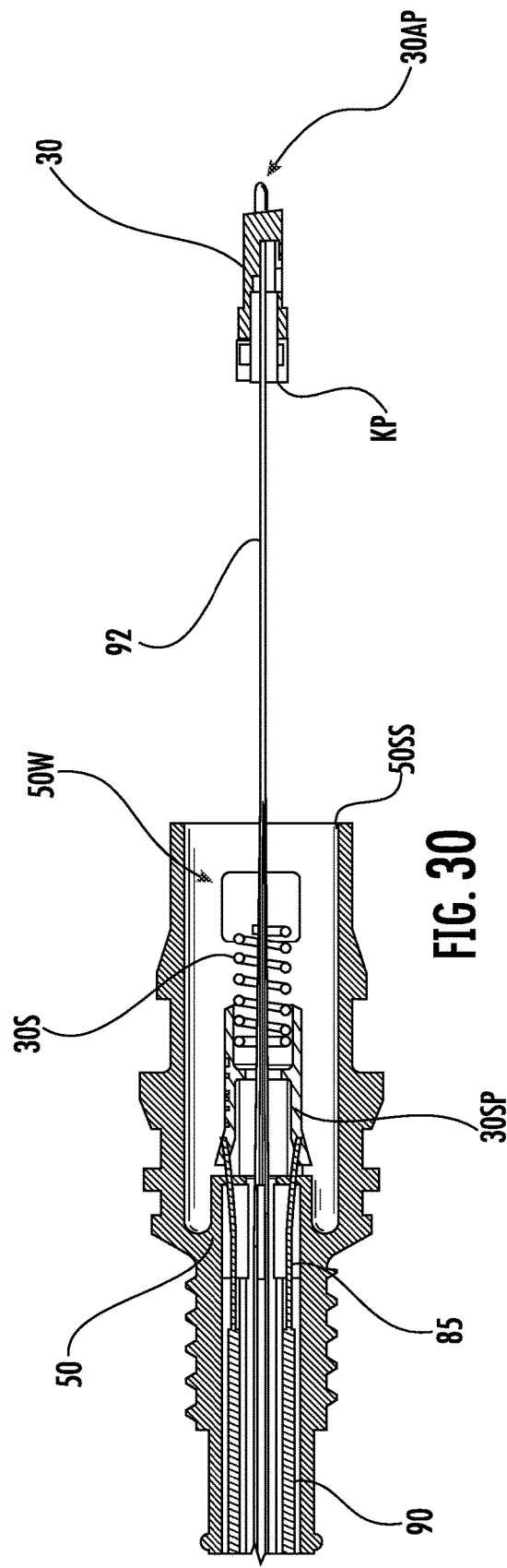

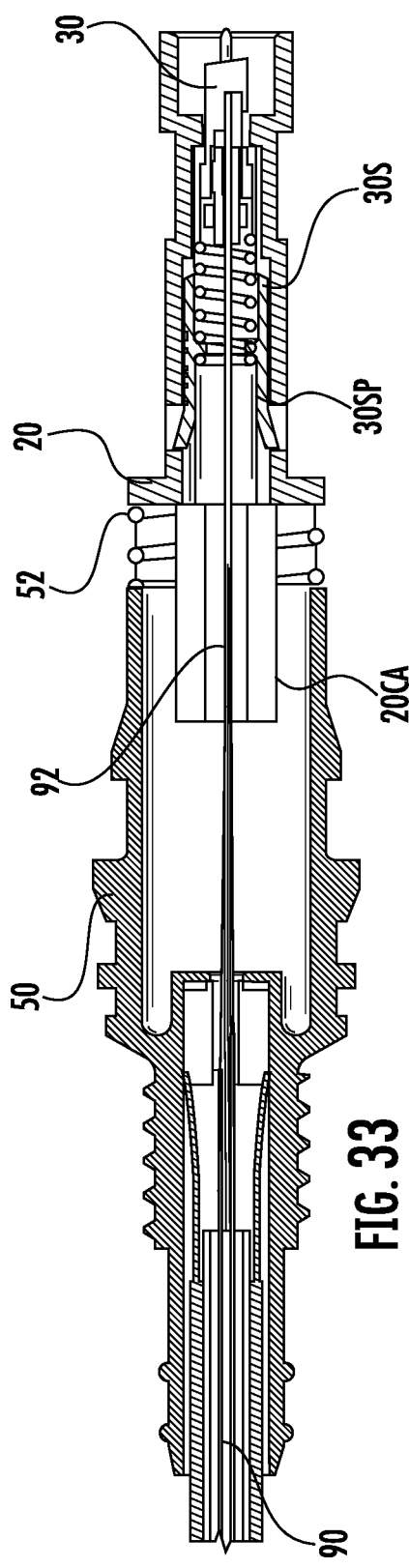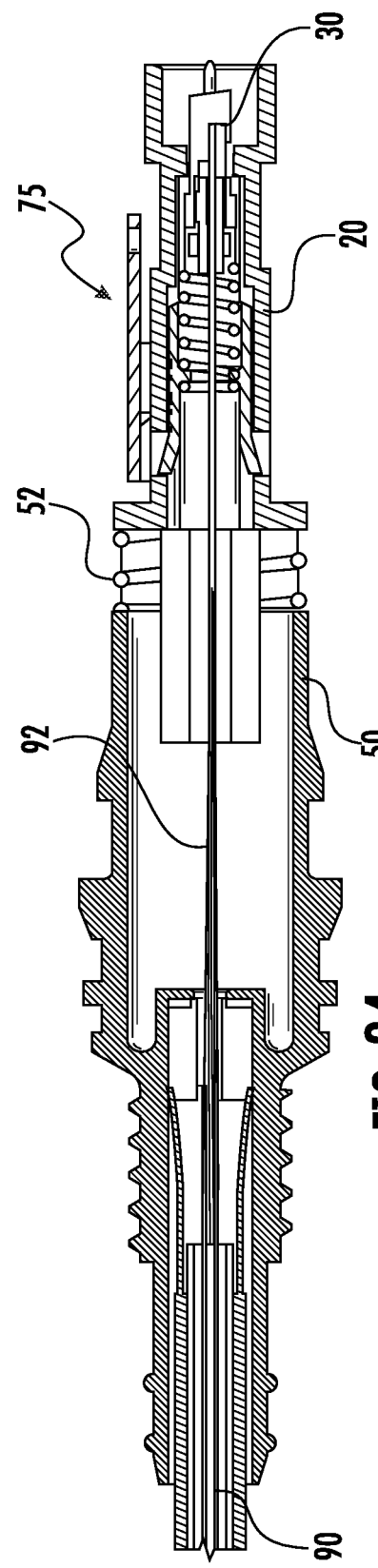

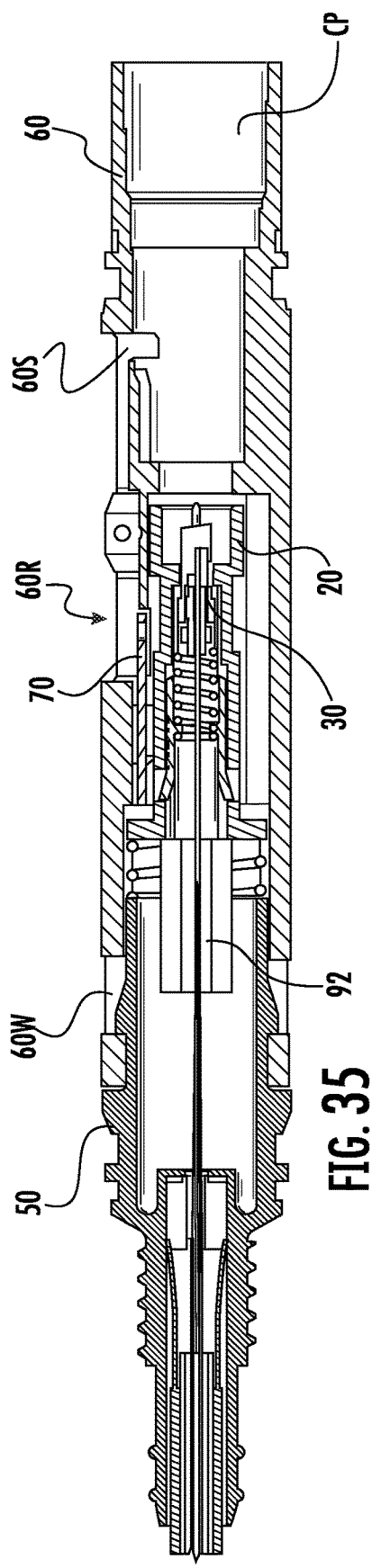
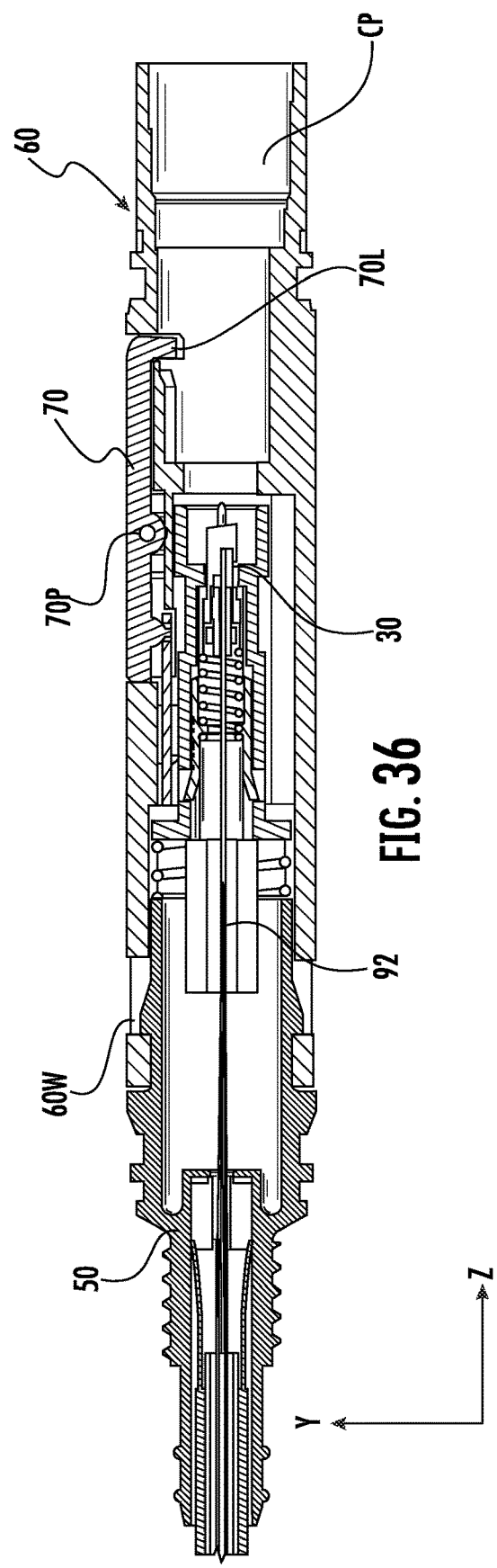
FIG. 35
FIG. 36

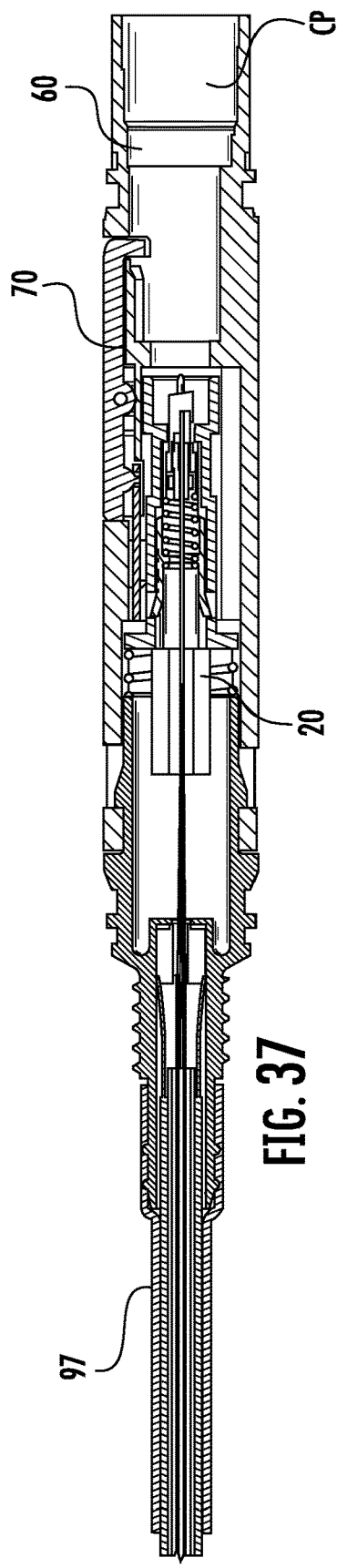
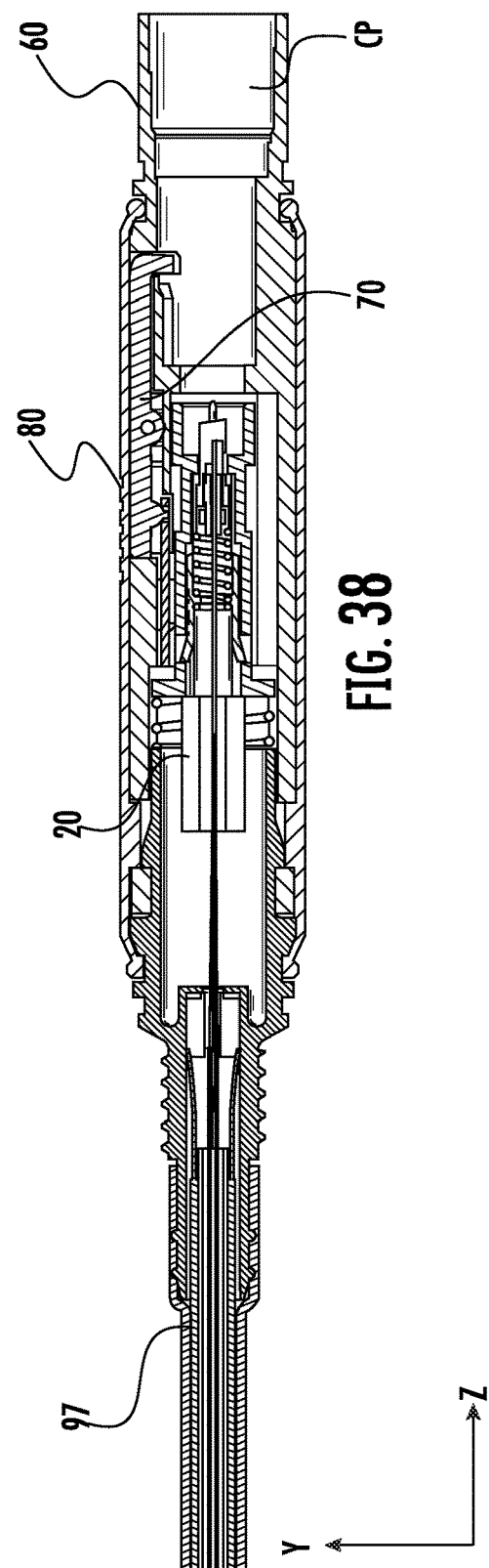
FIG. 37
FIG. 38

FEMALE FIBER OPTIC CONNECTORS HAVING A ROCKER LATCH ARM AND METHODS OF MAKING THE SAME

CROSS-REFERENCE TO RELATED APPLICATIONS

This application is a continuation of International Patent Application Serial No. PCT/US2021/056976 filed Oct. 28, 2021, which claims the benefit of priority of U.S. Provisional Application Ser. No. 63/107,962 filed on Oct. 30, 2020, the content of which is relied upon and incorporated herein by reference in its entirety.

FIELD

The disclosure is directed to female fiber optic connectors and cable assemblies comprising a female fiber optic connector having a rocker latch arm and methods of making the same. The disclosed female fiber optic connectors comprise a connection port suitable for receiving a complimentary male plug connector and securing or releasing the connector using the rocker latch arm.

BACKGROUND

Optical fiber is increasingly being used for a variety of applications, including but not limited to broadband voice, video, and data transmission. As bandwidth demands increase optical fiber is migrating deeper into communication networks such as in fiber to the premises applications such as FTTx, 5G and the like. As optical fiber extends deeper into communication networks there exist a need for building more complex and flexible fiber optic networks using fiber optic connectors that are capable of making connections in a quick and easy manner.

Fiber optic connectors were developed for making plug and play optical connections at links or devices in the communication network such as terminals, cabinets, patch panels, and like. The fiber optic connectors allow the distribution of optical signals within an optical network and provide the flexibility of locating the devices in convenient locations for efficient network design and deployment and also deferring connectivity and the associated capital expense until needed in the communication network. Moreover, optical connector provide a convenient location for making moves, adds or changes in the communication network as needed. As the deployment of optical networks expands more optical connectors are needed for building complex communications networks especially in the outdoor environment (i.e., outdoor plant) as optical fiber is deployment deeper into the communications network for FTTx, 5G or other applications.

Conventional fiber optic connectors for the outdoor environment use threaded coupling nuts or components for retaining or releasing mating optical connectors. However, the use of threaded coupling nuts or components increase the size of the connectors or require additional space for finger access to turn the threaded coupling nuts or components. Consequently, terminals or other devices require the connectors to be larger due to the spacing required between adjacent connectors for finger access or the like. Moreover, it is not always intuitive to the user which side of the mated connection has the threaded component that rotates.

Consequently, there exists an unresolved need for fiber optic connector designs that provide quick and easy optical coupling. Moreover, the connector designs should allow manufacturing in a fast and flexible manner while still providing reliable optical performance.

SUMMARY

The disclosure is directed to female fiber optic connectors having a connection port opening for receiving an external fiber optic plug or fiber optic connector for making an optical connection and retains the external plug connector using an actuator. The female fiber optic connector has an actuator that cooperates with the external plug connector. The actuator of the female fiber optic connector may be biased to a normally-retain position for the external plug connector or not as desired. When the user wishes to release the external plug connector the actuator may be moved to a release position so the external plug connector may disengage the female fiber optic connector. By way of example, and not limitation, the actuator may be a rocker latch arm, but other actuators are possible according to the connector concepts disclosed such as a sliding button or rotating collar for releasing the external plug connector.

The disclosed female fiber optic connectors have a connection port for receiving a mating fiber optic plug along with a ferrule comprising one or more bores for receiving one or more optical fibers. The female fiber optic connector comprises a main barrel having a rear end and a front end with a passageway extending from the rear end to the front end, and the front end of the main barrel comprises a connection port opening. An actuator is capable of translating relative to the main barrel for releasing a mated fiber optic plug form the connection port opening. An optional weatherproofing collar may be disposed rearward of the connection port opening and disposed about a portion of the main barrel and the actuator for inhibiting the ingress of dirt, debris or moisture into the female connector. By way of explanation and not limitation, the actuator may be a rocker latch arm that is attached to the main barrel, but other actuators are possible as discussed. In other embodiments, the main barrel may cooperate with an inner barrel if desired, but the female connector concepts disclosed may use a main barrel without an inner barrel if desired with the features formed the main barrel.

One aspect of the disclosure is directed to a female fiber optic connector having a connection port for receiving a mating fiber optic plug. The female connector comprises a ferrule having one or more bores for receiving one or more optical fibers, an inner barrel, a main barrel, and an actuator configured as a rocker latch arm. The inner barrel comprises an inner barrel rear end and an inner barrel front end with an inner barrel passageway extending from the inner barrel rear end to the inner barrel front end. The inner barrel rear end comprises an inner barrel rear end opening sized for receiving the ferrule. The main barrel comprises a main barrel rear end and a main barrel front end with a main barrel passageway extending from the main barrel rear end to the main barrel front end. The main barrel rear end comprises a main barrel rear end opening sized for receiving the inner barrel and the main barrel front end comprises a connector port opening. The rocker latch arm comprises a pivot suitable for pivoting the rocker latch arm relative to the main barrel.

Another aspect of the disclosure is directed to a female fiber optic connector having a connection port for receiving a mating fiber optic plug. The female connector comprises a ferrule having one or more bores for receiving one or more optical fibers, an inner barrel, a main barrel, an actuator configured as a rocker latch arm, and one or more resilient members. The inner barrel comprises an inner barrel rear end and an inner barrel front end with an inner barrel passageway extending from the inner barrel rear end to the inner barrel front end. The inner barrel rear end comprises an inner barrel rear end opening sized for receiving the ferrule. The main barrel comprises a main barrel rear end and a main barrel front end with a main barrel passageway extending from the main barrel rear end to the main barrel front end. The main barrel rear end comprises a main barrel rear end opening sized for receiving the inner barrel and the main barrel front end comprises a connector port opening. The rocker latch arm comprises a pivot suitable for pivoting the rocker latch arm relative to the main barrel, and the one or more resilient members for biasing the rocker latch arm to a retain position.

Another aspect of the disclosure is directed to a female fiber optic connector having a connection port for receiving a mating fiber optic plug. The female connector comprises a ferrule having one or more bores for receiving one or more optical fibers, an inner barrel, a main barrel, an actuator configured as a rocker latch arm, and one or more resilient members. The inner barrel comprises an inner barrel rear end and an inner barrel front end with an inner barrel passageway extending from the inner barrel rear end to the inner barrel front end. The inner barrel rear end comprises an inner barrel rear end opening sized for receiving the ferrule. The main barrel comprises a main barrel rear end and a main barrel front end with a main barrel passageway extending from the main barrel rear end to the main barrel front end. The main barrel rear end comprises a main barrel rear end opening sized for receiving the inner barrel and the main barrel front end comprises a connector port opening. The rocker latch arm comprises a pivot suitable for pivoting the rocker latch arm relative to the main barrel, and comprises a latch and a rear end. The one or more resilient members are suitable for biasing the rocker latch arm to a retain position, where a portion of the one or more resilient members cooperates with the rear end of the rocker latch arm.

A further aspect of the disclosure is directed to a female fiber optic connector having a connection port for receiving a mating fiber optic plug. The female connector comprises a ferrule having one or more bores for receiving one or more optical fibers, an inner barrel, a main barrel, an actuator configured as a rocker latch arm, one or more resilient members, and a rear spring push. The inner barrel comprises an inner barrel rear end and an inner barrel front end with an inner barrel passageway extending from the inner barrel rear end to the inner barrel front end. The inner barrel rear end comprises an inner barrel rear end opening sized for receiving the ferrule. The main barrel comprises a main barrel rear end and a main barrel front end with a main barrel passageway extending from the main barrel rear end to the main barrel front end. The main barrel rear end comprises a main barrel rear end opening sized for receiving the inner barrel and the main barrel front end comprises a connector port opening. The rocker latch arm comprises a pivot suitable for pivoting the rocker latch arm relative to the main barrel, and comprises a latch and a rear end. The one or more resilient members are suitable for biasing the rocker latch arm to a retain position, where a portion of the one or more resilient members cooperates with the rear end of the rocker latch arm. The rear spring push is suitable for attaching to the main barrel.

A still further aspect of the disclosure is directed to a female fiber optic connector having a connection port for receiving a mating fiber optic plug. The female connector comprises a ferrule having one or more bores for receiving one or more optical fibers, an inner barrel, a main barrel, an actuator configured as a rocker latch arm, one or more resilient members, a rear spring push, and a spring. The inner barrel comprises an inner barrel rear end and an inner barrel front end with an inner barrel passageway extending from the inner barrel rear end to the inner barrel front end. The inner barrel rear end comprises an inner barrel rear end opening sized for receiving the ferrule. The main barrel comprises a main barrel rear end and a main barrel front end with a main barrel passageway extending from the main barrel rear end to the main barrel front end. The main barrel rear end comprises a main barrel rear end opening sized for receiving the inner barrel and the main barrel front end comprises a connector port opening. The rocker latch arm comprises a pivot suitable for pivoting the rocker latch arm relative to the main barrel, and comprises a latch and a rear end. The one or more resilient members are suitable for biasing the rocker latch arm to a retain position, where a portion of the one or more resilient members cooperates with the rear end of the rocker latch arm. The spring is for biasing the inner barrel to a forward position in the main barrel.

Yet another aspect of the disclosure is directed to a female fiber optic connector having a connection port for receiving a mating fiber optic plug. The female connector comprises a ferrule having one or more bores for receiving one or more optical fibers, an inner barrel, a main barrel, an actuator configured as a rocker latch arm, one or more resilient members, a rear spring push, a spring, and a weatherproofing collar. The inner barrel comprises an inner barrel rear end and an inner barrel front end with an inner barrel passageway extending from the inner barrel rear end to the inner barrel front end. The inner barrel rear end comprises an inner barrel rear end opening sized for receiving the ferrule. The main barrel comprises a main barrel rear end and a main barrel front end with a main barrel passageway extending from the main barrel rear end to the main barrel front end. The main barrel rear end comprises a main barrel rear end opening sized for receiving the inner barrel and the main barrel front end comprises a connector port opening. The rocker latch arm comprises a pivot suitable for pivoting the rocker latch arm relative to the main barrel, and comprises a rear end. The one or more resilient members are suitable for biasing the rocker latch arm to a retain position, where a portion of the one or more resilient members cooperates with the rear end of the rocker latch arm. The rear spring push is suitable for attaching to the main barrel, and the spring is for biasing the inner barrel to a forward position in the main barrel. The weatherproofing collar is sized for being disposed about a portion of the main barrel.

Still another aspect of the disclosure is directed to a female fiber optic connector having a connection port for receiving a mating fiber optic plug. The female connector comprises a ferrule having one or more bores for receiving one or more optical fibers, an inner barrel, a main barrel, an actuator configured as a rocker latch arm, one or more resilient members, a rear spring push, a spring, and a weatherproofing collar. The inner barrel comprises an inner barrel rear end and an inner barrel front end with an inner barrel passageway extending from the inner barrel rear end to the inner barrel front end. The inner barrel rear end comprises an inner barrel rear end opening sized for receiving the ferrule. The main barrel comprises a main barrel rear end and a main barrel front end with a main barrel passageway extending from the main barrel rear end to the main barrel front end. The main barrel rear end comprises a main barrel rear end opening sized for receiving the inner barrel and the main barrel front end comprises a connector port opening. The rocker latch arm comprises a pivot suitable for pivoting the rocker latch arm relative to the main barrel, and comprises a rear end. The one or more resilient members are suitable for biasing the rocker latch arm to a retain position, and a portion of the one or more resilient members is disposed between the inner barrel and the rocker latch arm. The rear spring push is suitable for attaching to the main barrel, and the spring is for biasing the inner barrel to a forward position in the main barrel. The weatherproofing collar is sized for being disposed about a portion of the main barrel.

Another aspect of the disclosure is directed to a female fiber optic connector having a connection port for receiving a mating fiber optic plug. The female connector comprises a ferrule having one or more bores for receiving one or more optical fibers, an inner barrel, a main barrel, an actuator configured as a rocker latch arm, one or more resilient members, a rear spring push comprising a cable strain relief portion, a spring, and a weatherproofing collar. The inner barrel comprises an inner barrel rear end and an inner barrel front end with an inner barrel passageway extending from the inner barrel rear end to the inner barrel front end. The inner barrel rear end comprises an inner barrel rear end opening sized for receiving the ferrule. The main barrel comprises a main barrel rear end and a main barrel front end with a main barrel passageway extending from the main barrel rear end to the main barrel front end. The main barrel rear end comprises a main barrel rear end opening sized for receiving the inner barrel and the main barrel front end comprises a connector port opening. The rocker latch arm comprises a pivot suitable for pivoting the rocker latch arm relative to the main barrel, and comprises a latch and a rear end. The one or more resilient members are suitable for biasing the rocker latch arm to a retain position, and a portion of the one or more resilient members is disposed between the inner barrel and the rocker latch arm. The rear spring push is suitable for attaching to the main barrel, and the spring is for biasing the inner barrel to a forward position in the main barrel. The weatherproofing collar is sized for being disposed about a portion of the main barrel.

A further aspect of the disclosure is directed to a female fiber optic connector having a connection port for receiving a mating fiber optic plug. The female connector comprises a ferrule having one or more bores for receiving one or more optical fibers, an inner barrel, a main barrel, an actuator configured as a rocker latch arm, one or more resilient members, a rear spring push comprising a cable strain relief portion, a spring, and a weatherproofing collar. The inner barrel comprises an inner barrel rear end and an inner barrel front end with an inner barrel passageway extending from the inner barrel rear end to the inner barrel front end. The inner barrel rear end comprises an inner barrel rear end opening sized for receiving the ferrule. The main barrel comprises a main barrel rear end and a main barrel front end with a main barrel passageway extending from the main barrel rear end to the main barrel front end. The main barrel rear end comprises a main barrel rear end opening sized for receiving the inner barrel and the main barrel front end comprises a connector port opening, and comprises a keying feature. The rocker latch arm comprises a pivot suitable for pivoting the rocker latch arm relative to the main barrel, and comprises a rear end. The one or more resilient members are suitable for biasing the rocker latch arm to a retain position, and a portion of the one or more resilient members is disposed between the inner barrel and the rocker latch arm. The rear spring push is suitable for attaching to the main barrel, and the spring is for biasing the inner barrel to a forward position in the main barrel. The weatherproofing collar is sized for being disposed about a portion of the main barrel.

Yet a further aspect of the disclosure is directed to a female fiber optic connector having a connection port for receiving a mating fiber optic plug. The female connector comprises a ferrule having one or more bores for receiving one or more optical fibers, an inner barrel, a main barrel, an actuator configured as a rocker latch arm, one or more resilient members, a rear spring push comprising a cable strain relief portion, a spring, and a weatherproofing collar. The inner barrel comprises an inner barrel rear end and an inner barrel front end with an inner barrel passageway extending from the inner barrel rear end to the inner barrel front end. The inner barrel rear end comprises an inner barrel rear end opening sized for receiving the ferrule. The main barrel comprises a main barrel rear end and a main barrel front end with a main barrel passageway extending from the main barrel rear end to the main barrel front end. The main barrel rear end comprises a main barrel rear end opening sized for receiving the inner barrel and the main barrel front end comprises a connector port opening, and comprises a keying feature configured as a male keying feature. The rocker latch arm comprises a pivot suitable for pivoting the rocker latch arm relative to the main barrel, and the rocker latch arm is disposed on the opposite side from the keying feature. The one or more resilient members are suitable for biasing the rocker latch arm to a retain position, and where a portion of the one or more resilient members is disposed between the inner barrel and main barrel. The rear spring push is suitable for attaching to the main barrel, and the spring is for biasing the inner barrel to a forward position. The weatherproofing collar is sized for being disposed about a portion of the main barrel.

Still a further aspect of the disclosure is directed to a female fiber optic connector having a connection port for receiving a mating fiber optic plug. The female connector comprises a ferrule having one or more bores for receiving one or more optical fibers, an inner barrel, a main barrel, an actuator configured as a rocker latch arm, one or more resilient members, a rear spring push comprising a cable strain relief portion, a spring, a weatherproofing collar, and one or more caps that cooperate with the weatherproofing collar. The inner barrel comprises an inner barrel rear end and an inner barrel front end with an inner barrel passageway extending from the inner barrel rear end to the inner barrel front end. The inner barrel rear end comprises an inner barrel rear end opening sized for receiving the ferrule. The main barrel comprises a main barrel rear end and a main barrel front end with a main barrel passageway extending from the main barrel rear end to the main barrel front end. The main barrel rear end comprises a main barrel rear end opening sized for receiving the inner barrel and the main barrel front end comprises a connector port opening, and comprises a keying feature configured as a male keying feature. The rocker latch arm comprises a pivot suitable for pivoting the rocker latch arm relative to the main barrel, and the rocker latch arm is disposed on the main barrel opposite from the keying feature. The one or more resilient members are suitable for biasing the rocker latch arm to a retain position, and the one or more resilient members is disposed between the inner barrel and the rocker latch arm. The spring push is suitable for attaching to the main barrel, and the spring is for biasing the inner barrel to a forward position in the main barrel. The weatherproofing collar is sized for being disposed about a portion of the main barrel.

Methods of making a fiber optic cable assembly having a female fiber optic connector comprising a connection port are also disclosed. The method comprises attaching one or more optical fibers of a fiber optic cable to a ferrule, inserting the ferrule into a passageway of an inner barrel. The inner barrel comprises an inner barrel rear end and an inner barrel front end with an inner barrel passageway extending from the inner barrel rear end to the inner barrel front end, where the inner barrel rear end comprises a rear end opening sized for receiving the ferrule. Placing the inner barrel within a main barrel with the main barrel comprising a main barrel rear end and a main barrel front end with a main barrel passageway extending from the main barrel rear end to the main barrel front end. The main barrel rear end comprises a rear end opening sized for receiving the inner barrel and the main barrel front end comprises a connector port opening, and attaching an actuator such as a rocker latch arm to the main barrel. Other similar methods may be directed to any attaching an actuator as desired such as a sliding button or rotating collar for releasing the external plug connector, instead of the rocker latch arm.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

BRIEF DESCRIPTION OF THE FIGURES

FIGS. 4A-4B are partial sectional views showing the rocker latch arm of the female fiber optic connector in the retain and release positions, respectively;

FIG. 8 is an exploded view of an explanatory female fiber optic connector having an actuator;

FIG. 11 is a detailed cross-section view of the rocker latch arm of the female fiber optic connector translating as the dust plug or external male plug connector are inserted into the connection port;

FIG. 12 is a detailed cross-section view of the rocker latch arm of the female fiber optic connector biased to the normally-retain position after fully-inserting the dust plug or external male plug connector into the connection port;

FIGS. 19 and 20 are perspective views of the rocker latch arm of the female fiber optic connector of FIG. 8;

FIGS. 21 and 22 are perspective views of the resilient member for biasing the rocker latch arm of the female fiber optic connector of FIG. 8;

FIGS. 26-40 show an explanatory method of making the female fiber optic connector of FIG. 8;

DETAILED DESCRIPTION

Figure 1:
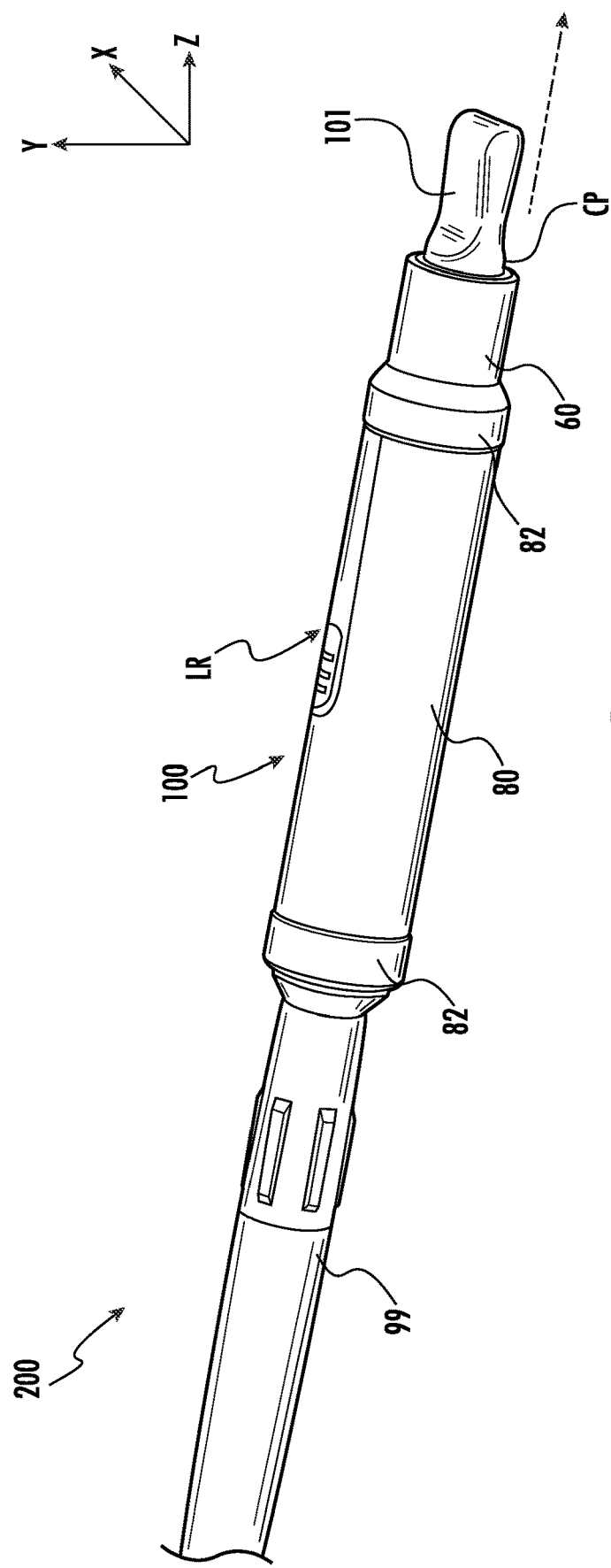
FIG. 1 is a perspective view of an explanatory female fiber optic connector having a connection port with an actuator such as a rocker latch arm for retaining or releasing an external male plug connector that may be received in the connection port according to the concepts disclosed.

Reference will now be made in detail to the embodiments of the disclosure, examples of which are illustrated in the accompanying drawings. Whenever possible, like reference numbers will be used to refer to like components or parts.

The concepts disclosed are related to female fiber optic connectors (hereinafter "female connector(s)") having a connection port along with fiber optic cable assemblies (hereinafter "cable assemblies" or "cable assembly") using the female connectors and methods of making the same. As used herein, "connection port" means a cavity for receiving a fiber optic connector or external plug connector for making an optical connection. The female connectors disclosed comprise a connection port and an actuator such as a rocker latch arm or the like used for retaining (i.e., securing) or releasing an external male plug connector or dust plug received within the connection port. The female connectors disclosed may also be ruggedized (i.e., suitable for outdoor environments) or not depending on the intended environment or use. The concepts disclosed provide a simple and reliable female connector that is quick and easy to assemble for terminating one or more optical fibers. The female connectors disclosed also allow for a quick and easy mating with a complimentary external plug connector (i.e., male plug connector that fits in the connection port) using an actuator such as the rocker latch arm.

On the other hand, conventional hardened connectors are mated using threads or bayonets on the connector. Threads or bayonets used on the conventional hardened connectors increase the size of the connectors or require spacing between adjacent connectors for suitable finger access. The female connectors disclosed advantageously have a relatively small diameter or form-factor compared with conventional connectors. By way of example, the female connectors may have a nominal maximum outer diameter of 20 millimeters or less (e.g., cross-sectional diameter taken perpendicular to the longitudinal female connector axis defined by a line passing thru the center of the mating face of the ferrule and extending rearward toward the rear of the female connector along the centerline). The female connectors and fiber optic cable assemblies disclosed may also provide a push-to-secure connection feature for mating with an external plug connector or dust plug if desired.

Alternatively, the female connectors may have an actuator that toggles between a retain and release position similar to a light switch if desired using the concepts disclosed. If the female connector has an actuator that toggles between a retain and release position, then a resilient member is not needed for biasing the actuator such as the rocker latch arm since it will positively retain and toggle between the respective retain and release positions.

The female connector concepts disclosed may be used with any suitable cables. Moreover, the female connector concepts are also scalable to any suitable count of optical fibers within the ferrule (e.g., 1-24 fibers or more) in a variety of arrangements or constructions. Further, the ferrule may have the bores for the optical fibers in one or more rows as desired.

The concepts disclosed herein are suitable for fiber optic networks such as for Fiber-to-the-location (FTTx), network densification, 5G applications, and are equally applicable to other optical applications as well including indoor, industrial, wireless, or other desired applications. Although, the concepts are shown with a robust and rugged female connector design useful for outdoor applications, the concepts may be used with non-rugged or indoor female connector designs if desired. Various designs, constructions, or features for the female connectors and cable assemblies are disclosed in more detail as discussed herein and may be modified or varied as desired.

Figure 2:
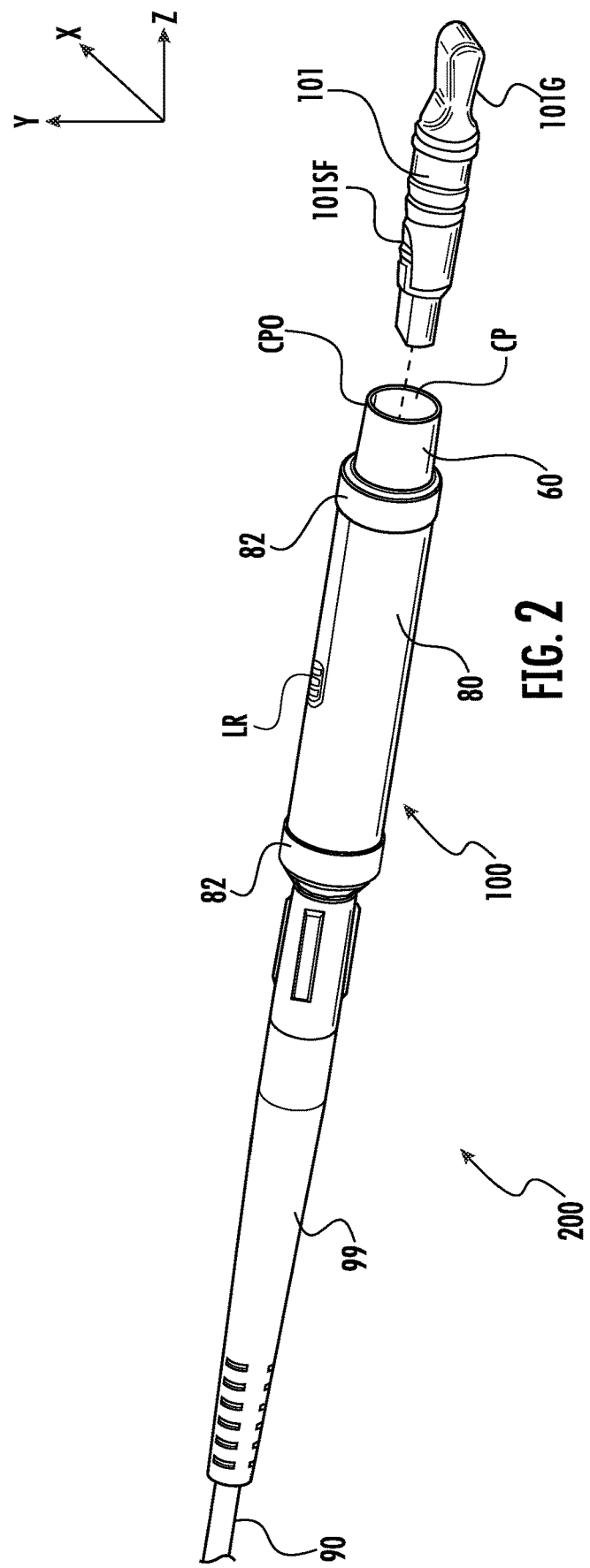
FIG. 2 is a perspective view of the female fiber optic connector of FIG. 1 shown with the dust plug removed from the connection port.
Figure 3:
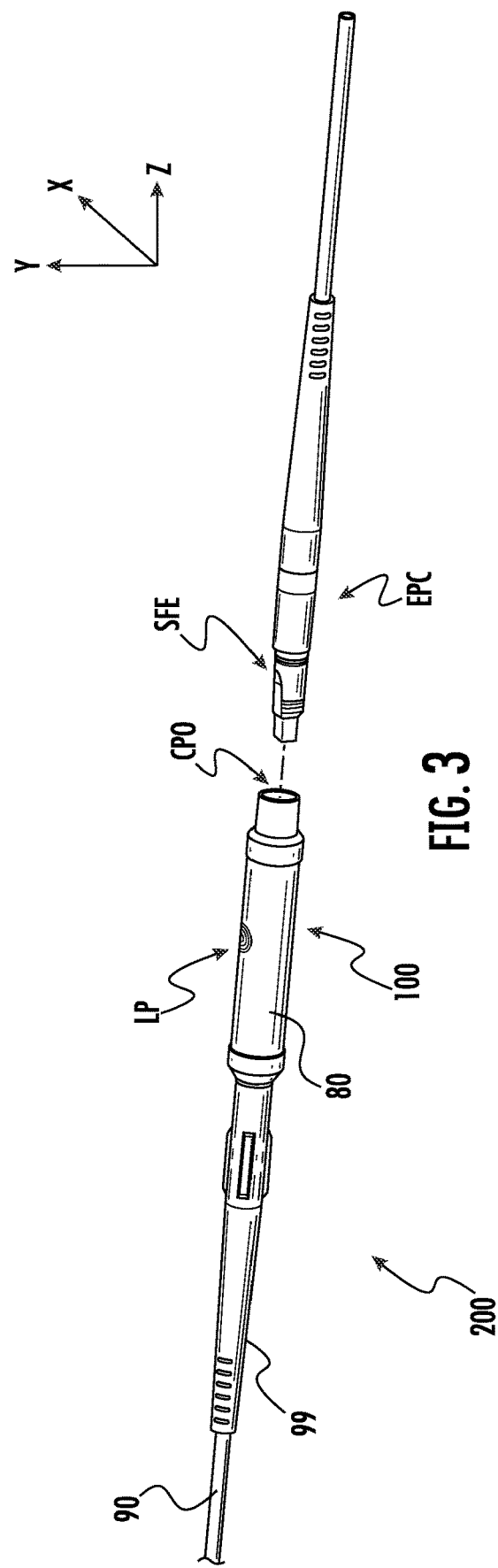
FIG. 3 depicts a perspective view of the female fiber optic connector of FIG. 2 showing how an external male plug connector may be aligned and inserted into the connection port opening of the female fiber optic connector for optical communication.
Figure 51:
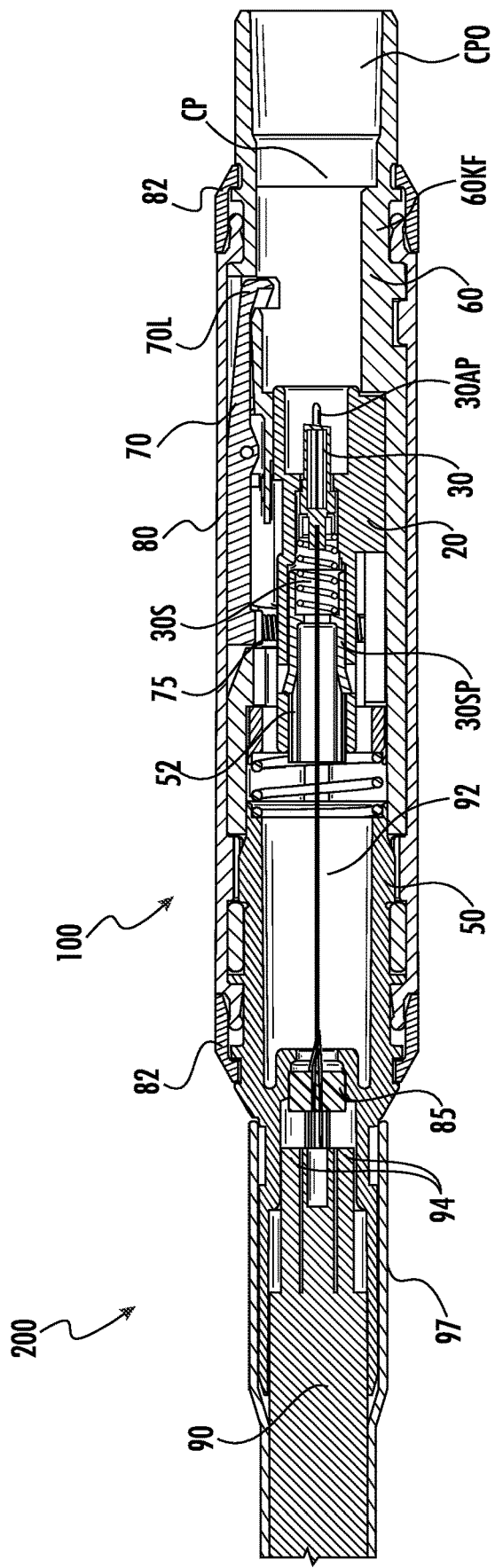
FIG. 51 depicts a sectional view of a female fiber optic connector that is terminated on a different fiber optic cable according to the concepts disclosed.
Figure 52:
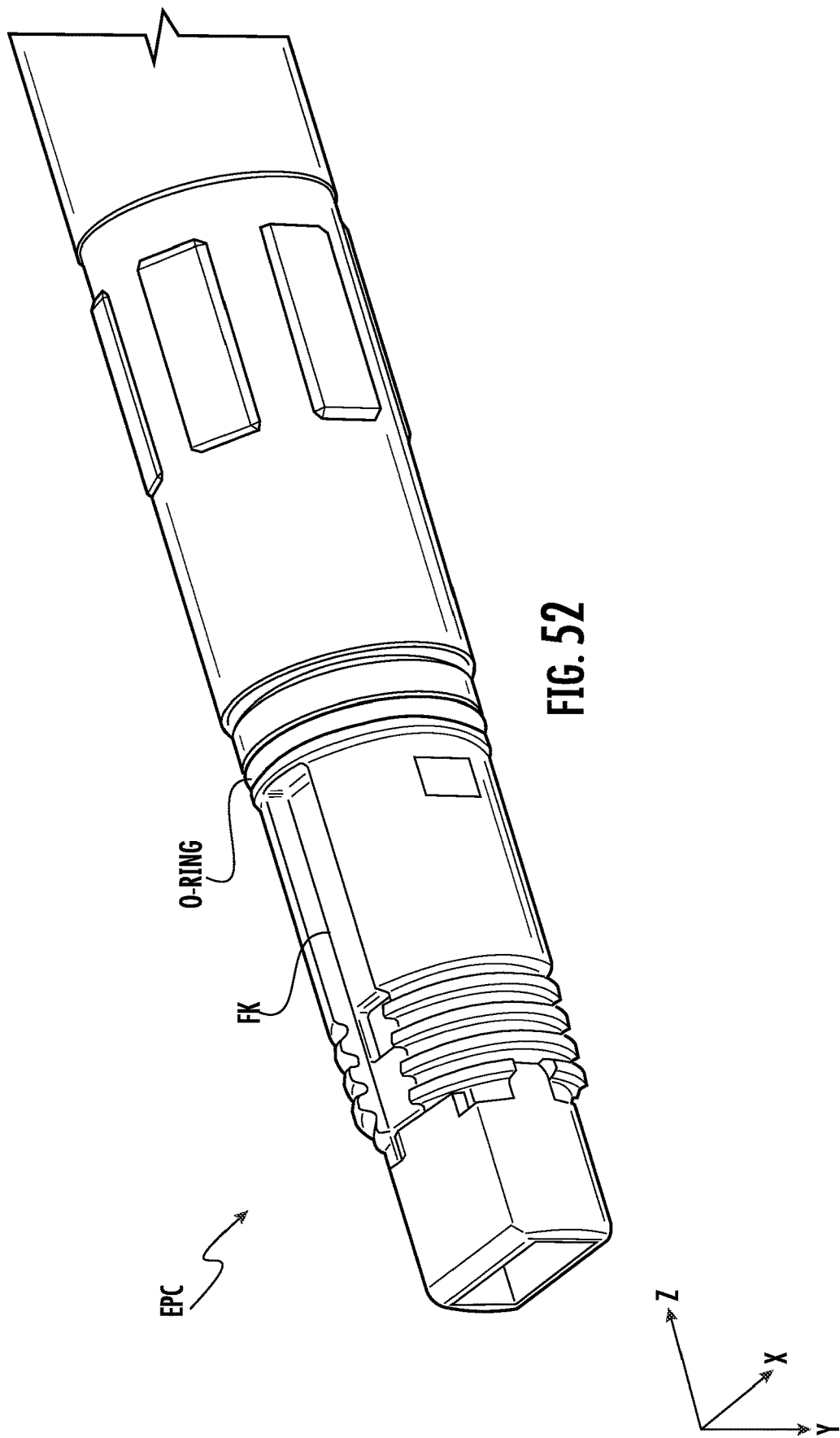
FIGS. 52 and 53 show top and bottom perspective views of the external male plug connector suitable for mating with the female fiber optic connector as shown in FIG. 3.
Figure 53:
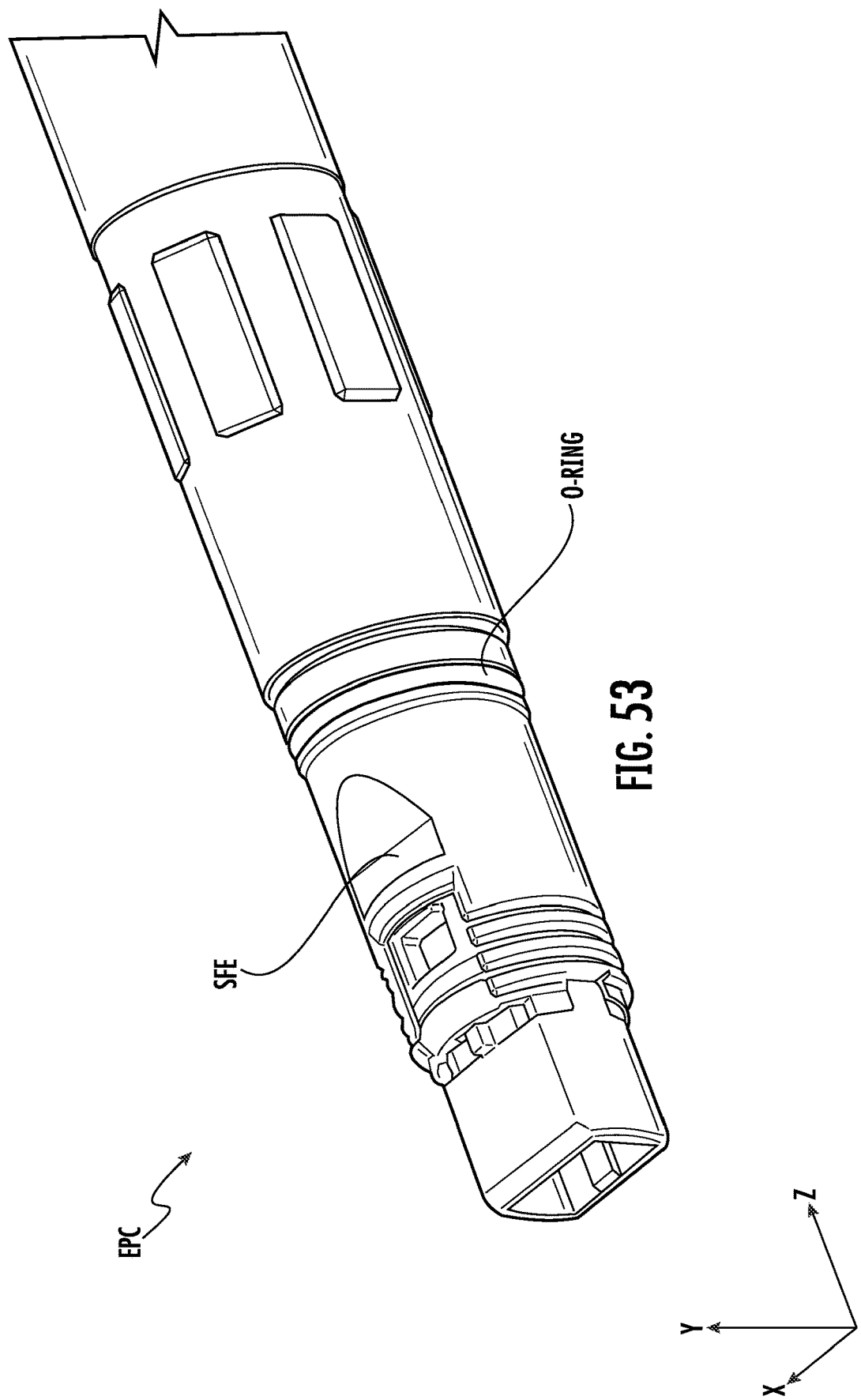

FIGS. 1-3 depict a cable assembly 200 having an explanatory female connector 100 comprising a connection port opening (CPO) according to the concepts disclosed. FIGS. 4a-7 depict alternative configurations that may be used with the female connectors 100 disclosed. FIGS. 8-14 show details of the construction for one explanatory cable assembly 200 having female connector 100, and FIGS. 15-25 are component views for the female connector 100. FIGS. 26-40 disclose the assembly steps for methods of making female connector 100 according to the concepts disclosed. FIGS. 41-51 disclose another variation of the female connector 100 similar to the female connector shown in FIGS. 8-14. FIGS. 52 and 53 are perspective views of an external plug connector (EPC) that may be mated with the female connector 100 for making an optical connection.

FIGS. 1-3 are perspective views of an explanatory female connector 100 terminating a fiber optic cable 90, thereby forming a cable assembly 200. Female connector 100 comprises a connection port (CP) for receiving a mating fiber optic plug (i.e., and external plug connector). FIG. 1 depicts female connector 100 with a dust plug 101 disposed in the connection port (CP) for keeping dirt, debris and the like out of the connection port (CP) of female connector 100, and FIG. 2 shows the female connector 100 with the dust plug 101 removed from the connection port (CP). Once dust plug 101 is removed from the connection port opening (CPO) access to the connection port (CP) is made available for inserting a complementary external plug connector (EPC) into the connection port (CP) for optical mating.

FIG. 3 shows an external plug connector (EPC) that may be aligned and inserted into the connection port opening (CPO) of the female connector 100 for optical mating in the connection port (CP) of the female connector 100. The connection port opening (CPO) leads to a cavity of the female connector 100 that forms the connection port (CP).

An actuator 70 such as a rocker latch arm of the female connector 100 cooperates with a securing feature 101SF of the dust plug 101 shown in FIG. 2 or the securing feature (SFE) of the external plug connector (EPC) shown in FIG. 3. For instance, the securing feature 101SF of the dust plug 101 or external plug connector (EPC) may be integrally formed in the dust plug or connector housing as a subtractive portion from a generally cylindrical geometry. Thus, no features such as a rotating coupling nut or bayonet that increases the size of the connector is required for mating.

The dust plug 101 or external plug connector (EPC) may be released from the connection port (CP) of the female connector 100 by pushing down on the latch release (LR) disposed on the female connector 100. Pushing the latch release (LR) of the actuator such as pushing down on the latch release for moving the rocker latch arm 70 from the retain position shown in FIG. 4A to the release position shown in FIG. 4B as represented by the vertical arrow. As depicted, pushing the latch release (LR) with sufficient force pivots the rocker latch arm 70 comprising a latch 70L to a release position as represented by the vertical arrow. Rocker latch arm 70 comprises a pivot 70P suitable for pivoting relative to a main barrel 70.

Actuator or rocker latch arm 70 may operate as a toggle between the release and retain positions like a light switch or the rocker latch arm 70 may be biased to a normally retain position by one or more resilient members 75.

Figure 9:
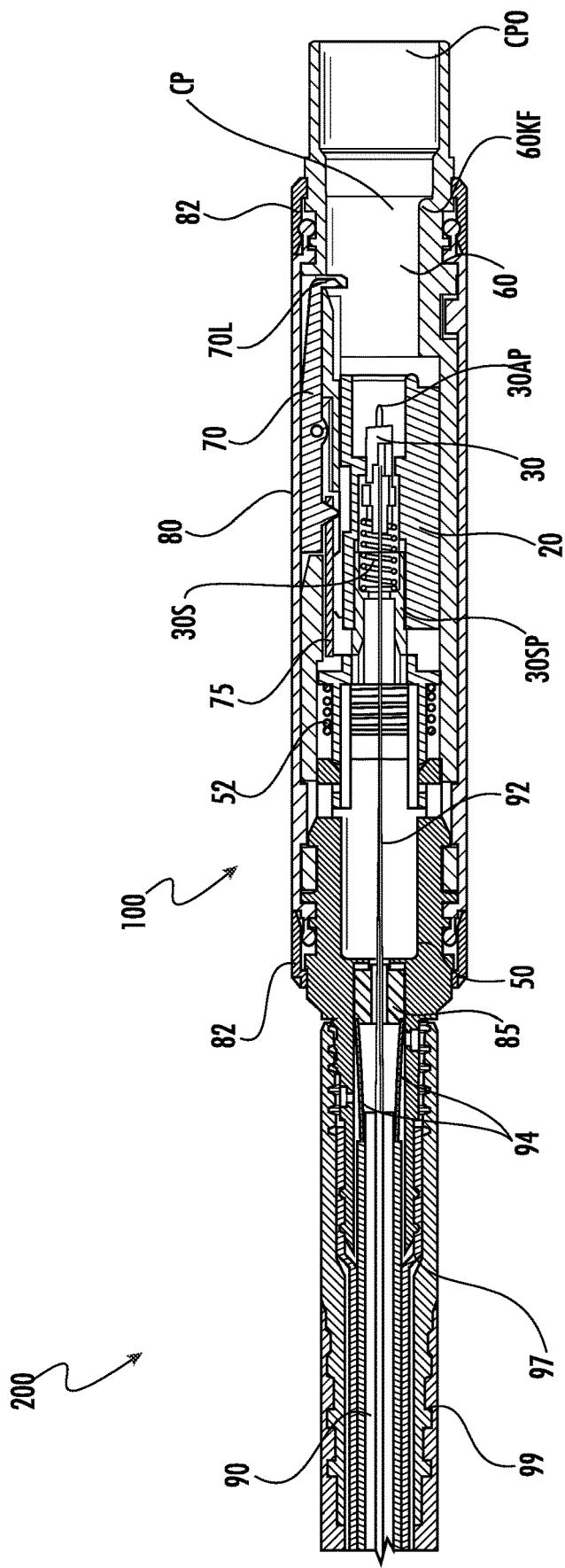
FIG. 9 is a longitudinal cross-section view of the fiber optic cable assembly having the female fiber optic connector.
Figure 13:
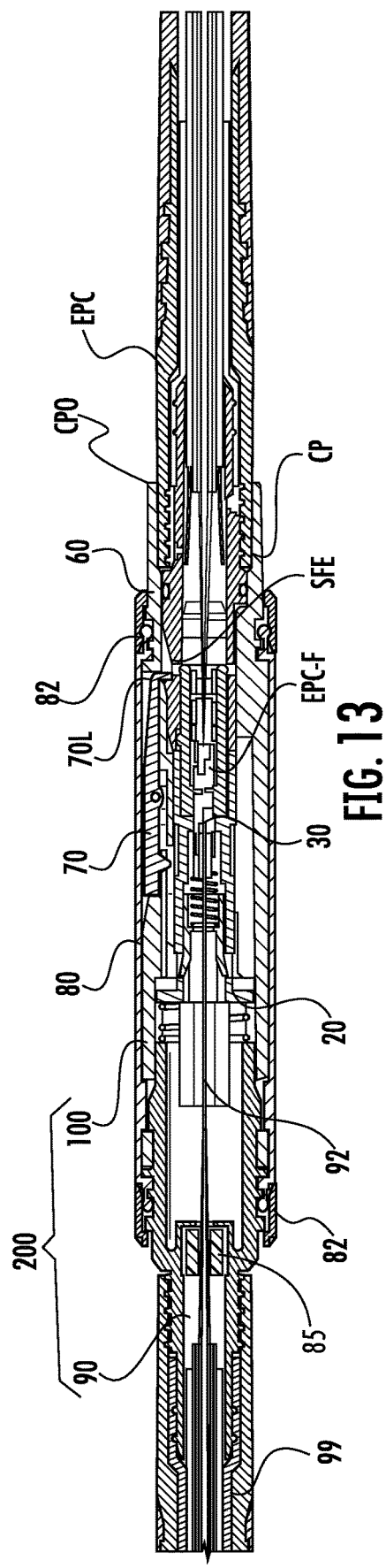
FIG. 13 is a longitudinal cross-section view of the fiber optic cable assembly with the external male plug connector received and retained within the connection port of the female fiber optic connector.

When the rocker latch arm 70 is biased to the normally-retain position, the external plug connector (EPC) may be secured in the connection port (CP) of the female connector 100 by pushing the external plug connector (EPC) into the connection port (CP). Specifically, the external plug connector (EPC) is rotationally aligned and pushed into the connection port (CP) of the female connector until a securing feature (SF) of the external plug connector (EPC) is secured by an actuator. Although, the explanatory concepts are depicted with an actuator configured as a rocker latch arm 70 of the female connector 100, other suitable actuators are possible such as a slider or rotating collar that may be a single component or use multiple components for cooperating with the external plug connector (EPC) as shown in FIG. 3 Specifically, as the external plug connector (EPC) is pushed into the connection port (CP) the profile of the external plug connector (EPC) pushes the latch 70L upward allowing insertion of the external plug connector (EPC) until the securing feature (SFE) of the external plug connector (EPC) reaches the latch 70L. Once the securing feature (SFE) of the external plug connector (EPC) reaches the latch 70L of the rocker latch arm 70, then the one or more resilient member 75 biasing the rocker latch arm 70 move to the latch 70L to the retain position and secure the external plug connector (EPC) in the connection port (CP) of the female connector 100 such as shown in FIG. 13. Likewise, the securing of the dust plug 101 with its securing feature 101SF occurs in a similar manner as shown in FIG. 9. Thus, mating between the female connector 100 and the external plug connector (EPC) or the dust plug 101 does not require turning a coupling nut or bayonet for making an optical connection.

Any suitable geometry or construction may be used for the actuator or rocker latch arm 70 of the female connector 100 disclosed herein. Also any suitable material may be used for the actuator or rocker latch arm 70 such as a polymer, metal or the like. Likewise, the one or more suitable resilient members 75 may be used for biasing the rocker latch arm 70 to a retain position. By way of example, the one or more resilient members 75 may be a coil spring, a leaf spring, a wave spring or a torsional spring as desired. FIGS. 4A-7 depict different constructions or arrangements for using one or more resilient members 75 for biasing the rocker latch arm 70 to a retain position. As depicted, rocker latch arm 70 comprises a portion that protrudes into the connection port (CP) of the female connector 100 when in the retain position.

FIGS. 4A and 4B depict rocker latch arm 70 comprises latch 70L on a forward end 70FE and a spring push 70SP on a rear end (or biasing end) 70RE. A portion of the one or more resilient members 75 cooperate with the rear end or biasing end 70RE of the rocker latch arm as shown. Rocker latch arm 70 has a pivot point 70P disposed between the forward end 70FE and the rear end 70RE. The pivot point 70P allows the rocker latch arm 70 to pivot relative to the female connector 70. As depicted, a main barrel 60 may comprise at least one slot 60S sized for receiving the latch 70L of the rocker latch arm 70.

FIGS. 4A and 4B show the rocker latch arm 70 being biased by one or more coil springs. When the rocker latch arm 70 is biased to the normally-retain position the latch 70L projects into the connection port (CP) as shown in FIG. 4A. When in the latch release 70LR of the rocker latch arm 70 is pushed downward with sufficient force the latch 70L moves to a position so it may release the device in the connection port such as no longer projecting into the connection port (CP) as shown in FIG. 4B. Select components of female connector 100 are not shown in FIGS. 4A and 4Bb for the sake of clarity.

Figure 4C:
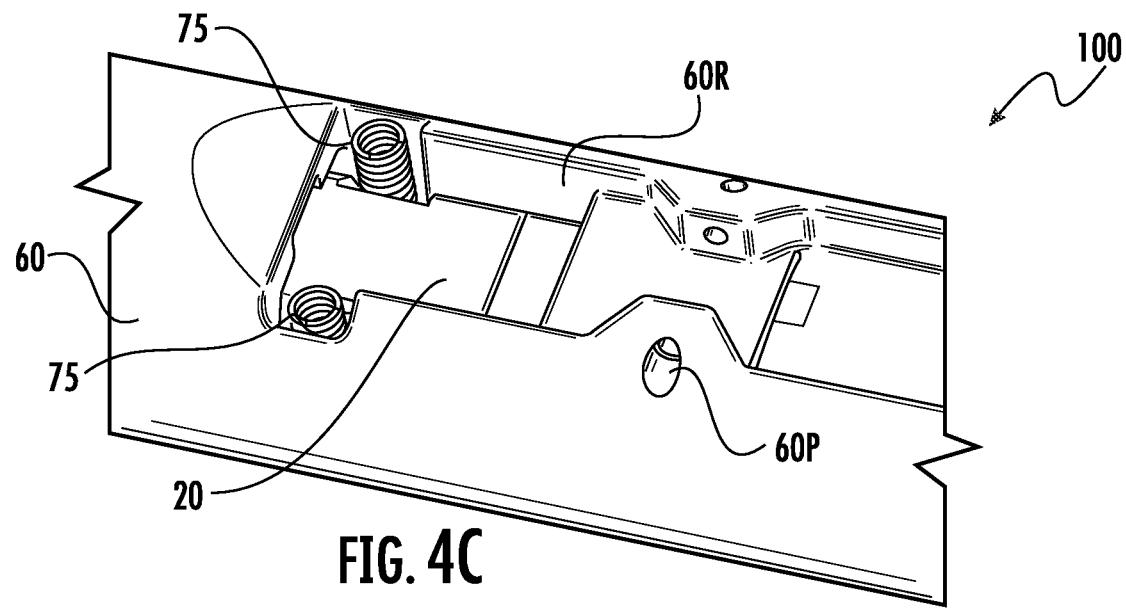
FIGS. 4C and 4D are partial views showing portions of a female fiber optic connector having a rocker latch arm biased by one or more resilient members.

FIG. 4C shows a portion of female connector 100 with the rocker latch arm removed for showing the arrangement of components among an inner barrel 20, main barrel 60 and one or more resilient members 75. As depicted, the inner barrel 20 is disposed within the main barrel 60. In this embodiment, inner barrel 20 has pockets (not numbered) for receiving a portion of the respective resilient members 75. Moreover, main barrel 60 may be shaped for cooperating with the inner barrel 20 for creating pockets for the respective resilient members 75 such as arcuate cutouts or the like depending on the type of resilient member used. As shown in this embodiment, a portion of the one or more resilient members 75 is disposed between the inner barrel 20 and the main barrel 60, but other arrangements are possible.

Main barrel 60 may also comprise a recess 60R sized for receiving a portion of the rocker latch arm 70 if desired. The recess 60R allows the rocker latch arm 70 to fit into main barrel 60 and providing a smaller footprint for the female connector 100. Main barrel 60 may also comprises a pivot mount 60P. Pivot mount 60P may have any suitable structure for attaching the rocker latch arm 70. For instance, the rocker latch arm 70 may have a snap-fit attachment or use a retainer 70R. Retainer 70R may be any suitable device such as a pin, a clip or the like for pivotally attaching the rocker latch arm 70 to the main barrel 60 as desired.

FIG. 4C depicts a plurality of resilient members 75 disposed within the female connector 100. Specifically, two resilient members 75 are depicted for biasing the actuator of the female connector. In this case, a first resilient member 75 is disposed on a first side of recess 60R and a second resilient member 75 is disposed on a second side of recess 60R, but other arrangements are possible for the resilient members to bias the actuator. The first and second resilient members 75 are coil springs for biasing the rocker latch arm 75 to the normally-retain position when the female connector 100 is assembled. As shown, the pockets for the two resilient members are disposed on opposites sides and disposed under the rearward wings at the rear end 70RE of the rocker latch arm 70. Of course, other types, counts or arrangements for the resilient member 75 are possible with the concepts for the female connectors 100 disclosed herein.

Figure 4D:
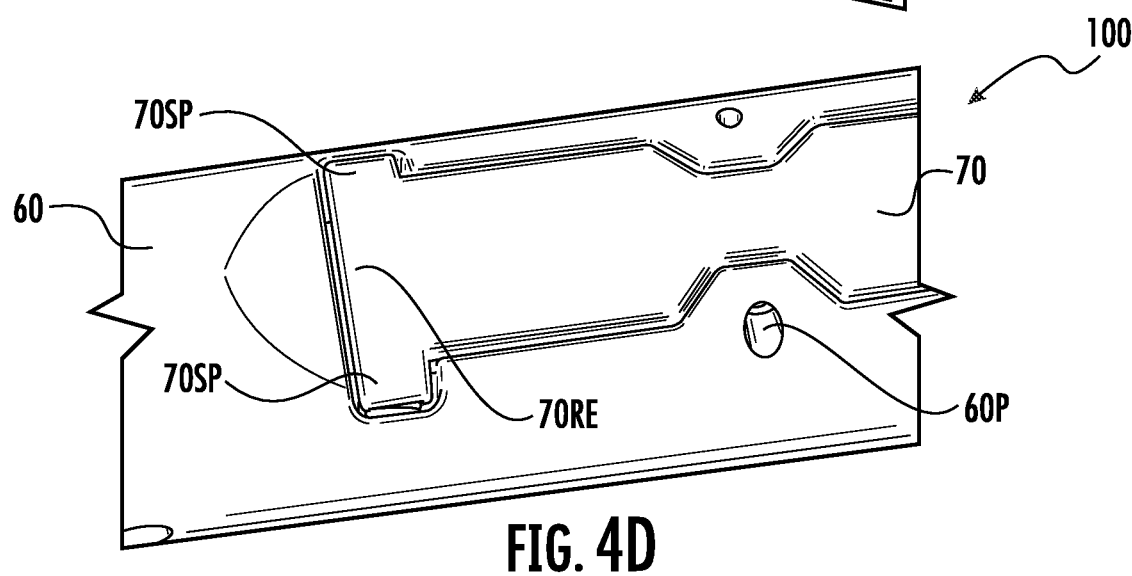
Figure 48:
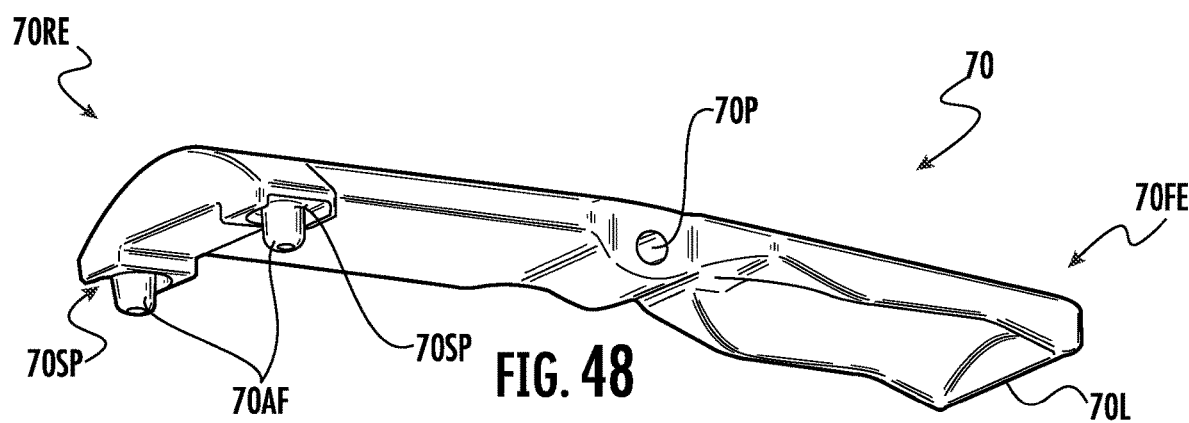
Figure 49:
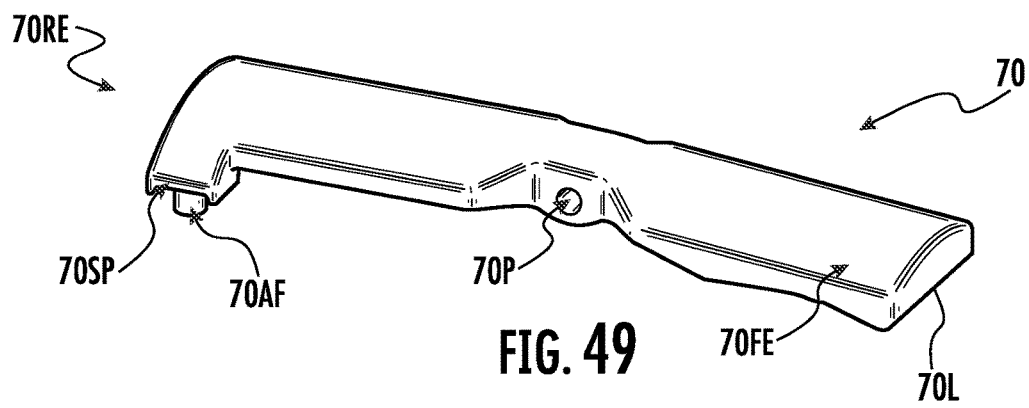

FIG. 4D shows the rocker latch arm 70 disposed within the recess 60R of main barrel 60 of the shown in FIG. 4C. One or more spring pushes 60P are disposed on a rear end 70RE of the rocker latch arm 70. This particular rocker latch arm 70 has a plurality of spring pushes 60 for cooperating with the resilient members 75. Specifically, this rocker latch arm has a first spring push 60P aligned over the first resilient member 75 and a second spring push 60P aligned over the second resilient member 75 at the rearward wings at the rear end 70RE. As depicted, the first and second spring pushes 60P are disposed on the outboard sides or wings of this rocker latch arm 70, but other configurations or arrangements are possible according to the concepts disclosed. Further details of this rocker latch arm 70 are shown in FIGS. 48 and 49.

Although the female connector concepts disclosed are shown with a main barrel and an inner barrel it may be possible to use the concepts without using an inner barrel and have the features on a main barrel. Using a main barrel without an inner barrel would be more complex to manufacture and/or assembly, but may be possible with the concepts disclosed and the concepts are not limited to designs requiring both an inner barrel and a main barrel as shown in the explanatory embodiments.

Figure 5A:
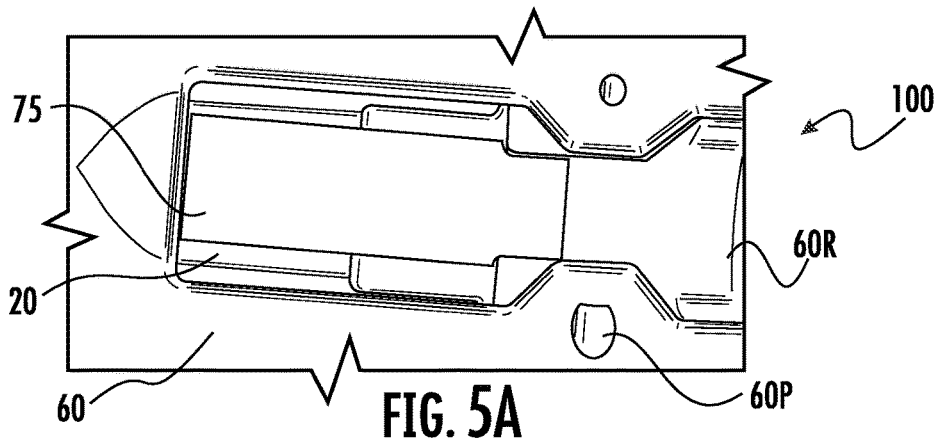
FIGS. 5A-5C are partial views showing portions of another female fiber optic connector having a rocker latch arm biased by one or more resilient members.
Figure 5B:
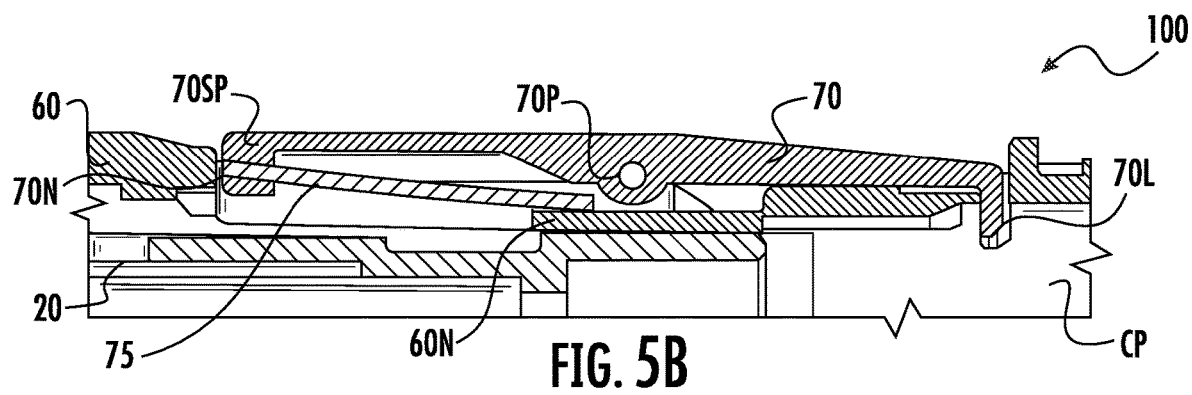
Figure 5C:
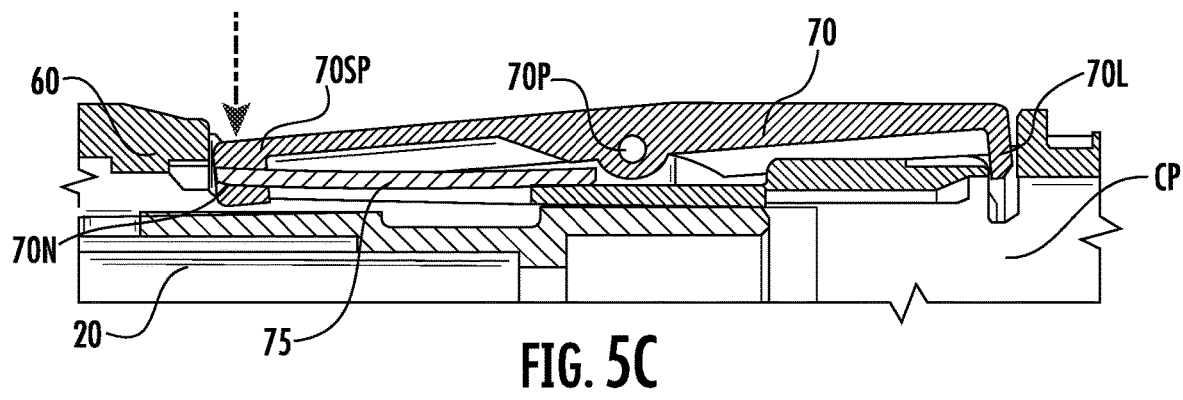

FIGS. 5A-5C depict another arrangement for explanatory female connectors 100 using the concepts disclosed herein. FIG. 5A shows a portion of a portion of female connector 100 with the rocker latch arm removed for showing the arrangement of components among the inner barrel 20, main barrel 60 and one or more resilient members 75. In this embodiment, a single resilient member 75 is used for biasing the rocker latch arm 70 to the normally-retain position. Resilient member 75 is configured as a leaf spring in this embodiment. As shown, resilient member 75 has a first end that fits within a notch 60N in the main barrel 60, and a second end disposed in a notch 70N disposed in the spring push 70SP of the rocker arm latch 70. Rocker arm latch 70 of this embodiment operates in a similar manner as discussed herein.

Figure 6A:
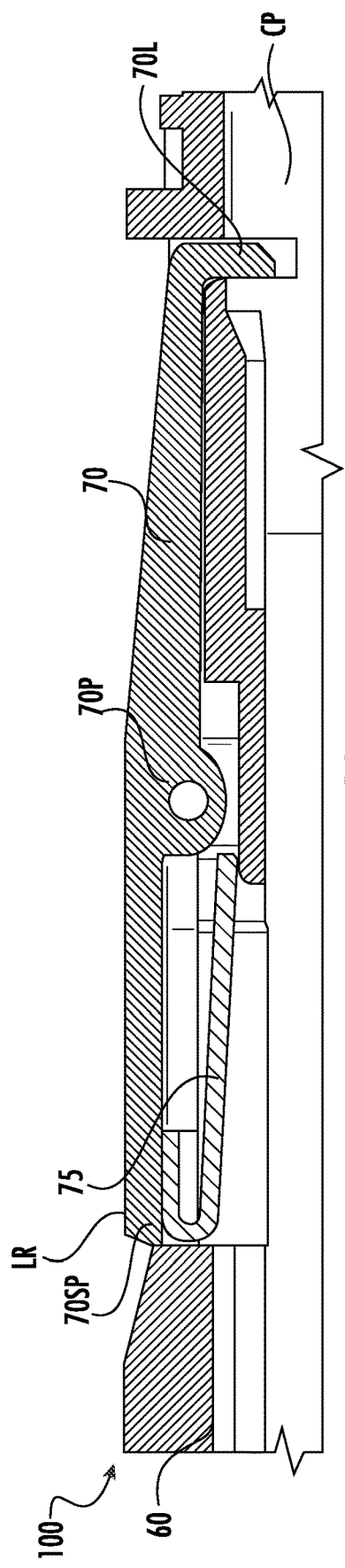
FIGS. 6A and 6B are views showing portions of still another female fiber optic connector having a rocker latch arm biased by one or more resilient members.
Figure 6B:
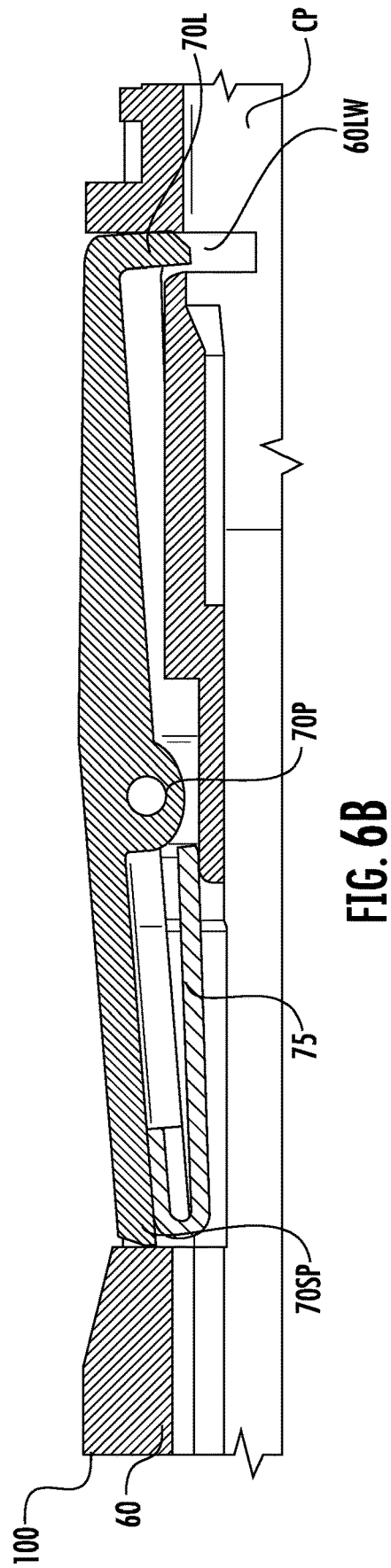

FIGS. 6A and 6B depict yet another arrangement for female connectors 100 using the concepts disclosed herein. FIG. 6A shows a single resilient member 75 is used for biasing the rocker latch arm 70 to the normally-retain position. Resilient member 75 is configured as a leaf spring in this embodiment. As shown, resilient member 75 has a first end that fits within a notch 60N in the main barrel 60, and a second end disposed in a notch 70N disposed in the spring push 70SP of the rocker arm latch 70. However, this embodiment of the resilient member 75 has a hairpin turn at the rear end for attaching to the spring push 70SP. Rocker arm latch 70 of this embodiment operates in a similar manner as discussed herein.

Figure 7A:
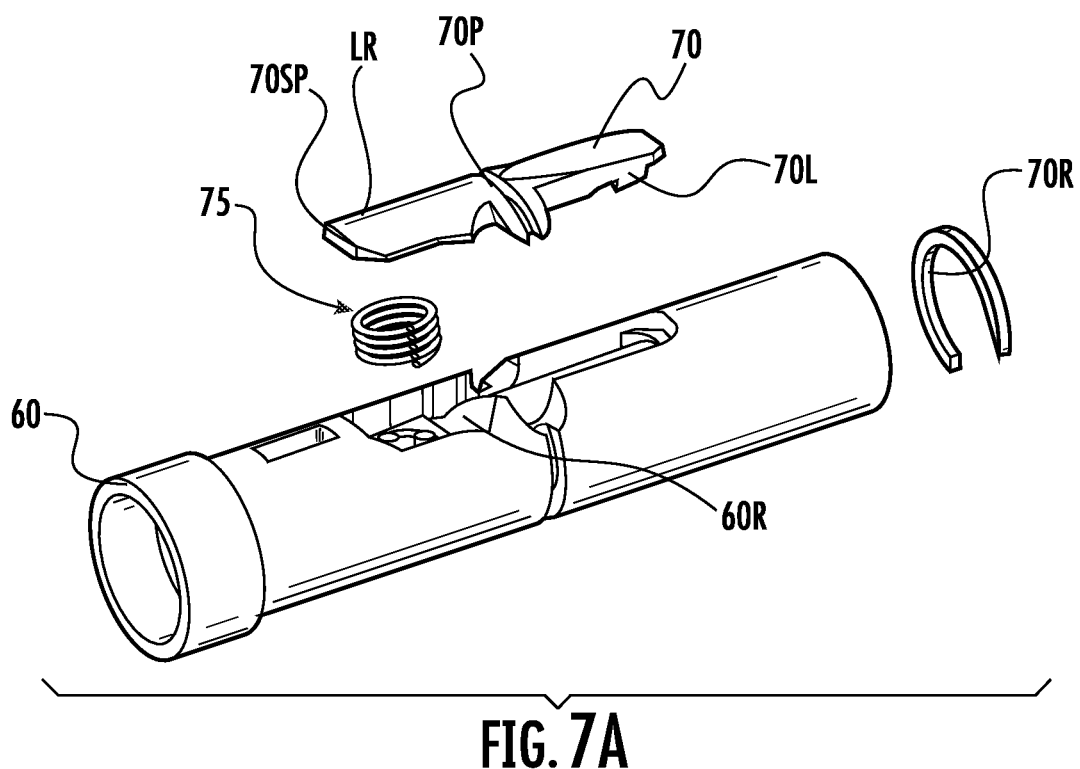
FIG. 7A shows portions of yet another female fiber optic connector having a rocker latch arm that is biased by one or more resilient members.

FIG. 7A depicts yet another arrangement for female connectors 100 using the concepts disclosed herein. FIG. 7A shows an partially exploded view of female connector 100 comprising rocker latch arm 70 that is biased by resilient member 75 to the normally-retain position. Although only a single resilient member 75 is shown a plurality of resilient members 75 may be concentrically disposed for biasing the spring push 70P of the rocker latch arm 70 to the normally-retain position. The resilient members 75 may have their restoring forces selected for tailoring the forces desired. In this embodiment, the rocker latch arm 70 is pivotally mounted to the main barrel 70 using a retainer 70R configured as a clip, but other retainers are possible for attaching the rocker latch arm 70 to the main barrel 60 such as a pin, screw, etc.

Figure 7B:
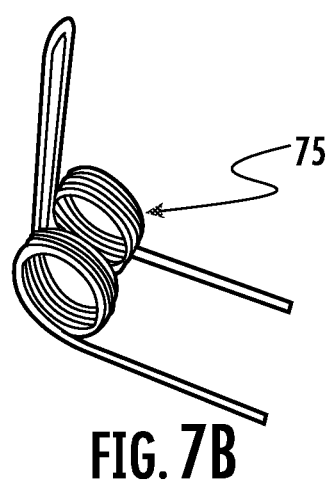
FIG. 7B depicts another resilient member that may be used with the rocker latch arm of a female fiber optic connector.

Still other types of resilient members may be used with the concepts disclosed. By way of example, FIG. 7B shows a resilient member 75 configured as a torsional spring that may be used with the concepts disclosed. Using one or more resilient members 75 configured as a torsional spring as shown may require a mounting for the coiled portion. However, it may also be possible for mounting the coiled portion at the pivot 70P, but this could increase the size of the female connector 100.

The one or more resilient members 75 provide a suitable downward retention force (RF) for maintaining the latch 70L of the rocker latch arm 70 in the retain position as depicted in FIG. 4A. Moreover, the restoring force provided by the one or more resilient members 75 at the spring push 70SP of the rocker latch arm 70 may have a multiplying factor due to the position of the pivot 70P relative to the length of the rocker latch arm rearward of the pivot to the spring push 70SP versus the length of the arm forward of the pivot 70P to the latch 70. In other words, the arm lengths for the rearward portion and the forward portion from the pivot may not be equal.

By way of explanation, the arm length from the pivot 70P to the spring push 70SP may have a normalized length of 1 unit, and the arm length from the pivot 70P to the latch 70P may have a normalized length of 1.1 units, thereby providing a multiplying factor to the restoring force (RF) provided by the one or more resilient members 75. The downward retention force (RF) for maintaining the latch 70L in the retain position may have any suitable value. By way of example, the downward retention force (RF) for maintaining the rocker latch arm 70 or latch 70L in the retain position is between 5 Newtons and 15 Newtons (N). In other embodiments, the downward retention force (RF) for maintaining the rocker latch arm 70 or latch 70L in the retain position is between 7N and 12N, but other ranges for the downward retention force (RF) are possible using the concepts disclosed.

Figure 10:
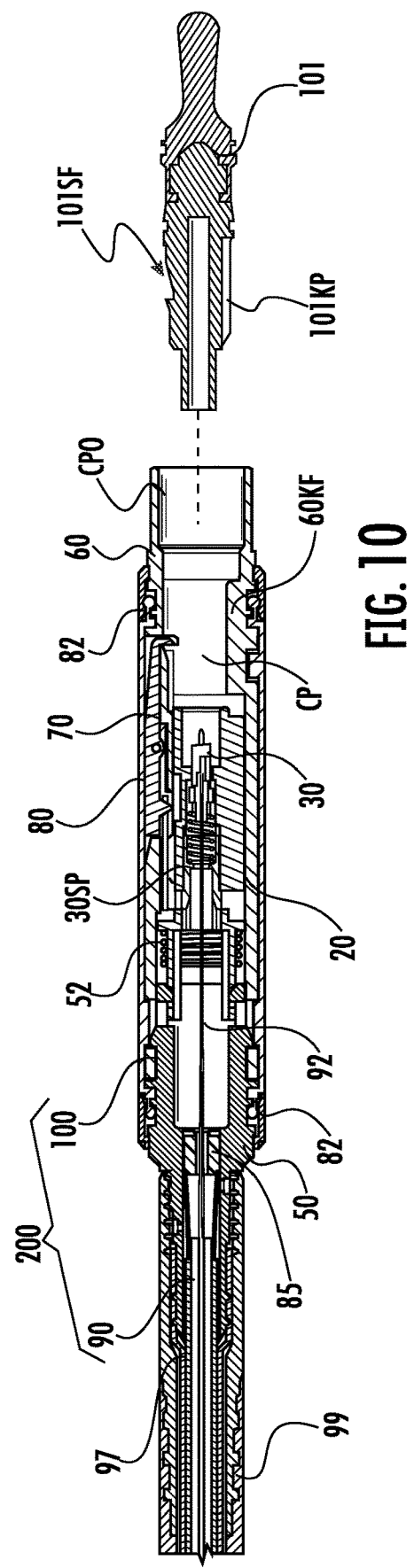
FIG. 10 is a longitudinal cross-sectional view of the fiber optic cable assembly having the female fiber optic connector with the dust plug aligned for insertion into the connector port of the female fiber optic connector.
Figure 14:
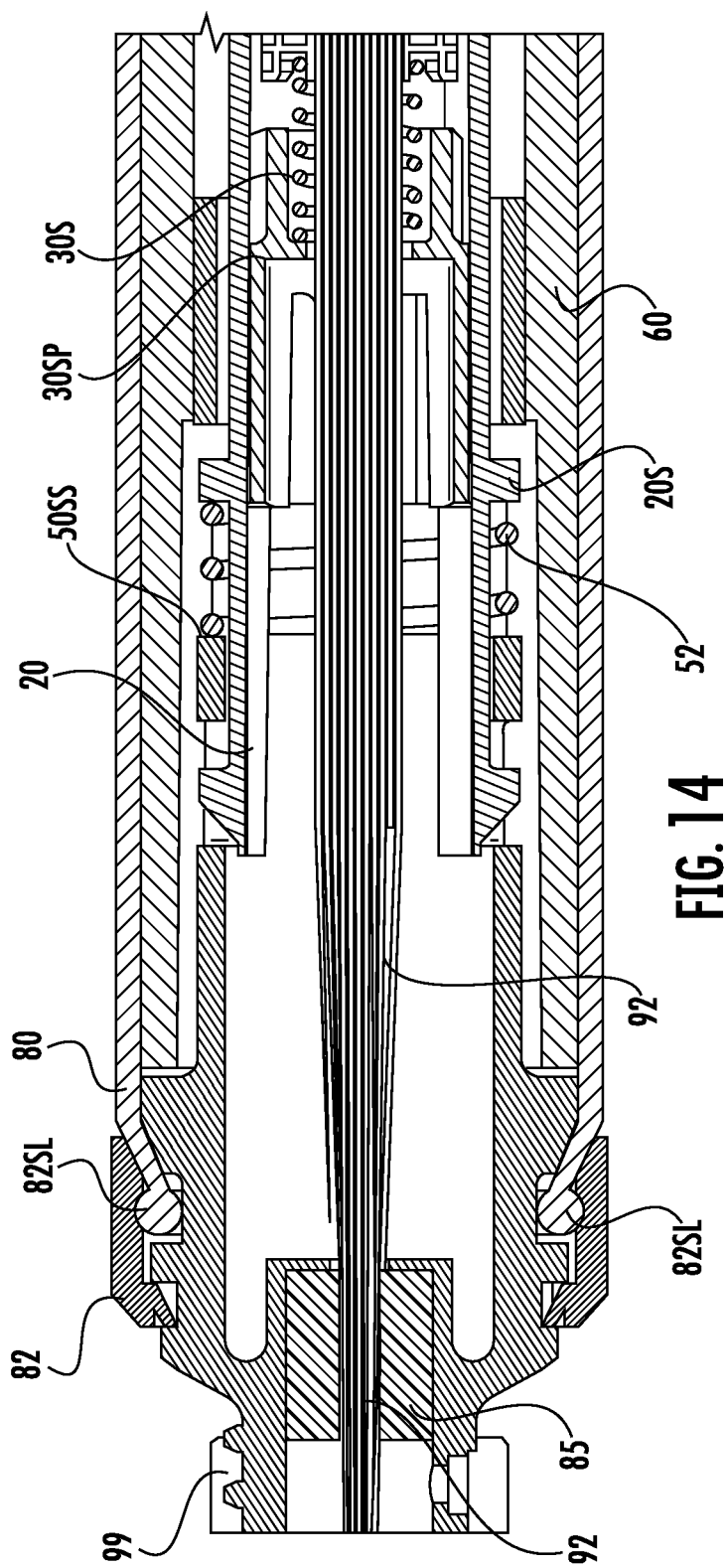
FIG. 14 is a detailed sectional view of the rear portion of the female fiber optic connector depicting an optional weatherproofing collar having compression caps at opposing ends or not.
Figure 14A:
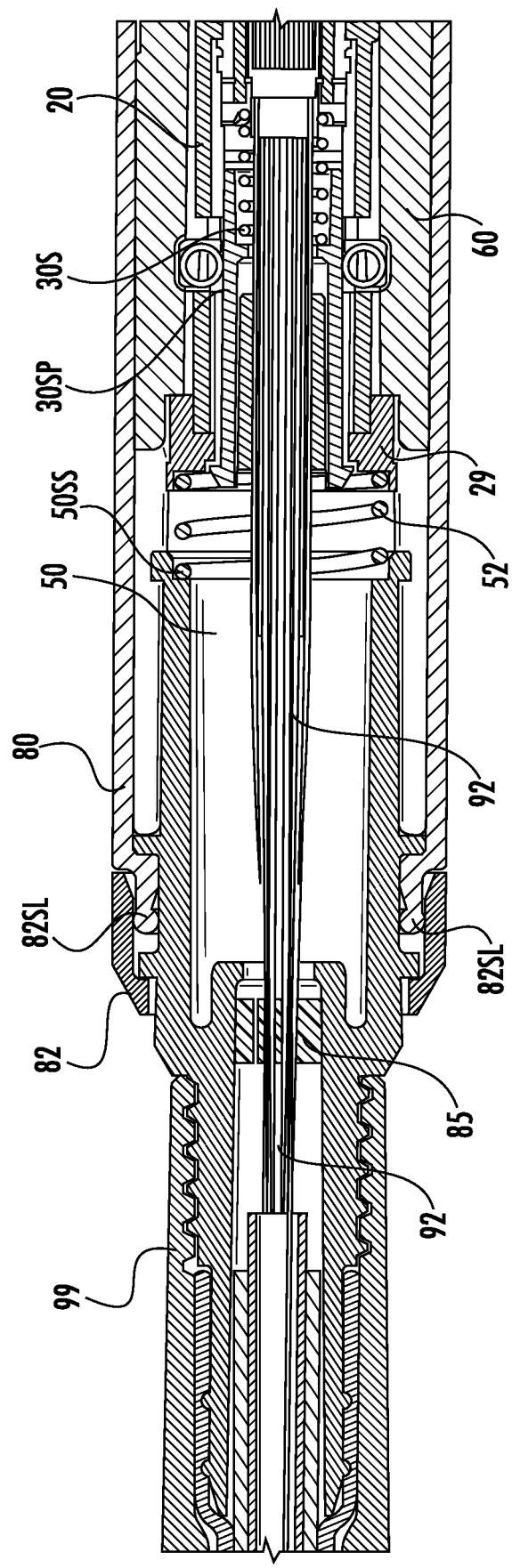
FIGS. 14A and 14B are detailed sectional views of the rear portion of a female fiber optic connector taken along orthogonal sections of the connector depicting another optional weatherproofing collar having a different end profile that may also use compression caps at opposing ends or not.
Figure 14B:
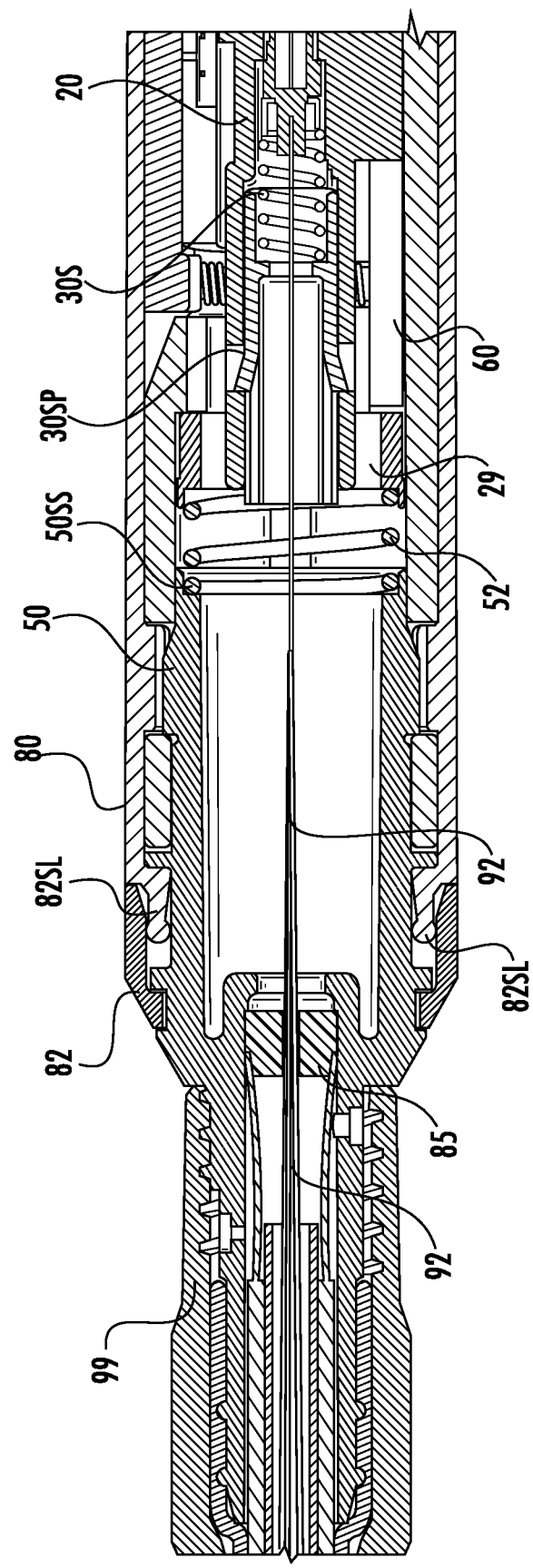

Still other arrangements are possible for biasing the rocker latch arm 75 to a normally-retain position. FIG. 8 is an exploded view of an explanatory female connector 100, and FIGS. 9 and 10 are longitudinal cross-sectional views of the fiber optic cable assembly 200 with the female connector 100. FIGS. 11 and 12 show details of the female connector 100 mating with a dust plug 101, which are similar to how the female connector 100 mates with the external plug connector (EPC), and FIG. 13 shows the female connector 100 mated with the external plug connector (EPC). FIG. 14 is a detailed partial sectional view of the rear portion of the female connector 100 having the optional weatherproofing collar 80, and FIGS. 14A and 14B show another variation of the optional weatherproofing collar 80 with a different end profile.

The specific construction of the inner barrel 20 or main barrel 70 will depend on the type of resilient member 75 and/or rocker latch arm 70 used for the female connector 100. Thus, the explanatory female connector 100 and components explained in further detail are shown as an example to explain the construction and assembly of the female connector 100 and not limitation for the concepts disclosed herein.

As depicted, the explanatory female connector 100 comprises a ferrule 30, inner barrel 20, main barrel 60 and rocker latch arm 70. The rocker latch arm 70 may toggle between the retain and release positions like a light switch, thereby maintaining a retain position or a release position until the rocker latch arm is moved to the other position.

Alternatively, the female connector 100 may optionally comprise one or more resilient members 75 for biasing the rocker latch arm 70 to the normally-retain position as depicted. Like the other embodiments, a portion of the one or more resilient members 75 cooperates with rear end of the rocker latch arm 70 as shown. Again, rocker latch arm 70 comprises a pivot 70P suitable for pivoting relative to the main barrel 60 along with a latch 70L and a rear end 70RE, but other arrangements may be possible according to the concepts disclosed. As depicted in this embodiment, the resilient member 75 is configured as a leaf spring with a collar mount. This resilient member 75 shown in this embodiment is depicted in further detail in FIGS. 21 and 22.

FIG. 10 depicts dust plug 101 aligned with the connection port (CP) for the female connector 100 for insertion therein. Specifically, the keying portion 101KP of the dust plug 101 is aligned with the keying feature 60KP of the main barrel 60 as depicted. The keying feature 60KP may have any suitable shape such as a protrusion (i.e., key) or keyway. In this embodiment, the keying feature 60KP is configured as a male keying feature. The male keying feature protrudes into the connection port (CP) and inhibits the insertion of a non-compliant connector into the connector port (CP). The keying feature 60KP is clocked relative to the latch 70L of the rocker latch arm 70 in the desired orientation for mating with compliant devices.

By way of explanation and not limitation, the rocker latch arm 70 is disposed opposite from the keying feature 60KF on the main barrel (60). Consequently, the securing feature and keying portions on suitable mating devices will have a similar orientation to allow mating with the connection port. Consequently, the securing feature 101SF of the dust plug 101 is also disposed on the opposite side from the keying portion 101KP as shown in FIG. 10 (i.e., clocked about 180 degrees apart), thus the latch 70L of the rocker latch arm 70 is aligned with the securing feature 101SF of the dust plug when the keying portion 101KP is aligned with the keying feature 60KF of the main barrel 60.

Other clocking orientations between the keying feature 60KF and the rocker latch arm 70 of the female connector 100 are also possible according to the concepts disclosed instead of being disposed on the opposite side of the main barrel 60 (i.e., about 180 degree apart). By way of explanation, the clocking orientation between the keying feature 60KF and rocker latch arm 70 may be about 45, 90 or 135 degrees in either rotational direction as desired.

FIG. 11 shows the rocker latch arm 70 translating as the dust plug 101 is inserted into the connection port (CP) of female connector 100 as represented by the arrow pointing to the left. The external male plug connector (EPC) will also translate the rocker latch arm (70) as it is inserted into connection port (CP) of the female connector 100 in a similar manner, and it will not be illustrated for the sake of brevity. As depicted, as the dust plug 101 or external plug connector (EPC) is inserted into the connection port (CP) the housing pushes the latch 70L upward and depresses the resilient member 75 during the translation during insertion.

Once the dust plug 101 or external plug connector (EPC) is fully-inserted into the connection port (CP) so the latch 70L of the rocker latch arm 70 is aligned with the securing feature 101SF of the dust plug 101 or the securing feature (SFE) of the external plug connector (EPC), then the resilient member 75 biases the latch 70L to the normally-retain position as represented by the arrow shown in FIG. 12, thereby securing the dust plug 101 or external plug connector (EPC) in the connection port (CP). FIG. 13 shows the external male plug connector received and retained within the connection port (CP) of the female connector 100 so the optical fibers its ferrule (EPC-F) are in a mated state with the optical fibers 92 disposed in ferrule 30 for optical communication therewith. Additionally, the female connector 100 may be constructed so that the dust plug 101 or external plug connector (EPC) are slightly pushed outward when the rocker latch arm 70 is translated to the release position.

Figure 42:
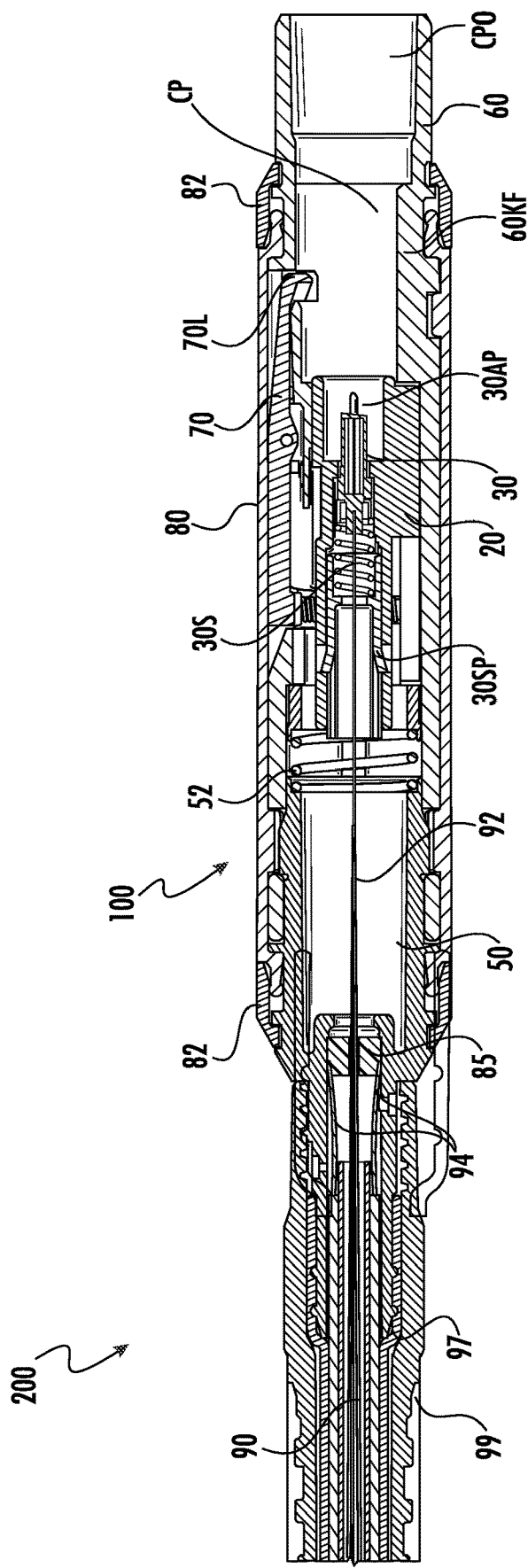
Figure 43:
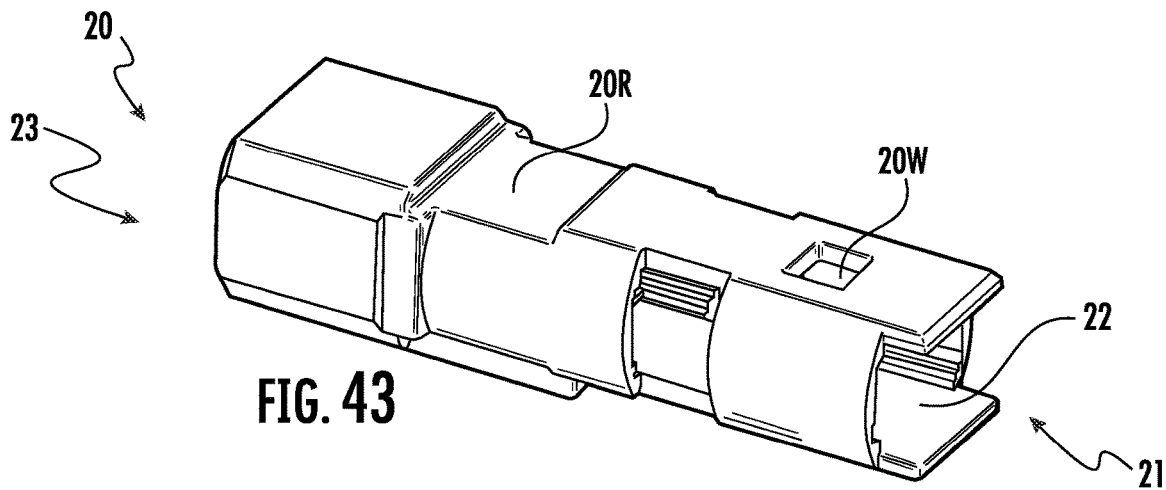
Figure 44:
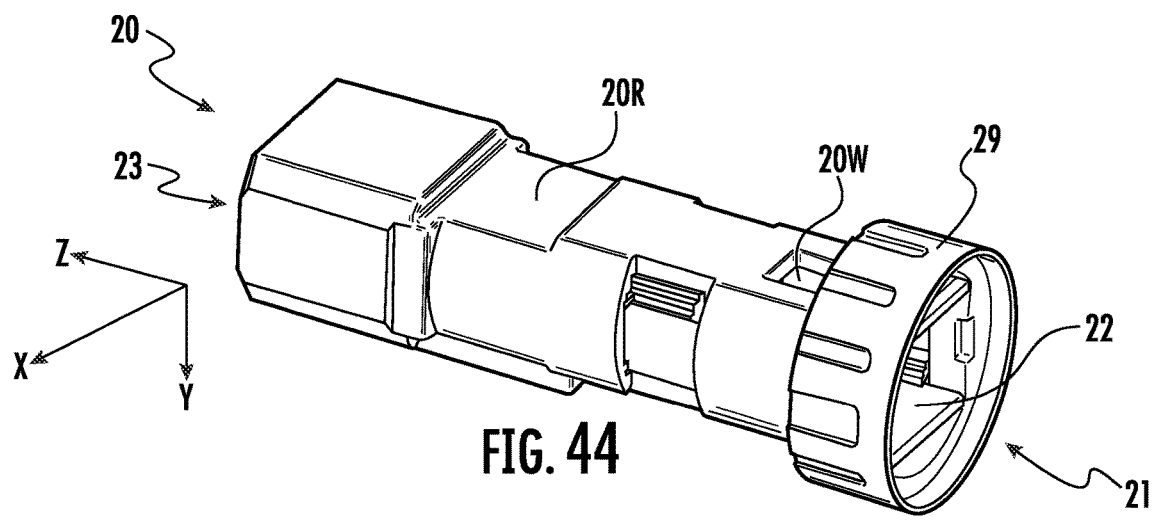

The securing feature 101SF dust plug 101 or securing feature (SFE) of the external plug connector (SFC) may have any suitable geometry for cooperating with the latch 70L of the female connector 100. By way of example, the securing feature 101SF of the dust plug 101 or securing feature (SFE) of the external plug connector (EPC) may be configured as a ramp with a ledge as the securing feature such as depicted in FIG. 10 or 42. The ramp and ledge allow for a push and retain feature for securing the dust plug 101 or external plug connector (EPC) in the connection port (CP) of the female connector 100. The securing feature may also comprise a flat portion disposed between the ramp and ledge if desired. Of course, other securing features or configurations are possible using the concepts disclosed herein.

The explanatory female connector 100 depicted may optionally comprise further components as desired. By way of explanation, female connector may further comprising a rear spring push 50. Rear spring push 50 may perform one or more functions for female connector 100. Rear spring push 50 be used for biasing inner barrel 20 to a forward position relative to main barrel 20. Specifically, rear spring push 50 traps a spring 52 between the rear spring push 50 and the inner barrel 20, thereby biasing the inner barrel 20 to a forward position relative to main barrel 60.

Rear spring push 50 may also comprise a cable strain relief portion. The cable strain relief portion may have one or more apertures leading to a cavity that may be filled with an adhesive or the like for securing fiber optic cable 90 to the female connector 100. Alternatively, a cable 90 may be strain-relieved to an outer portion of the rear spring push 50 depending on the cable construction. Other methods are also possible for securing fiber optic cable 90 to the female connector 100. Moreover, embodiments of female connector 100 need not have the spring push 50, and instead could incorporate features into the inner barrel 20 if desired, but this may result in a more complex part that is more difficult to manufacture.

As depicted, female connectors 100 may also optionally comprise a weatherproofing collar 80 if a ruggedized female connector is desired. As well-known to the skilled person, a ruggedized connector is suitable for outdoor plant applications and provides environmental protection that may be experienced in the outdoor environment. On the other hand, indoor optical connectors or optical connectors that are protected by an enclosure do not require the same type of protection from the environment as connectors used for outdoor applications.

Weatherproofing collar 80 is sized for being disposed about a portion of the main barrel 60 or female connector 100 as depicted in FIG. 9. As depicted, weatherproofing collar 80 covers the actuator such as the rocker latch arm 70 and inhibits dust, dirt, debris, moisture and the like from entering the female connector 100 at the interface between the rocker latch arm 70 and the main barrel 60 while allowing access to the connection port opening (CPO). Weatherproofing collar 80 may also comprise a marking indicia for indicating the location of the latch release of the rocker latch arm 70 to the user as depicted in FIG. 1. Marking indicia may be a raised portion to provide a tactile indication or marking on the weatherproofing collar 80 for the location of the latch release.

Weatherproofing collar 80 may be formed by any suitable material that provides environmental protection of the female connector 100 while still allowing the rocker latch arm 70 to translate between the retain position and the release position, and vice versa. Weatherproofing collar 80 may be formed from any suitable material for the desired environment. By way of example, weatherproofing collar 80 may be formed from an elastomeric material or other rubber-like material suitable for an outdoor environment. Generally speaking, using an elastomeric material for the weatherproofing collar 80 allows deformation of the weatherproofing collar 80 under load while being able to restore (or mostly restore) to its original shape when the load is removed. Moreover, elastomeric materials have a relatively high tear strength, are highly waterproof and resist corrosion, thereby making them a good candidate for the weatherproof collar 80. Consequently, the weatherproofing collar 80 may directly interface with the actuator of the female connector for moving from a normally-retain position to a release position during operation without tearing and then returning to its original shape while still providing suitable protection from dirt, debris, moisture and the like for weatherproofing female connector.

The weatherproofing collar 80 comprises a longitudinal cylinder having open ends so it may be slid over a portion of the female connector 100. One or more of the open ends of the weatherproofing collar 80 may be attached or sealed at the respective end to the female connector 100 using any suitable means if desired. The attaching or sealing of the one or more ends of the weatherproofing collar 80 may use a separate component or not. By way of example, the one or more ends of the weatherproofing collar 80 may be sealed using an adhesive, a crimp-band, a clip such as a circlip, a cap, heat-staking, ultra-sonic welding, or the like.

The weatherproofing collar 80 may also have other features for aiding in the attachment or sealing of one or more ends. For instance, the respective ends of weatherproofing collar 80 may comprise one or more ends with an integrally-formed sealing portion 80SL such as shown in FIGS. 14-14B.

By way of explanation, sealing portions 80SL may have enlarged lips about the perimeter at one or more ends, thereby providing material that may be compressed for creating a weatherproof seal at the ends of the weatherproofing collar 80. Likewise, portions of the female connector 100 such as a front portion of the main barrel 60 or the rear spring push 50 may have geometry for cooperating with the one or more ends of the weatherproofing collar 80. For instance, portions of the female connector 100 may have recesses or grooves for seating the sealing portion 80SL of the weatherproofing collar 80. In other variations, portions of the female connector 100 may have slightly out of round outer geometry where the sealing portions 80SL of the weatherproofing collar 80 engage. Other sealing portions 80SL for the weatherproofing collar 80 may include reservoirs or cavities for receiving an adhesive, material for sonic-welding or the like.

By way of one specific example, one or more caps 82 may be disposed at the interface between the ends of weatherproofing collar 80 and the female connector 100. One or more caps 82 cooperate with the weatherproofing collar 80 for attaching or sealing the respective ends of the same for inhibiting dirt, debris or moisture from. Caps 82 can compress the sealing portions 80SL of the weatherproofing collar 80 for inhibiting the ingress of dust, dirt, debris, moisture or the like at the one or more ends of the weatherproofing collar 80.

The geometry on respective portions of the female connector 100 may have geometry such as grooves, recesses or shoulders that cooperates with structure on the one or more caps 82 or other suitable component for aiding in the attachment of sealing such as by compression of a portion of one or more ends of the weatherproofing collar 80. In addition to the geometry on the female connector 100, the geometry of the one or more ends of the weatherproofing collar 80 may be tailored to cooperate with the cap 82 or other component for attaching or sealing the one or more ends. For instance, the one or more ends of the weatherproofing collar 80 may have rounded end shaped like a portion of an O-ring that may be compressed by cap 82. Likewise, the one or more ends of the weatherproof collar may have step-down shoulders and/or tapered end portions that fit into a groove or recess of the female connector 100 and cooperate with cap 82 or other like component. Cap 82 or other component may rotate for engaging the weatherproofing collar 80 or not depending on the design. In other embodiments, cap 82 or other component may push straight-on into position without rotating.

FIGS. 14A and 14B show partial sectional views of the rear portion of the female connector 100 taken along orthogonal sections depicting another optional weatherproofing collar 80 having a different end profile from the weatherproofing collar of FIG. 14. As shown, the weatherproofing collar 80 of FIGS. 14A and 14B comprises an end profile having a stepped-down shoulder that fits into the groove 60G of the main barrel 60. This embodiment allows a robust sealing interface between the weatherproofing collar 80 and the main barrel and may be used with or without a cap 82 as desired. Of course, still other methods or structures are possible for attaching or sealing the weatherproofing collar 80 to female connector 100.

Figure 31:
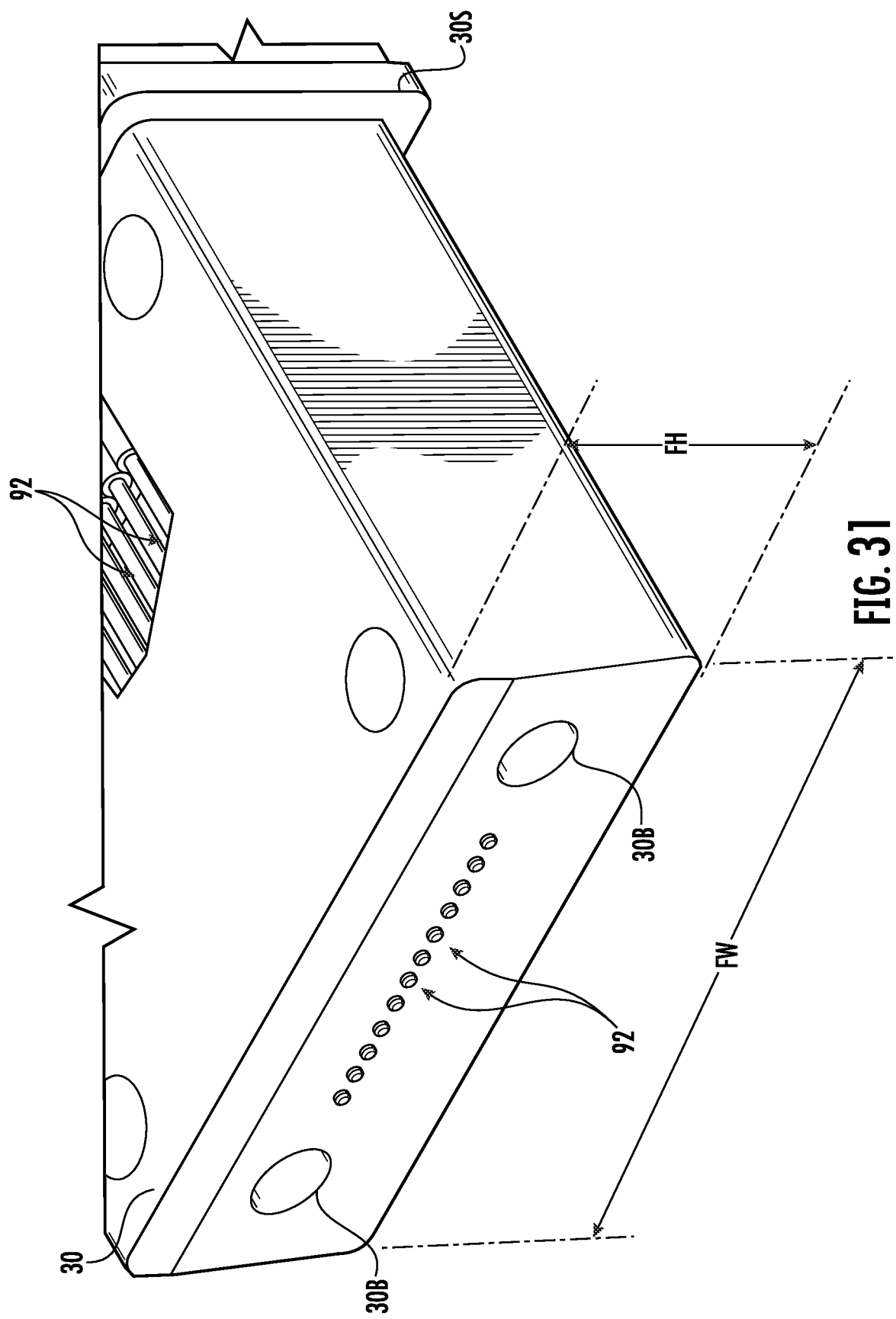

Ferrule 30 comprises one or more bores 32 as best shown in FIG. 31 for attaching one or more optical fibers 92 as known in the art. By way of example, ferrule 30 may be a MT, MPO ferrule, but other suitable ferrule are possible using the disclosed concepts such as one or more single fiber ferrules. When assembled, ferrule 30 is disposed within inner barrel 20.

Ferrule 30 may also be associated with other components as desired and may depend on the type of ferrule used by the female connector. In this embodiment, ferrule 30 is an MT or MTP® ferrule that may use alignment pins 30AP for mating with a complementary ferrule of the external plug connector (EPC) such as depicted in FIG. 13. Alignment pins 30AP are sized for cooperating with alignment bores 30B of ferrule 30 and provide precision alignment between mating ferrules of the female connector 100 and the external plug connector (EPC). Other ferrules may not require alignment pins 30AP or the alignment pins may be disposed on the external plug connector (EPC) if desired.

Ferrule 30 may be associated with other components as well such as a spring 30S. As shown, the ferrule 30 may be biased to a forward position within inner barrel 20 using spring 30S. Spring 30S may be captured within the inner barrel 20 using a spring push 30SP.

Figure 15:
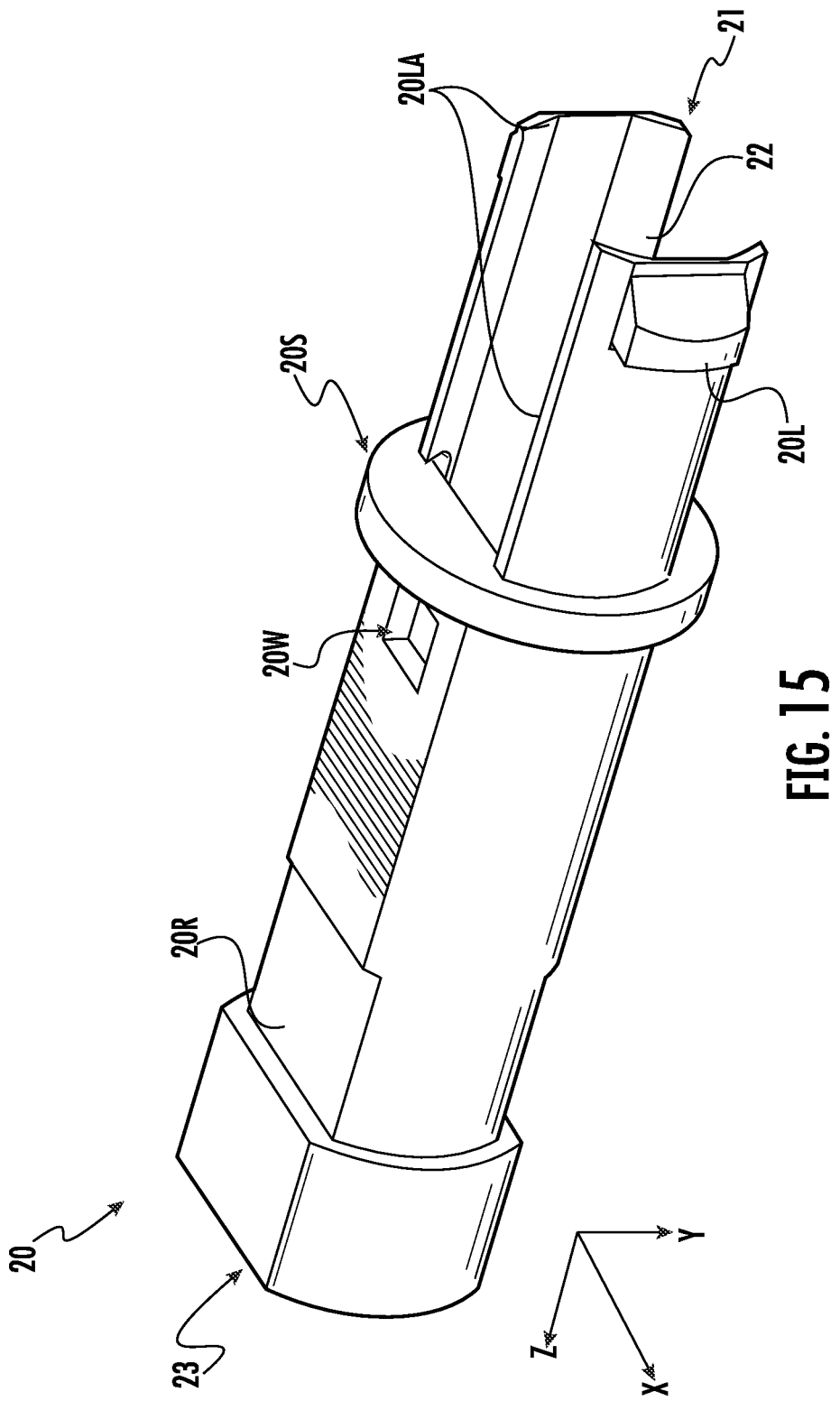
FIG. 15 is a rear perspective view of the inner barrel of the female fiber optic connector.
Figure 16:
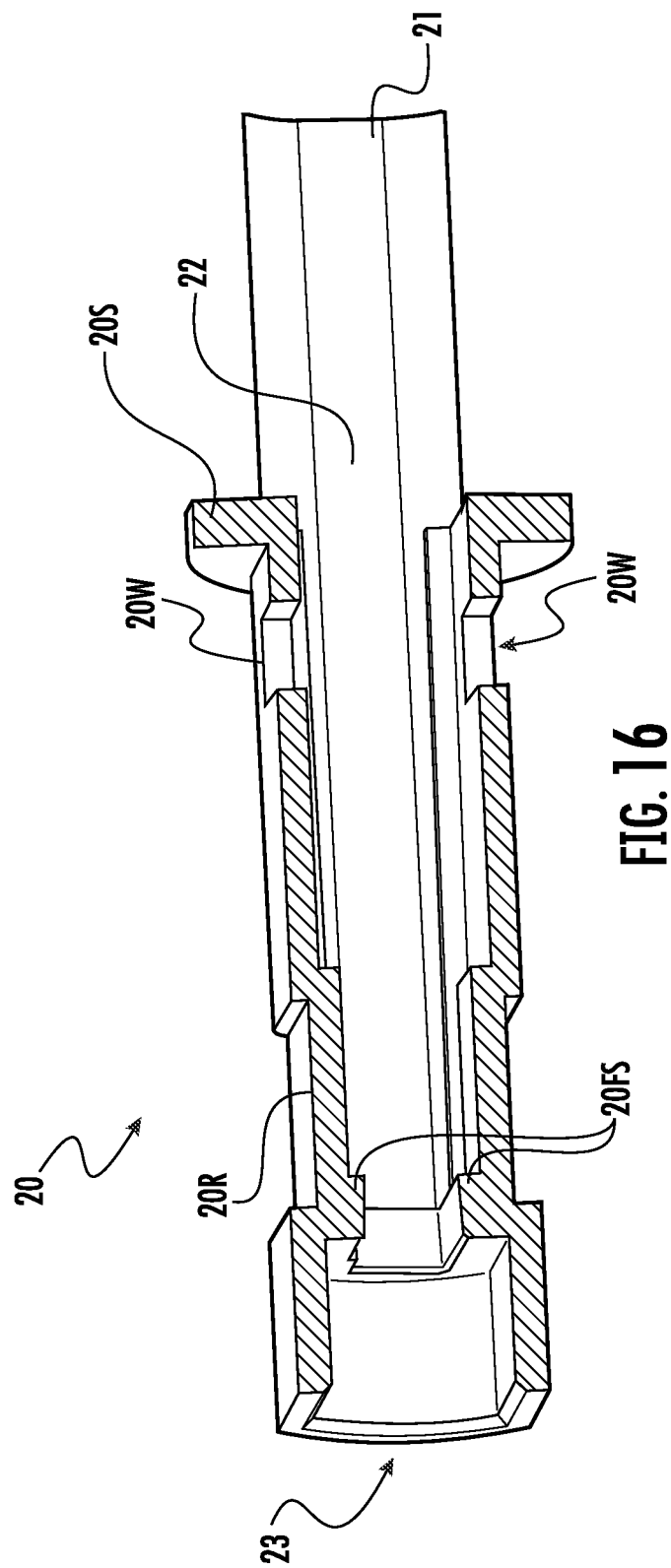
FIG. 16 is a sectional view of the inner barrel of the female fiber optic connector depicted in FIG. 15.
Figure 17:
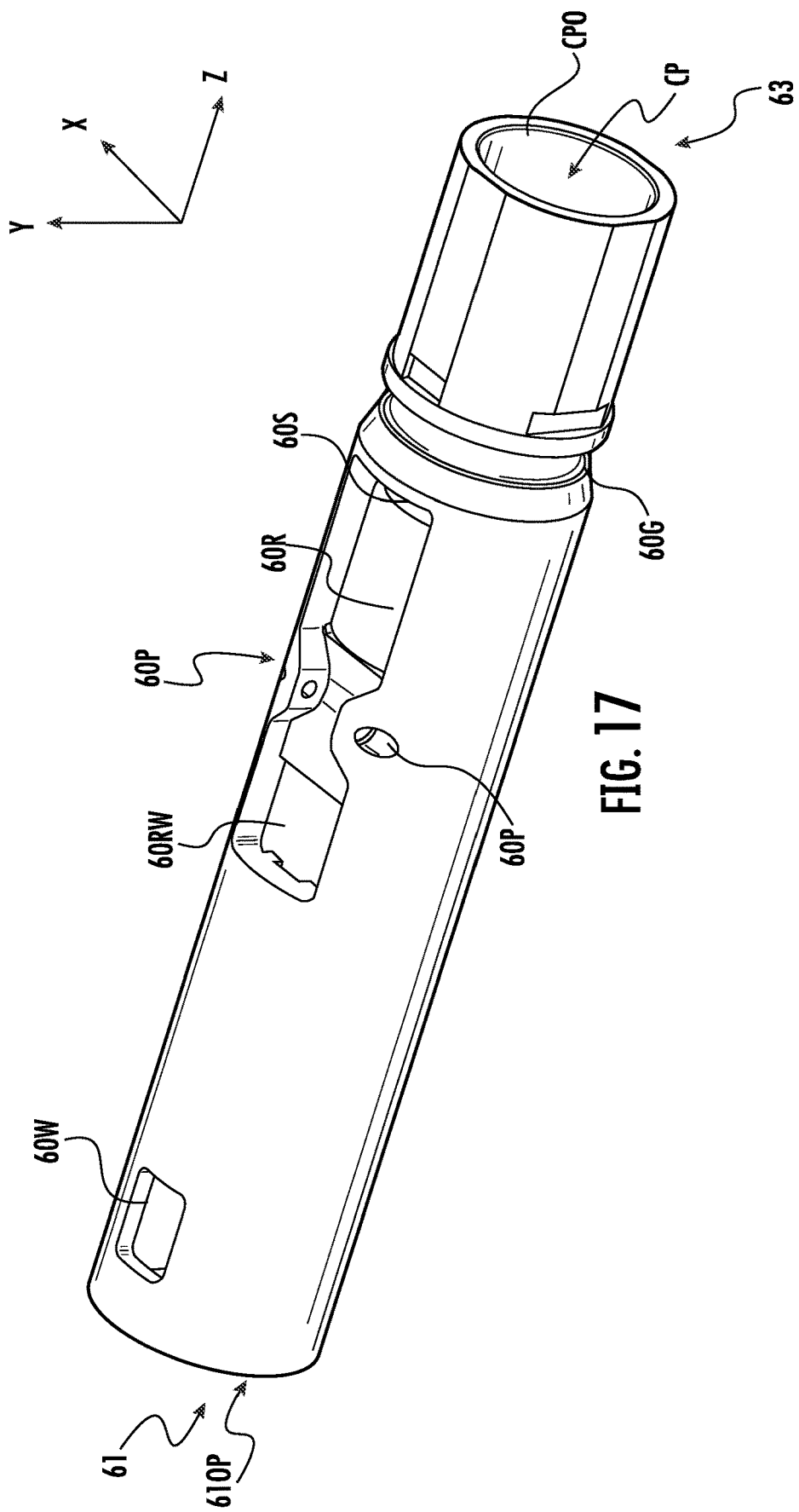
FIG. 17 is a front perspective view of the main barrel of the female fiber optic connector.
Figure 18:
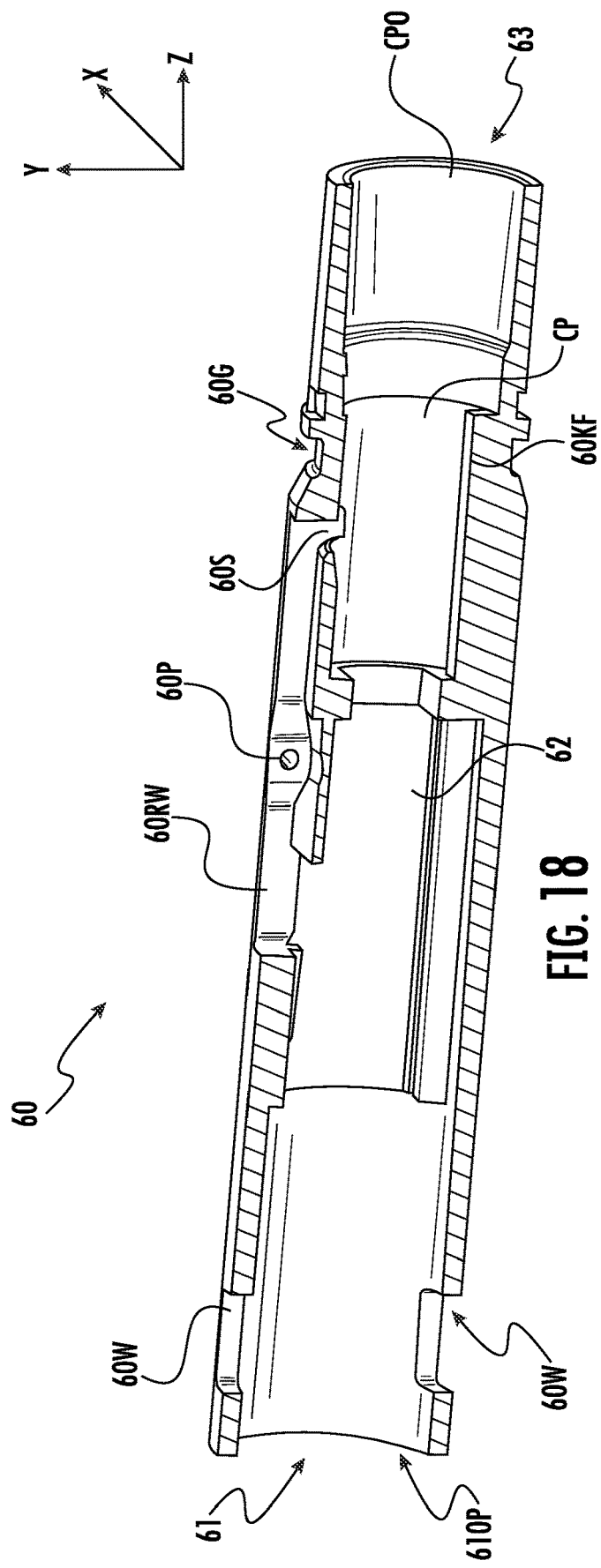
FIG. 18 is a sectional view of the main barrel of the female fiber optic connector depicted in FIG. 17.
Figure 23:
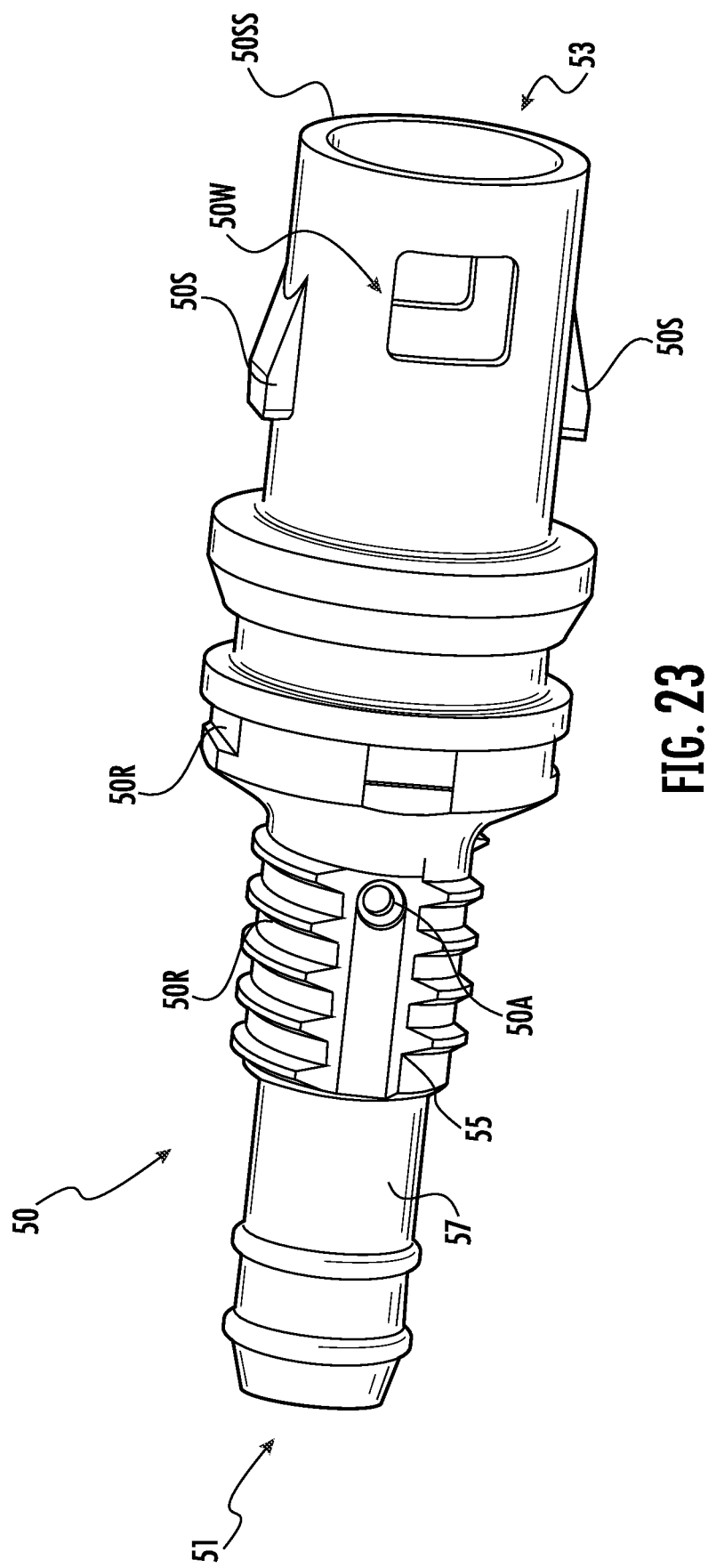
FIG. 23 is a perspective view of the rear spring push of the female fiber optic connector of FIG. 8.
Figure 24:
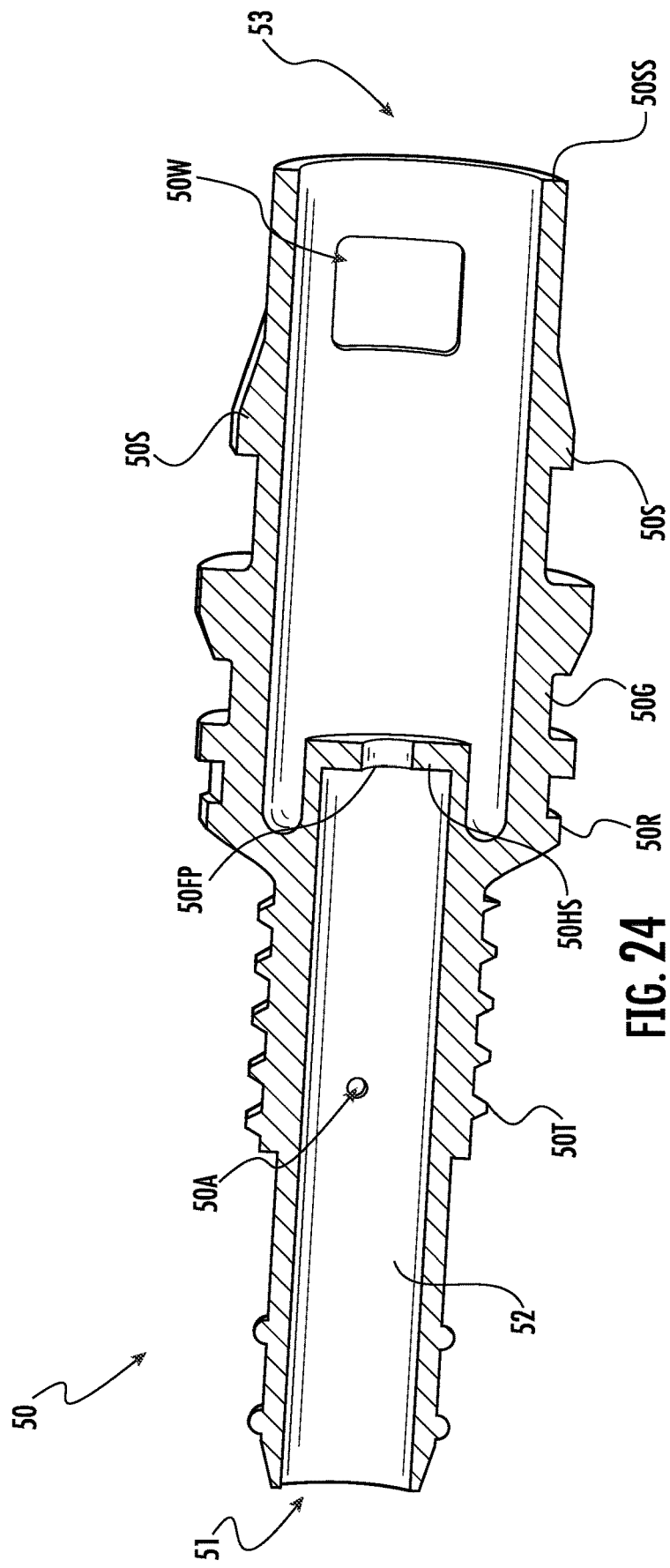
FIG. 24 is a sectional view of the rear spring push of the female fiber optic connector of FIG. 8.

Detailed views of components for the explanatory female connector 100 of FIG. 8 are shown in FIGS. 15-24, and FIG. 25 depicts an alternative inner barrel 20 as a further example of how components may different depending of the design. Specifically, FIGS. 15 and 16 show detailed views of inner barrel 20, FIGS. 17 and 18 show detailed views of main barrel 60, FIGS. 19 and 20 show detailed views of rocker latch arm 70, and FIGS. 21 and 22 show detailed views of the resilient member 75, and FIGS. 23 and 24 show detailed views of the spring push 50. Another explanatory female connector 100 similar to the female connector 100 of FIG. 8 is shown in FIGS. 41-52. The features and components for the explanatory female connectors will now be explained in further detail.

As best depicted in FIGS. 15 and 16, inner barrel 20 comprises an inner barrel rear end 21 and an inner barrel front end 23 with an inner barrel passageway 22 extending from the inner barrel rear end 21 to the inner barrel front end 23. The inner barrel rear end 21 of inner barrel 20 comprises an inner barrel rear end opening 210 sized for receiving the ferrule 30.

To assemble the ferrule 30 within the inner barrel 20 of female connector 100 the optical fibers 92 of fiber optic cable 90 are attached to ferrule 30, and then the alignment pins 30AP may be attached to the ferrule if used. The ferrule 30 with the alignment pins 30AP may be inserted into the inner barrel 20 from the inner barrel rear end opening 210 and the spring 30S and a ferrule spring push 30SP are slid forward so the spring push 30SP is attached to the inner barrel 20 for biasing the ferrule 30 to a forward position within the inner barrel 20. Spring push 50 may be attached to inner barrel in any suitable manner.

As best shown in FIG. 16, inner barrel comprises a ferrule stop 20FS within the longitudinal passageway 22 acting as a forward stop for the ferrule 30. Spring 30S biases the ferrule 30 forward to the ferrule stop 20FS. Ferrule stop 20FS limits travel of the ferrule 30 to the front of inner barrel 20, but the ferrule 30 is allowed to move rearward during mating as needed subject to the restoring forward-force of the spring 30S. Spring 30S aids in maintaining physical contact between optical fibers 92 disposed in the ferrule 30 when the female connector is in a mated state for optical connection.

Ferrule stop 20FS also defines a window (not numbered) for coarse alignment of the ferrule 30 within the inner barrel 20. In this embodiment, the ferrule window is a rectangular opening sized for an MT ferrule, but other shapes or sized may be used depending on the type of ferrule used in the female connector 100. Specifically, the window adjacent to ferrule stop 20FS is sized for a ferrule width FW and a ferrule height FH as shown in FIG. 31, while not allowing a ferrule shoulder 30S to pass thru the window of the inner barrel 20.

The disclosed female connector 100 may allow limited movement or "float" of the ferrule within the connector in the unmated state for allowing limited movement of the ferrule during mating with a complimentary device. The limited movement or "float" of the ferrule during mating allows two degrees of freedom of movement (X- and Y-axis) of the ferrule during mating. By way of example, the ferrule is allowed limited movement between about 100-400 microns of movement in the two degrees of freedom for allowing the ferrule to "float" in the unmated state, but other ranges of limited movement are possible for the movement of the ferrule within the connector. For instance, the ferrule may allowed limited movement between about 150-350 microns in the two degrees of freedom (X and Y directions) for allowing the ferrule to "float" within the connector in the unmated state, or the ferrule may allowed limited movement between about 200-300 microns of movement in the two degrees of freedom, thereby allowing the ferrule to "float" within the connector in the unmated state.

Inner barrel 20 may also include one or more windows 20W or other features for cooperating with retaining features such as latches or protrusions on the spring push 30SP for retaining the ferrule 30 and spring 30S within the inner barrel 20. Windows 20W are sized for receiving latches or protrusions on the ferrule spring push 30SP, thereby providing a snap-fit construction, but other structures are possible.

Figure 25:
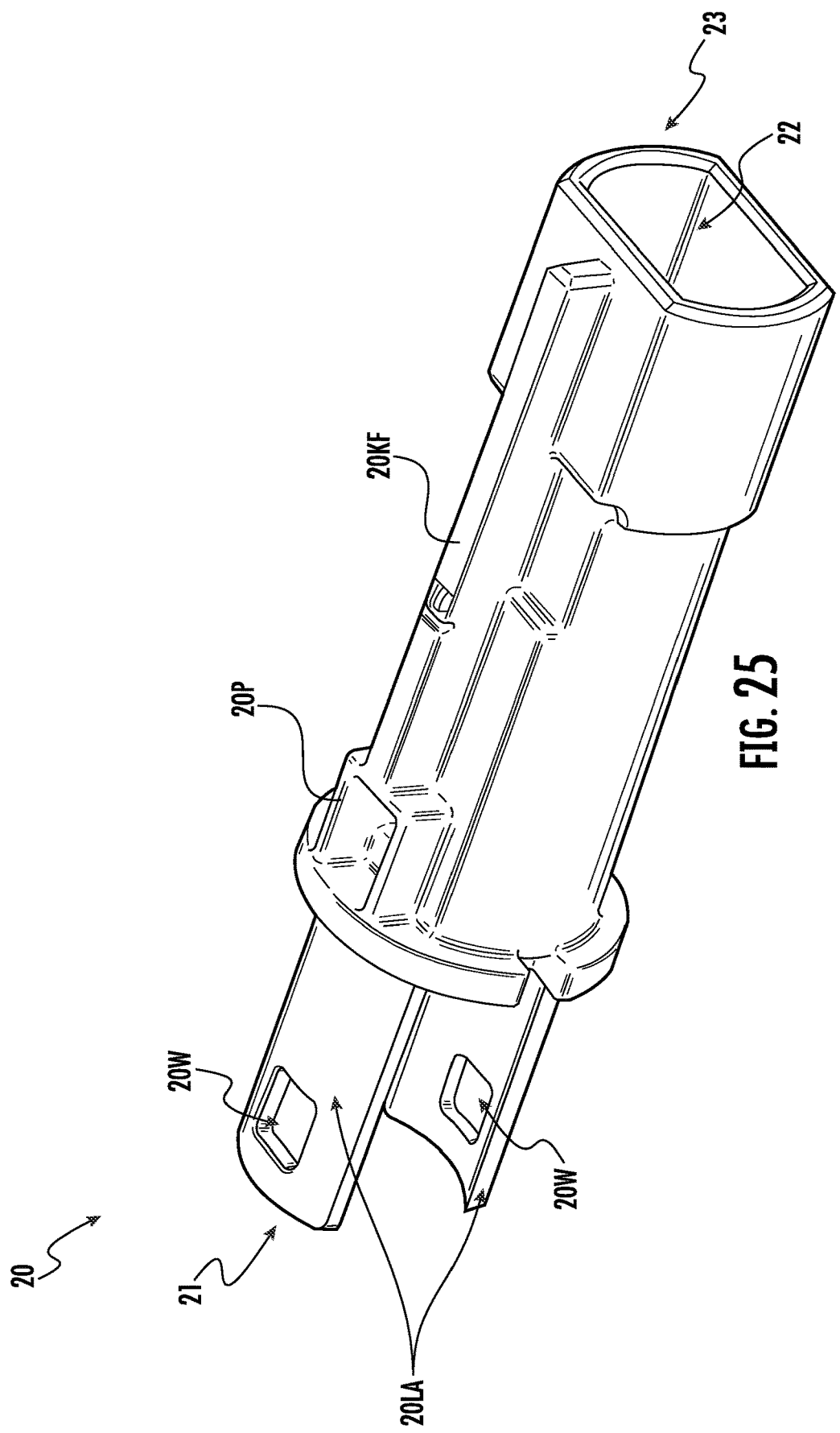
FIG. 25 is a perspective view of another inner barrel for the female fiber optic connector of FIG. 8.

Inner barrel 20 may also comprise one or more retention features for attaching spring push thereto. For instance, retention features of inner barrel may be latch arms 20LA comprising latches 20L. Latch arms 20LA allow the spring push 50 to attach to the inner barrel 20 in a quick and reliable manner by deflecting inward until the proper position is reached at which point the latch arm spring outward. Specifically, the latches 20L on latch arms 20LA may snap-fit into retention features on the spring push 50 such as windows or recesses 50W. However, other structures or arrangements are possible for assembling the components. The inner barrel 20 depicted in FIGS. 15 and 16 also has a recess 20R for allowing deflection of a portion of resilient member 75. In this embodiment, inner barrel 20 may fit into the main barrel in either orientation (i.e., up or down) since the part is symmetrical; however, the inner barrel 20 may be constructed so that it only fits into the main barrel 60 in one orientation such as shown in FIG. 25.

The front portion of passageway 22 of inner barrel 20 may also comprise a mating connector housing alignment feature (not numbered). Mating connector housing alignment feature is sized and shaped for receiving a front portion of the housing of the external plug connector (EPC) intended to be received within the connection port (CP) of female connector 100 as shown in FIG. 13, which also aids in alignment of ferrules so that alignment pins 30AP may properly align and engage during mating. Inner barrel 20 may also include a shoulder 20S. Shoulder 20S is sized for allowing spring 52 to seat to the shoulder 20S, thereby biasing inner barrel 20 a forward position in the main barrel 60. Shoulder 20S also cooperates with the passageway 62 of main barrel 60 for properly aligning the inner barrel 20 within the main barrel 60.

Spring push 50 comprises a passageway 52 from a spring push front end 53 to a spring push rear end 51. A spring seat 50SS is disposed at the front end 53 and acts a rear stop for trapping the spring 52 for biasing the inner barrel 20 forward when assembled as best shown in FIG. 14. Spring push 50 also comprises one or more retention features 50S such as snaps for engaging with the one or more windows 60W of the main barrel 60.

As best shown in FIGS. 17 and 18, main barrel 60 comprises a main barrel rear end 61 and a main barrel front end 63 with a main barrel passageway 62 extending from the main barrel rear end 61 to the main barrel front end 63. The main barrel rear end 61 comprises a main barrel rear end opening 610 sized for receiving the inner barrel 20, and the main barrel front end 63 comprises a connection port opening (CPO). The connector port opening leads to a connection port (CP) that forms a cavity for receiving a portion of the external plug connector (EPC) as shown in FIG. 13.

Main barrel 60 may also comprise a recess 60R shaped for receiving a portion of the rocker latch arm 70. The shape and size of the recess may depend on the specific rocker latch arm 70 used. Main barrel 60 may also comprise at least one slot 60S sized for receiving a latch 70L of the rocker latch arm 70. Slot 60S allow a portion of the rocker latch arm 70 to protrude into the connection port (CP) when in the retain position. As depicted in this embodiment, the slot 60s is disposed in the recess 60R.

Main barrel 60 may also include a pivot 60P formed therein. The pivot 60R allows attachment of the rocker latch arm 70 thereto in a pivoting manner. The pivot may allow direct attachment of the rocker latch arm or attachment of retainer 70R for attachment of the rocker latch arm 70 as desired. The main barrel 70 may also include a recess window 60RW rearward of the pivot 60P for allowing the rear end 70RE of the rocker latch arm to engage with the one or more resilient members 75. Main barrel 60 may also comprise one or more retention features for attachment. For instance, the main barrel 60 may comprise one or more windows 60W for attaching the main barrel 60 to the spring push 50. However, other structures are possible for securing the main barrel 60 such as a recess or latch as desired.

Main barrel 60 has a generally round shape or cylindrical sleeve with one or more features integrally formed in the primitive geometry of the cylindrical sleeve as discussed and shown. For instance, main barrel may also comprise a groove 60G. Groove 60G and/or other structure that may allow for the compression of the end of the weatherproofing collar 80 using cap 82 at the front end. Likewise, the spring push 50 may have a groove 50G and/or other structure that may allow for the compression of the end of the weatherproofing collar 80 using cap 82 at the rear end. By way of explanation, a chamfered edge may be adjacent to the groove 50G,80G to inhibit sharp bends of the weatherproof collar and one or more ridge may be on the other side of the groove 50G,80G to allow seating of the cap 82 to the female connector 100.

Female connector 100 may include an interface between the inner barrel 20 and main barrel 60 with one or more clocking features for rotational alignment during assembly. While the complimentary alignment feature on inner barrel 20 may be a protrusion such as male key and a keyway on the main barrel 60. However, the alignment features could be reversed with suitable geometry. Moreover, inner barrel 20 and main barrel 60 do not require an alignment feature; however, the use of the alignment features allow assembly of the inner barrel 20 and main barrel 60 in only a single orientation if desired.

Main barrel 60 may include still other features if desired. For instance, main barrel 60 may further comprise a suitable keying feature. By way of example, main barrel 20 comprises a keying feature (60KF). Keying feature 60KF is disposed within the connection port (CP). One arrangement may have the keying feature 60KF integrally formed in the main barrel 60. As an example, keying feature 60KF may be a male keying feature. In this case, the keying feature 60KF protrudes from an inner wall of the main barrel 60 for cooperating with the keying portion 101KP on the dust plug 101 as shown in FIG. 10 or the keying portion KP on the external plug connector (EPC) such as shown in FIG. 53. Keying feature 60KF of main barrel may have a specific orientation relative to the rocker latch arm 70. For instance, the rocker latch arm 70 may be disposed on the opposite side) from the keying feature 60KP (i.e., about 180 degrees apart) on the main barrel 60, but other orientations are possible as well.

Main barrel 60 or inner barrel 20 may be formed from any suitable material(s) such as a polymer, metal, composite, etc. The materials selected may depend on the construction or intended environment. For instance, if the female connector is intended for outdoor environments then the main barrel 20 may be formed from a UV stabilized material. As another example, the material of the inner barrel 20 may depend on the method used for securing the cable 90 to the female connector 100. For instance, if inner barrel 20 was intended to receive an adhesive for securing the cable 90, then the connector housing 20 would be made from a suitable material to cooperate with the adhesive. Likewise, other components may use different materials as well depending on the desired characteristics or geometry desired.

FIGS. 19 and 20 depict rocker latch arm 70 as discussed herein. This rocker latch arm 70 comprises a pass-through hole (not numbered) at the pivot 70P for attaching the rocker latch arm 70 to the main barrel 60 using retainer 70R such as a pin, screw or the like. The rearward end 70RE of rocker latch arm 70 comprises a spring push 70SP with an alignment feature 70AF for cooperating with the resilient member 75 depicted in FIGS. 21 and 22. The front end 70FE of rocker latch arm 70 comprises a latch 70L. This embodiment of rocker latch arm 70 additionally comprises a pull-back feature 70PBF at the forward end 70FE. Pull-back feature 70PBF aids in retaining the external plug connector (EPC) in the connection port (CP) of female connector 100 in case a pulling force is applied to the external plug connector (EPC), thereby inhibiting an inadvertent removal of the external plug connector (EPC) from the female connector 100. However, the female connector 100 may be designed so that the female connector 100 releases the external plug connector (EPC) at a predetermined pull-out force for inhibiting damage to the female connector 100 if desired.

FIGS. 21 and 22 depict another resilient member 75 that may be used with the female connectors 100 discussed herein. This resilient member 75 is configured as a leaf spring comprising a collar 75C having a cantilevered arm 75CA extending therefrom. The deflection of the cantilevered arm 75 relative to a collar 75C by the spring push 70SP of the rocker latch arm 70 provides the restoring spring force. The cantilevered arm 75CA comprises an alignment feature 75AF for cooperating with the alignment feature 70AF on the rocker latch arm 70 as shown in FIG. 11. Collar 75*c* is sized so that it may slid onto inner barrel 20 and is used for securing the resilient member 75. Collar 75A comprises an alignment portion 75AP for aiding in the rotational alignment of the resilient member 75 on the inner barrel 20. As discussed herein, female connectors 100 may have different resilient members or constructions as well.

FIGS. 23 and 24 are detailed views of the rear spring push 50. As discussed, spring push 50 comprises a passageway 52 from a spring push front end 53 to a spring push rear end 51. A spring push 50SS also comprises one or more retention features 50W for attaching to the inner barrel 20. As depicted, retention features 50W for cooperating with the latch arms 20LA of inner barrel 20, but other structures are possible for attaching the inner barrel 20 with the spring push 50. Spring push 50 also includes a rear portion with a stepped profile for attaching one or more heat shrinks 97 or boot 99. For instance, spring push 50 may comprise a first portion 57 with a first diameter for attaching a portion of heat shrink 97 to provide an environmental seal between the cable 90 and female connector 100. First portion 57 may comprise one or more ribs 20R for securing the heat shrink 97 in a robust manner. Likewise, spring push 50 may have a second portion 55 with a second diameter for attaching a connector boot 99 and may also have ribs 50R if desired.

FIG. 25 depicts another inner barrel 20 that may be used with female connectors 100 disclosed herein. This inner barrel 20 has a keying feature 20KF so that it may only fit properly within main barrel 60 in one orientation. Moreover, the inner barrel 20 may have geometry tailored for the specific resilient members 75 used in the female connector 100. This inner barrel 20 also comprises latch arms 20LA that have a different orientation for securing to the spring push 50, but they work in a similar fashion as described herein Other geometry may be use for the inner barrel 20 or with other components using the concepts disclosed.

FIGS. 26-40 show an explanatory method for making the fiber optic cable assemblies 200 having female connectors 100 as disclosed herein. Cable assemblies 200 are formed by terminating cable 90 with female connector 100. Other methods may be used for terminating cables 90 with female connectors.

Figure 26:
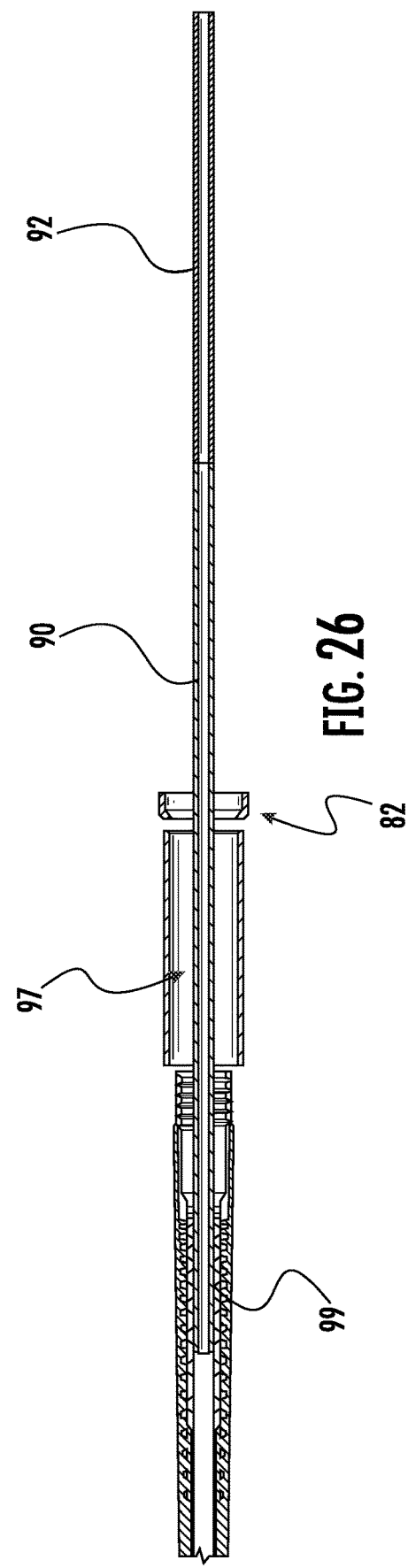

FIG. 26 depicts sliding the desired components of female connector 100 onto the cable 90 having an optical fiber 92. As depicted, boot 99, heat shrink 97 and cap 82 are threaded onto cable 90 in the desired order. Cable 90 may be prepared in any suitable manner and may depend on the type of cable being terminated. Preparation of cable 90 typically comprises exposing the optical fiber 92 and prepping any other cable components as desired for termination such as strength members 94 or cable jacket 98. As best shown in FIG. 27, cable 90 is prepared so that optical fibers 92 and strength members 94 extend beyond cable jacket 98. Strength members 94 may be any suitable type such as rigid glass-reinforced plastic (GRPs) or flexible yarns such as aramid or fiberglass. The cable construction may influence how the cable 90 is secured to the female connector 100, and may be accomplished in a variety of manners.

FIG. 27 depicts a plug 85 and spring push 50 being positioned on the cable 90. Optional plug 80 that may be placed about the optical fibers 92 for inhibiting adhesive or the like from leaking into the forward portion of the spring push 50 of the female connector 100. The forward portion of the spring push provides an area so that the optical fibers are free to move as needed during use. FIG. 28 depicts the ferrule spring push 30SP and ferrule spring 30S being threaded onto the optical fibers 92.

FIG. 29 depicts attaching one or more optical fibers 92 of cable 90 to ferrule 30. Ferrule 30 comprises a plurality of bores 32 for receiving one or more optical fibers 92. Optical fibers 92 are secured to ferrule 30 in a suitable fashion such as adhesive like a UV or heat curable material, but other processes are possible. Thereafter, the end face of ferrule 30 may be polished or finished as known in the art. FIG. 30 shows alignment pins 30AP and/or pin keeper being attached to the ferrule 30 if used.

FIG. 31 is a detailed view of ferrule 30 showing optical fibers 92 at the front face of ferrule 30. As depicted, ferrule 30 may comprise a ferrule body having ferrule shoulder 30S at the rear along with alignment bores 30B for receiving alignment pins as known in the art. If a ferrule boot 67 is used, then the optical fibers 92 are threaded through the ferrule boot 67 before inserting and attaching the optical fibers to the ferrule 30.

Figure 32:
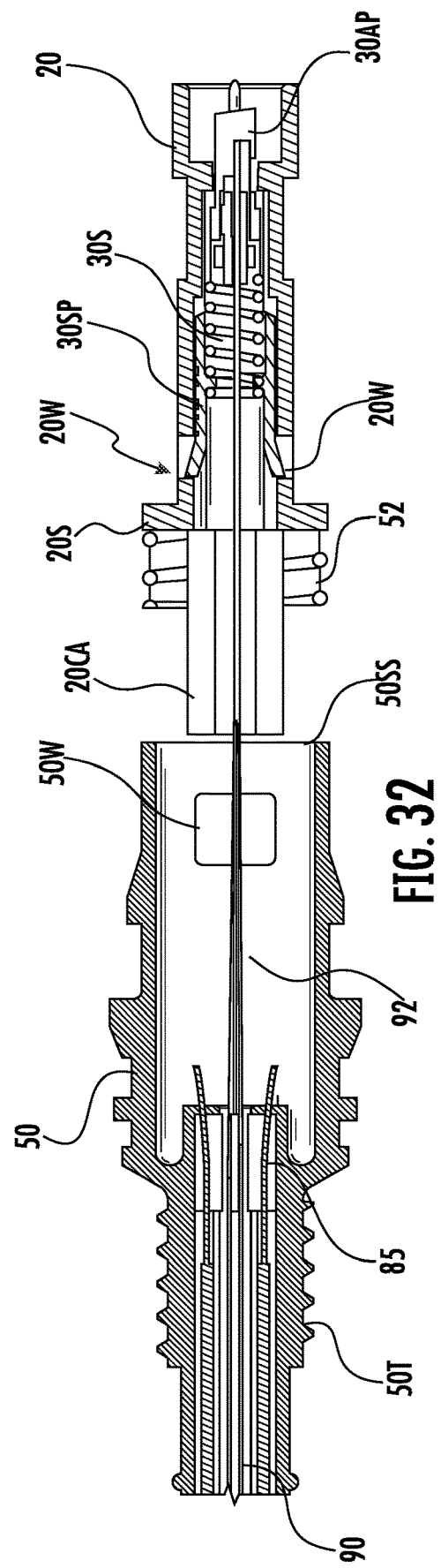

FIG. 32 depicts inserting the ferrule 30 into a passageway 22 of inner barrel 20 by inserting the ferrule 30 from the inner barrel rear opening 21o. The ferrule spring 30S and ferrule spring push 30SP are slid up into inner housing so that the spring push 30SP is attached to the inner barrel 20 as discussed herein. Thus, ferrule 30 is biased to the forward position by ferrule spring 30S. FIG. 33 depicts the inner barrel 20 attached to the rear spring push 50 and capturing spring 52 between the inner barrel 20 and rear spring push 50 as shown.

Cable 90 may be secured to the spring push at any suitable step during the process. Rear spring push 50 may have one or more apertures 50A for placing an adhesive such as epoxy, glue, resins radiation-curable, polymer (cured using an ultrasonic or induction welding process) or other such materials for securing cable 90 to the rear spring push 50. The adhesive or the like is placed into the rear spring push 50 for securing the cable 90 to female connector 100. A second aperture on spring push 50 allows air to escape and adhesive or the like to wick about the cable 90 and fill the passageway 52 of spring push 522. The adhesive may secure the cable 90, one or more optical fibers 92 and one or more strength members 94 to the female connector 100 for strain relief if desired. As used herein, "adhesive" means any suitable material for securing the cable 90 to connector housing 20.

Of course, the spring push 50 may be secured to cable 90 or a portion of cable 90 in any suitable fashion. For instance, rear spring push 50 may be terminated or secured to strength members 94 of cable 90 using other manners such as a crimp if desired. The type of strength members 94 may depend on the type of cable terminated to the connector and may include tensile yarns, fiberglass rods or the like. The concepts of female connector 100 may be modified to use any suitable cable type such as by modifying the passageway of the spring push 50 and/or other components as desired.

Fiber optic cable assemblies may be formed by securing the fiber optic cable to the female connector in any suitable fashion such as using an adhesive, crimp or the like, but other methods of attaching the cable to connector are possible. Consequently, the disclosed connector design is highly-adaptable to a wide variety of fiber optic cables of various shapes and/or construction for different customer requirements or preferences. For instance, the connector may be terminated to fiber optic cables comprising a round cross-section or a non-round cross-section as desired. Likewise, the connector may be terminated to cables having rigid strength members such as GRPs or flexible yarn-like strength members such as aramid, fiberglass or the like.

In other variations, the outer jacket or strength members could be shaved to fit inside the passageway 52 of rear spring push 50 to fit an oversized cable or shaping the cable to the passageway 52. Moreover, shaving the cable 90 may improve the adhesion to the cable 90.

FIG. 34 depicts placing the one or more resilient members 75 on the female connector 100. In this embodiment, resilient member 75 is slid onto the inner barrel 20, but other constructions may place the resilient members 75 in place after the main barrel is attached. FIG. 35 depicts placing the inner barrel 20 within the main barrel 60 from the main barrel rear opening 610 sized for receiving the inner barrel. FIG. 36 depicts attaching the rocker latch arm 70 to the main barrel 60.

Figure 39:
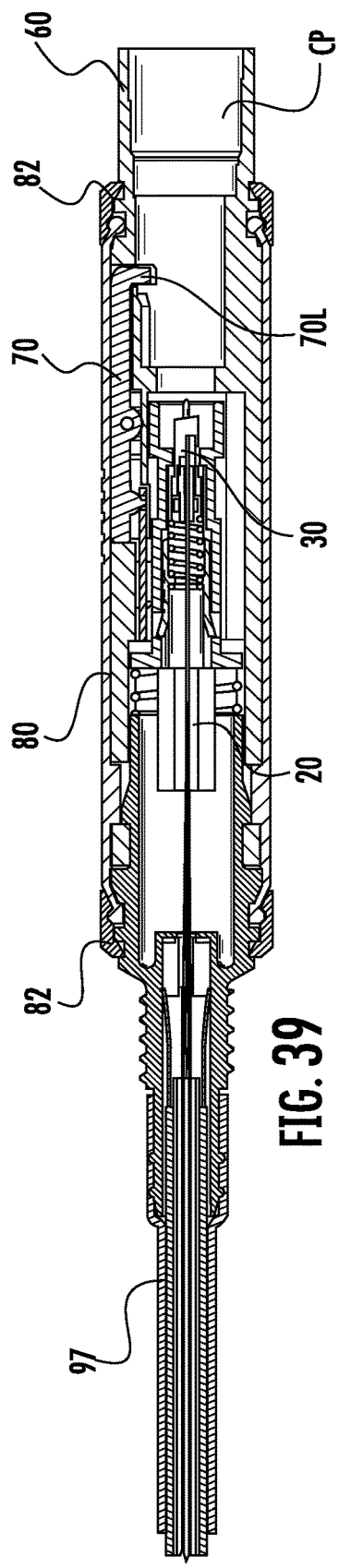

FIG. 37 shows heat shrink 97 that may be installed over the rear portion of the rear spring push 50 and a portion of cable 90. Rear spring push 50 may have on or more ribs for providing a gripping surface for the heat shrink 97. Using a heat shrink aids in making a weather-proof interface between the cable 90 and connector 100 Any suitable size or type of heat shrink such as an adhesive lined heat shrink may be used for sealing or securing components as desired. FIG. 38 shows weatherproofing collar 80 placed about a portion of the main barrel 60, and FIG. 39 depicts the caps 82 attached at the respective ends of the weatherproofing collar 80.

Figure 40:
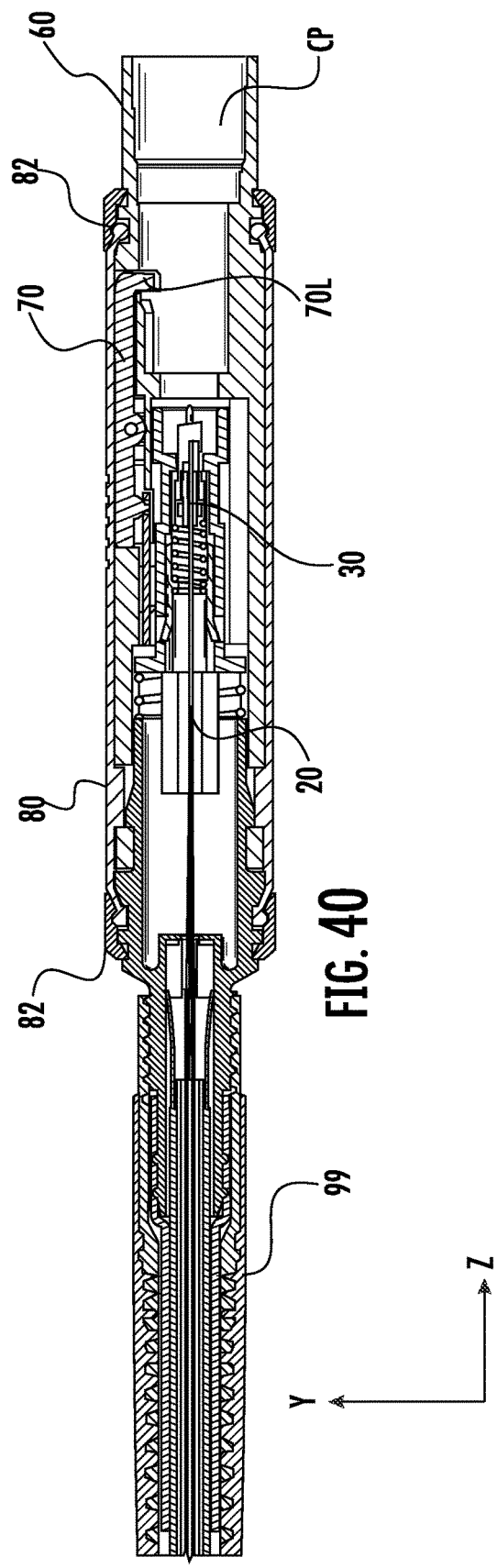

FIG. 40 depicts a boot 99 attached to a rear portion of rear spring push 50. Ribs may also be used for providing a gripping surface for boot 99 if desired. Boot 99 may not omitted if desired, but can provided improved side-pull performance for the cable assembly.

The concepts disclosed also enable smaller footprints for the female connector 100. By way of example, female connector 100 may have an outer diameter of 18 millimeters or smaller, or may even be 15 millimeters of smaller for the outer diameter taken transverse to the longitudinal axis of the female connector looking into the connection port opening (CPO) but other sizes are possible.

Explanatory female connectors 100 avoid bulky mating structures such as a coupling nut or bayonet used with conventional connectors. In other words, conventional connectors have threaded, bayonet, or push-pull connections that require finger access for connection and disconnecting. By eliminating the structures such as threaded coupling nuts or bayonets (which is a separate component that must rotate about the connector) the size of the female connector may be reduced while also allowing quick and easy mating with the external plug connector. Also eliminating the dedicated coupling nut from the conventional connectors also allows the footprint of the connectors to be smaller, and arrays of connectors to likewise be more compact.

Other variations and modifications are possible for the female connector concepts disclosed. By way of explanation, FIGS. 41-52 depict views of another explanatory female fiber optic connector having an actuator similar to the explanatory female fiber optic connector of FIG. 8, but uses two resilient members 75 for biasing the actuator to a normally retain position such as depicted in FIGS. 4C and 4D. As shown in the cross-sectional view of FIG. 42, this design of female connector 100 is similar to the embodiments described herein, but may be easier to assemble and/or manufacture and most of the parts are the same or similar to those described herein.

By way of explanation, this embodiment of female connector 100 also comprises a spring seat 29 for resilient member 52 as depicted in FIG. 42. Spring seat 29 is a separate component for aiding in the assembly of the female connector 100, compared with the spring seat that was integrally formed in the inner barrel 20 as a shoulder and shown in FIG. 15 of the connector of FIG. 8. The spring seat 29 is configured as a collar that can slide over a rear end 21 of the inner barrel 20 and be attached by rotating relative to the inner barrel 20, thereby allowing the piece to move until attached. Using a separate spring seat 29 allows more room for optical fiber movement or manipulation during assembly. Additionally, the inner barrel 20 of this embodiment does not include latch arms that cooperate with the spring push 50 shown in FIG. 15. sealing portions 80SL may have enlarged lips about the perimeter, thereby providing material that may be compressed for creating a weatherproof seal at the ends of the weatherproofing collar 80.

Figure 41:
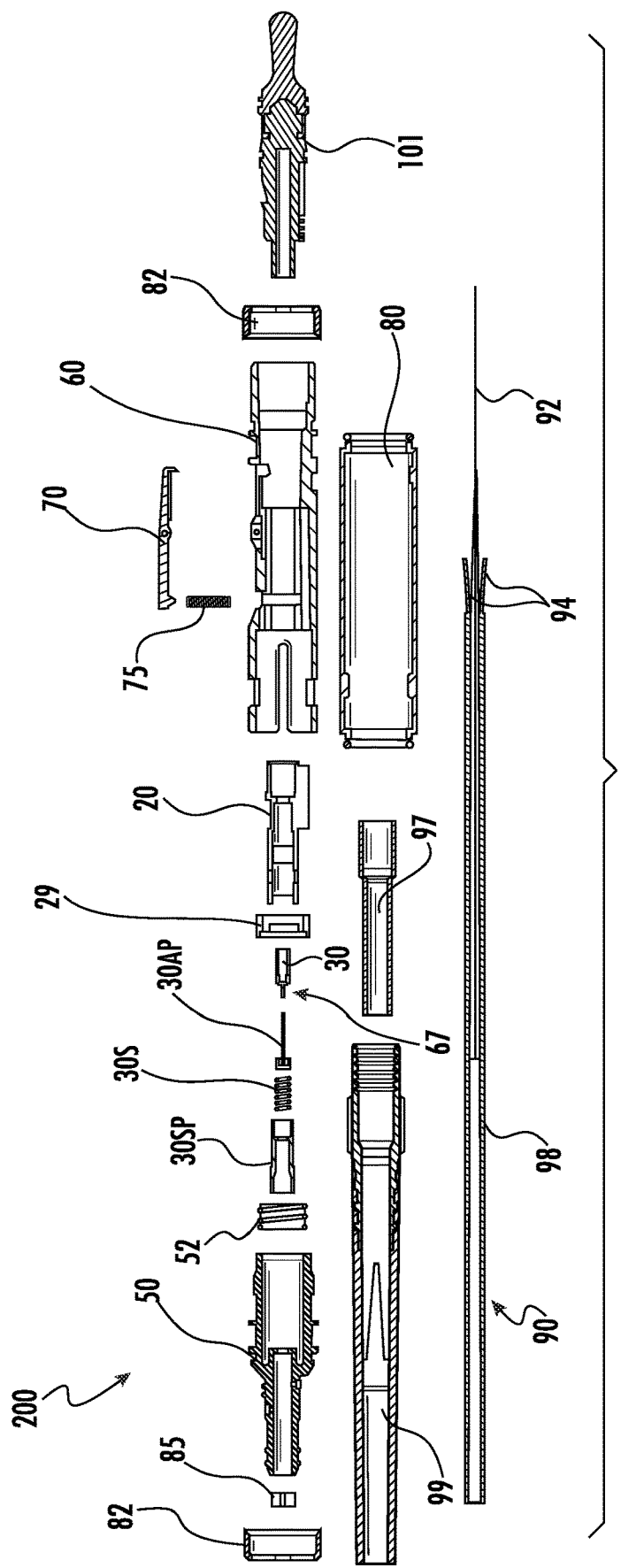
FIGS. 41-50 depict views and components of another explanatory female fiber optic connector having an actuator for releasing a mated plug connector similar to the explanatory female fiber optic connector of FIG. 8.

FIGS. 43-46 depict inner barrel 20 of the embodiment of FIG. 41 that is similar to the inner barrel 20 of FIG. 8. This embodiment of female connector 100 comprises a spring seat 29 that is a separate component as shown. Inner barrel 20 comprises an inner barrel rear end 21 and an inner barrel front end 23 with an inner barrel passageway 22 extending from the inner barrel rear end 21 to the inner barrel front end 23. The inner barrel rear end 21 of inner barrel 20 comprises an inner barrel rear end opening 210 sized for receiving the ferrule 30.

To assemble the ferrule 30 within the inner barrel 20 of female connector 100 the optical fibers 92 of fiber optic cable 90 are attached to ferrule 30, and then the alignment pins 30AP may be attached to the ferrule if used. The ferrule 30 with the alignment pins 30AP may be inserted into the inner barrel 20 from the inner barrel rear end opening 210 and the spring 30S and a ferrule spring push 30SP are slid forward so the spring push 30SP is attached to the inner barrel 20 using windows 20W for a snap-fit assembly and biasing the ferrule 30 to a forward position within the inner barrel 20 as discussed herein.

Figure 45:
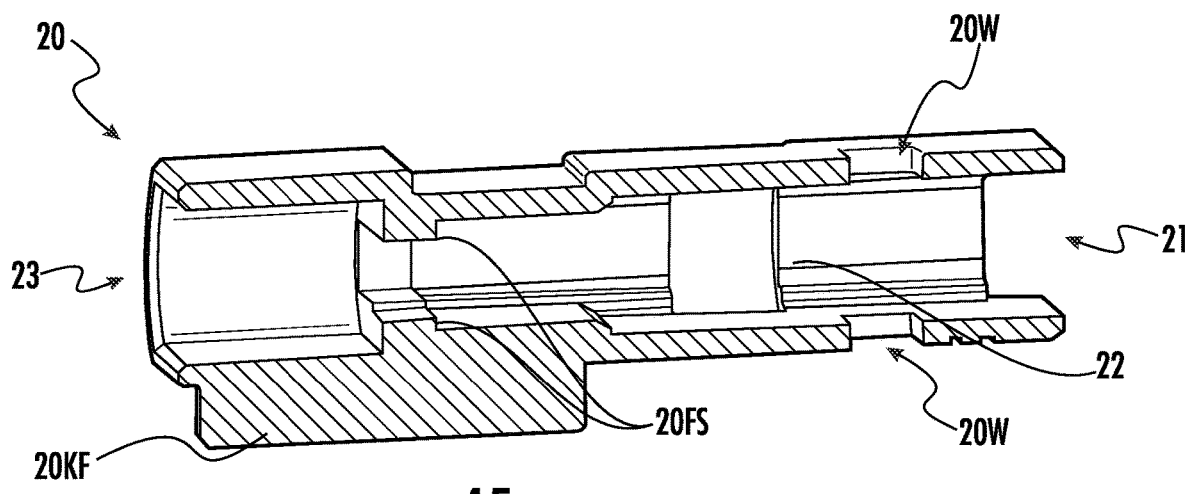
Figure 46:
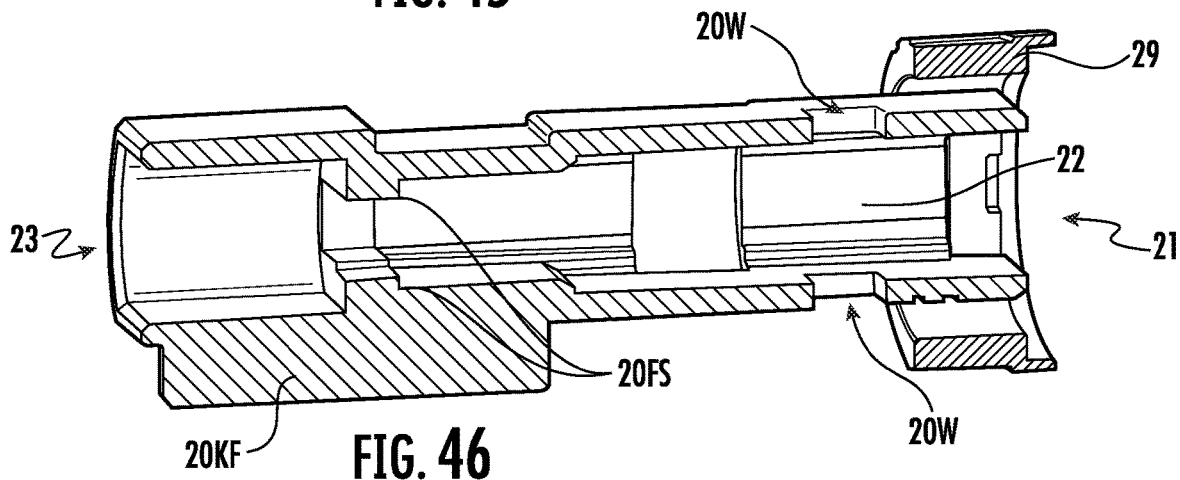

Inner barrel 20 also comprises a ferrule stop 20FS within the longitudinal passageway 22 acting as a forward stop for the ferrule 30 as shown in FIGS. 45 and 46. Spring 30S biases the ferrule 30 forward to the ferrule stop 20FS. Ferrule stop 20FS limits travel of the ferrule 30 to the front of inner barrel 20, but the ferrule 30 is allowed to move rearward during mating as needed subject to the restoring forward-force of the spring 30S. Spring 30S aids in maintaining physical contact between optical fibers 92 disposed in the ferrule 30 when the female connector is in a mated state for optical connection. Ferrule stop 20FS also defines a window (not numbered) for coarse alignment of the ferrule 30 within the inner barrel 20. In this embodiment, the ferrule window is a rectangular opening sized for an MT ferrule, but other shapes or sized may be used depending on the type of ferrule used in the female connector 100. As discussed herein, the window adjacent to ferrule stop 20FS is sized for a ferrule width FW and a ferrule height FH, while not allowing a ferrule shoulder 30S to pass thru the window of the inner barrel 20. Likewise, this female connector 100 may allow limited movement or "float" of the ferrule within the connector in the unmated state for allowing limited movement of the ferrule during mating with a complimentary device.

Likewise, this inner barrel 20 has a keying feature 20KF so that it may only fit properly within main barrel 60 in one orientation. Moreover, the inner barrel 20 may have geometry tailored for the specific resilient members 75 used in the female connector 100.

Figure 47:
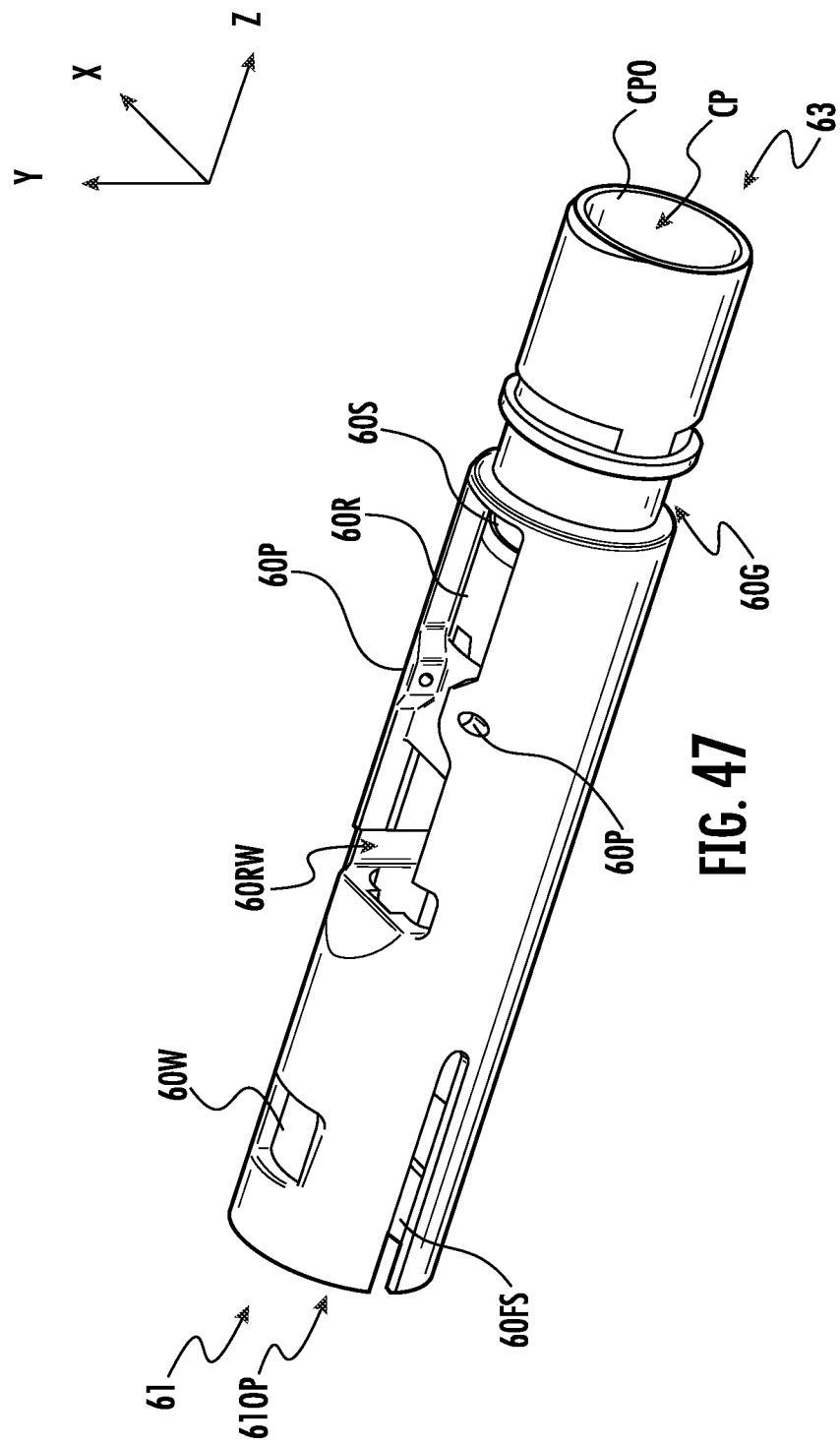

FIG. 47 shows main barrel 60 of FIG. 41 comprising the main barrel rear end 61 and the main barrel front end 63 with the main barrel passageway 62 extending from the main barrel rear end 61 to the main barrel front end 63. The main barrel rear end 61 comprises the main barrel rear end opening 610 sized for receiving the inner barrel 20, and the main barrel front end 63 comprises the connection port opening (CPO). The connector port opening leads to a connection port (CP) that forms a cavity for receiving a portion of the external plug connector (EPC) as shown.

Main barrel 60 may also comprises recess 60R shaped for receiving a portion of the rocker latch arm 70. The shape and size of the recess may depend on the specific rocker latch arm 70 used. Main barrel 60 may also comprise at least one slot 60S sized for receiving a latch 70L of the rocker latch arm 70. Slot 60S allow a portion of the rocker latch arm 70 to protrude into the connection port (CP) when in the retain position. As depicted in this embodiment, the slot 60s is disposed in the recess 60R.

Main barrel 60 also includes pivot 60P formed therein. The pivot 60R allows attachment of the actuator or rocker latch arm 70 thereto in a pivoting manner. The pivot may allow direct attachment of the rocker latch arm or attachment of retainer 70R for attachment of the rocker latch arm 70 as desired. The main barrel 70 may also include recess window 60RW rearward of the pivot 60P for allowing the rear end 70RE of the rocker latch arm to engage with the one or more resilient members 75. Main barrel 60 may also comprise one or more retention features for attachment. For instance, the main barrel 60 may comprise one or more windows 60W for attaching the main barrel 60 to the spring push 50. This embodiment of main barrel 60 also include flexure slots 60FS for aiding assembly.

Main barrel 60 has a generally round shape or cylindrical sleeve with one or more features integrally formed in the primitive geometry of the cylindrical sleeve as discussed and shown. For instance, main barrel may also comprise a groove 60G. Groove 60G and/or other structure that may allow for the compression of the end of the weatherproofing collar 80 using cap 82 at the front end or receiving adhesive, welding materials or the like if desired. For instance, weatherproofing collar 80 may have sealing portions 80SL with enlarged lips about the perimeter such as a O-ring type-shape, thereby providing material that may be compressed for creating a weatherproof seal at the ends of the weatherproofing collar 80. Likewise, the spring push 50 may have a groove 50G and/or other structure that may allow for the compression of the end of the weatherproofing collar 80 using cap 82 at the rear end.

The female connector 100 of FIG. 41 may include other features or structure as discussed. For instance, the female connector 100 may include an interface between the inner barrel 20 and main barrel 60 with one or more clocking features for rotational alignment during assembly.

FIGS. 48 and 49 depict detailed views of rocker latch arm 70 of the female connector 100. This rocker latch arm 70 comprises a pass-through hole (not numbered) at the pivot 70P for attaching the rocker latch arm 70 to the main barrel 60 using retainer 70R such as a pin, screw or the like. The rearward end 70RE of rocker latch arm 70 comprises two spring pushes 70SP located at the outboard wings on opposite sides with each spring push 70SP having a respective alignment feature 70AF for cooperating with the resilient member 75 such as the coil spring. The front end 70FE of rocker latch arm 70 comprises a latch 70L as discussed herein.

Figure 50:
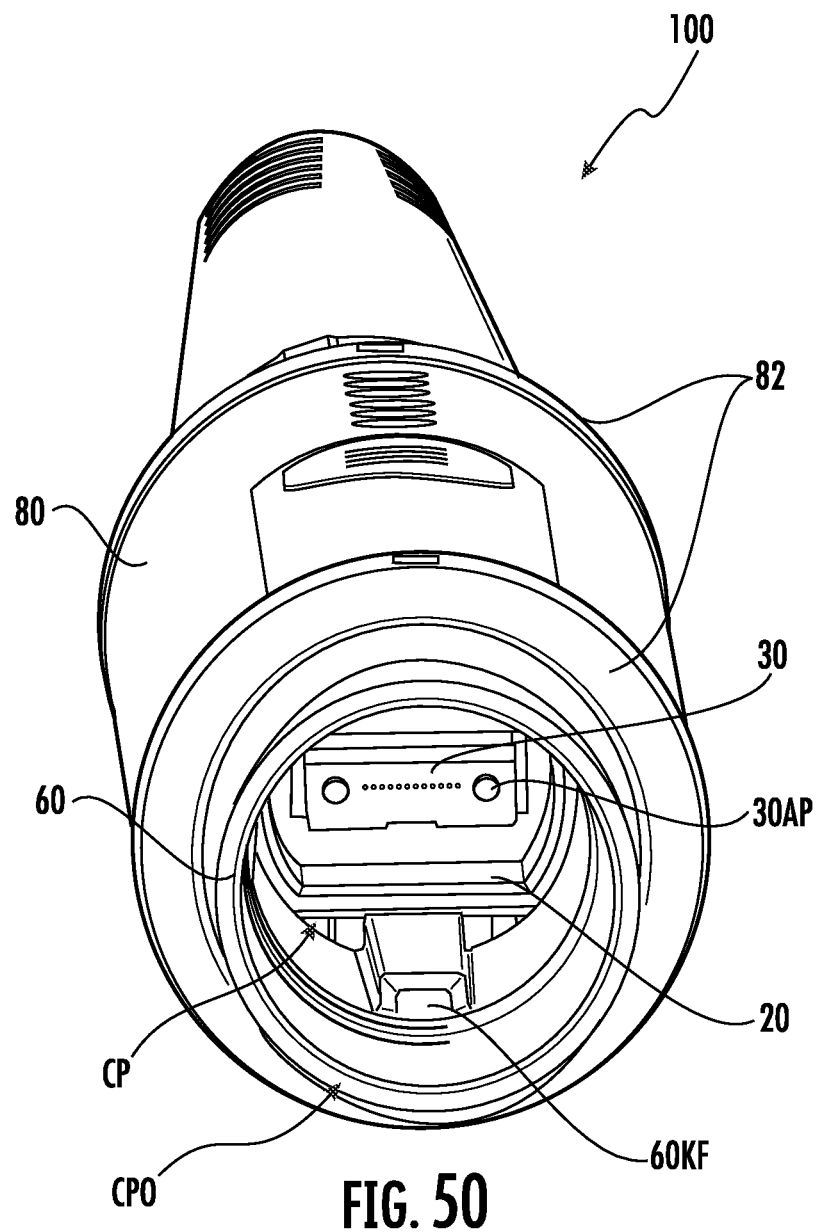

FIG. 50 shows an end view into female connector 100. As shown, main barrel 20 comprises keying feature 60KF disposed within the connection port (CP). The keying feature 20KF is integrally formed in the main barrel 60 as a male keying feature. In this case, the keying feature 60KF protrudes from an inner wall of the main barrel 60 for cooperating with the keying portion 101KP on the dust plug 101 or the keying portion KP on the external plug connector (EPC). Keying feature 60KF of main barrel may have any suitable orientation relative to the rocker latch arm 70. In this case, the rocker latch arm 70 is disposed on the opposite side from the keying feature 60KP (i.e., about 180 degrees apart) on the main barrel 60.

The concepts disclosed may be used with any suitable fiber optic cable as desired using simple modification of one or more parts. By way of example, FIG. 51 shows the female connector configured for a flat drop cable 90. As shown, this embodiment uses a modified spring push 50 having a rear portion of the passageway sized for receiving the flat drop cable. As discussed, the fiber optic cable 90, strength members 94 and/or optical fibers 92 may be secured using an adhesive injected into the spring push 50 from an aperture located rearward of the plug 85. Plug 85 inhibits adhesive from wicking forward of the plug 85. Different fiber optic cables 90 may also require different cable preparation for use with the female connector 100.

FIGS. 52 and 53 depict detailed perspective views of the external plug connector (EPC) shown in FIG. 3. External plug connector (EPC) may comprise one or more O-rings 65 that may be used to seal the mated optical connection.

Although the disclosure has been illustrated and described herein with reference to explanatory embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the concepts disclosed without departing from the spirit and scope of the same. Thus, it is intended that the present application cover the modifications and variations provided they come within the scope of the appended claims and their equivalents.

We claim:

1. A female fiber optic connector having a connection port for receiving a mating fiber optic plug, comprising:
    a ferrule comprising one or more bores for receiving one or more optical fibers;
    an inner barrel comprising an inner barrel rear end and an inner barrel front end with an inner barrel passageway extending from the inner barrel rear end to the inner barrel front end, wherein the inner barrel rear end comprises a inner barrel rear end opening sized for receiving the ferrule;
    a main barrel comprising a main barrel rear end and a main barrel front end with a main barrel passageway extending from the main barrel rear end to the main barrel front end, wherein the main barrel rear end comprises a main barrel rear end opening sized for receiving the inner barrel and the main barrel front end comprises a connection port opening;
    a rocker latch arm comprising a pivot suitable for pivoting the rocker latch arm relative to the main barrel; and
    one or more resilient members for biasing the rocker latch arm to a retain position.

2. A female fiber optic connector having a connection port for receiving a mating fiber optic plug, comprising:
    a ferrule comprising one or more bores for receiving one or more optical fibers;
    an inner barrel comprising an inner barrel rear end and an inner barrel front end with an inner barrel passageway extending from the inner barrel rear end to the inner barrel front end, wherein the inner barrel rear end comprises an inner barrel rear end opening sized for receiving the ferrule;
    a main barrel comprising a main barrel rear end and a main barrel front end with a main barrel passageway extending from the main barrel rear end to the main barrel front end, wherein the main barrel rear end comprises a main barrel rear end opening sized for receiving the inner barrel and the main barrel front end comprises a connection port opening;
    a rocker latch arm comprising a pivot suitable for pivoting the rocker latch arm relative to the main barrel, and comprising a latch and a rear end; and
    one or more resilient members for biasing the rocker latch arm to a retain position, wherein a portion of the one or more resilient members cooperates with the rear end of the rocker latch arm.

3. A female fiber optic connector having a connection port for receiving a mating fiber optic plug, comprising:
    a ferrule comprising one or more bores for receiving one or more optical fibers;
    an inner barrel comprising an inner barrel rear end and an inner barrel front end with an inner barrel passageway extending from the inner barrel rear end to the inner barrel front end, wherein the inner barrel rear end comprises an inner barrel rear end opening sized for receiving the ferrule;
    a main barrel comprising a main barrel rear end and a main barrel front end with a main barrel passageway extending from the main barrel rear end to the main barrel front end, wherein the main barrel rear end comprises a main barrel rear end opening sized for receiving the inner barrel and the main barrel front end comprises a connection port opening;
    a rocker latch arm comprising a pivot suitable for pivoting the rocker latch arm relative to the main barrel, and comprising a latch and a biasing end;
    one or more resilient members for biasing the rocker latch arm to a retain position, wherein a portion of the one or more resilient members cooperates with the rear end of the rocker latch arm; and
    a rear spring push suitable for attaching to the main barrel.

4. A female fiber optic connector having a connection port for receiving a mating fiber optic plug, comprising:
    a ferrule comprising one or more bores for receiving one or more optical fibers;
    an inner barrel comprising an inner barrel rear end and an inner barrel front end with an inner barrel passageway extending from the inner barrel rear end to the inner barrel front end, wherein the inner barrel rear end comprises an inner barrel rear end opening sized for receiving the ferrule;
    a main barrel comprising a main barrel rear end and a main barrel front end with a main barrel passageway extending from the main barrel rear end to the main barrel front end, wherein the main barrel rear end comprises a main barrel rear end opening sized for receiving the inner barrel and the main barrel front end comprises a connection port opening;

a rocker latch arm comprising a pivot suitable for pivoting the rocker latch arm relative to the main barrel, and comprising a latch and a rear end;
one or more resilient members for biasing the rocker latch arm to a retain position, wherein a portion of the one or more resilient members cooperates with the rear end of the rocker latch arm;
a rear spring push; and
a spring for biasing the inner barrel to a forward position in the main barrel.

5. A female fiber optic connector having a connection port for receiving a mating fiber optic plug, comprising:
a ferrule comprising one or more bores for receiving one or more optical fibers;
an inner barrel comprising an inner barrel rear end and an inner barrel front end with an inner barrel passageway extending from the inner barrel rear end to the inner barrel front end, wherein the inner barrel rear end comprises an inner barrel rear end opening sized for receiving the ferrule;
a main barrel comprising a main barrel rear end and a main barrel front end with a main barrel passageway extending from the main barrel rear end to the main barrel front end, wherein the main barrel rear end comprises a main barrel rear end opening sized for receiving the inner barrel and the main barrel front end comprises a connection port opening;
a rocker latch arm comprising a pivot suitable for pivoting the rocker latch arm relative to the main barrel;
one or more resilient members for biasing the rocker latch arm to a retain position, wherein a portion of the one or more resilient members cooperates with a rear end of the rocker latch arm;
a rear spring push suitable for attaching to the main barrel;
a spring for biasing the inner barrel to a forward position in the main barrel; and
a weatherproofing collar sized for being disposed about a portion of the main barrel.

6. A female fiber optic connector having a connection port for receiving a mating fiber optic plug, comprising:
a ferrule comprising one or more bores for receiving one or more optical fibers;
an inner barrel comprising a rear end and a front end with a longitudinal passageway extending from the rear end to the front end, wherein the rear end comprises a rear end opening sized for receiving the ferrule;
a main barrel comprising a rear end and a front end with a longitudinal passageway extending from the rear end to the front end, wherein the rear end comprises a rear end opening sized for receiving the inner barrel and the front end comprises a connection port opening, and comprising a keying feature configured as a male keying feature;
a rocker latch arm comprising a pivot suitable for pivoting the rocker latch arm relative to the main barrel, wherein the rocker latch arm is disposed on the main barrel opposite from the keying feature;
one or more resilient members for biasing the rocker latch arm to a retain position, wherein a portion of the one or more resilient members is disposed between the inner barrel and the rocker latch arm;
a rear spring push comprising a cable strain relief portion, wherein the rear spring push is suitable for attaching to the main barrel;
a spring for biasing the inner barrel to a forward position in the main barrel;
a weatherproofing collar sized for being disposed about a portion of the main barrel; and
one or more caps that cooperate with the weatherproofing collar.

7. A female fiber optic connector having a connection port for receiving a mating fiber optic plug, comprising:
a ferrule comprising one or more bores for receiving one or more optical fibers;
an inner barrel comprising an inner barrel rear end and an inner barrel front end with an inner barrel passageway extending from the inner barrel rear end to the inner barrel front end, wherein the inner barrel rear end comprises an inner barrel rear end opening sized for receiving the ferrule;
a main barrel comprising a main barrel rear end and a main barrel front end with a main barrel passageway extending from the main barrel rear end to the main barrel front end, wherein the main barrel rear end comprises a main barrel rear end opening sized for receiving the inner barrel and the main barrel front end comprises a connection port opening;
a rocker latch arm comprising a pivot suitable for pivoting the rocker latch arm relative to the main barrel;
one or more resilient members for biasing the rocker latch arm to a retain position, wherein a portion of the one or more resilient members is disposed between the inner barrel and the rocker latch arm;
a rear spring push comprising a cable strain relief portion, wherein the rear spring push is suitable for attaching to the main barrel;
a spring for biasing the inner barrel to a forward position in the main barrel; and
a weatherproofing collar sized for being disposed about a portion of the main barrel.

8. A female fiber optic connector having a connection port for receiving a mating fiber optic plug, comprising:
a ferrule comprising one or more bores for receiving one or more optical fibers;
an inner barrel comprising an inner barrel rear end and an inner barrel front end with an inner barrel passageway extending from the inner barrel rear end to the inner barrel front end, wherein the inner barrel rear end comprises an inner barrel rear end opening sized for receiving the ferrule;
a main barrel comprising a main barrel rear end and a main barrel front end with a main barrel passageway extending from the main barrel rear end to the main barrel front end, wherein the main barrel rear end comprises a main barrel rear end opening sized for receiving the inner barrel and the main barrel front end comprises a connection port opening, and comprising a keying feature;
a rocker latch arm comprising a pivot suitable for pivoting the rocker latch arm relative to the main barrel;
one or more resilient members for biasing the rocker latch arm to a retain position, wherein a portion of the one or more resilient members is disposed between the inner barrel and the rocker latch arm;
a rear spring push comprising a cable strain relief portion, wherein the rear spring push is suitable for attaching to the main barrel;
a spring for biasing the inner barrel to a forward position in the main barrel; and
a weatherproofing collar sized for being disposed about a portion of the main barrel.

9. The female fiber optic connector of claim 8, the keying feature being a male keying feature.

10. The female fiber optic connector of claim 8, wherein the key feature is disposed about 180 degrees apart from the rocker latch arm.

11. A female fiber optic connector having a connection port for receiving a mating fiber optic plug, comprising:
- a ferrule comprising one or more bores for receiving one or more optical fibers;
- an inner barrel comprising a rear end and a front end with a longitudinal passageway extending from the rear end to the front end, wherein the rear end comprises a rear end opening sized for receiving the ferrule;
- a main barrel comprising a rear end and a front end with a longitudinal passageway extending from the rear end to the front end, wherein the rear end comprises a rear end opening sized for receiving the inner barrel and the front end comprises a connection port opening, and comprising a keying feature configured as a male keying feature;
- a rocker latch arm comprising a pivot suitable for pivoting the rocker latch arm relative to the main barrel, wherein the rocker latch arm is disposed on the opposite side from the keying feature;
- one or more resilient members for biasing the rocker latch arm to a retain position, wherein a portion of the one or more resilient members is disposed between the inner barrel and the main barrel;
- a rear spring push comprising a cable strain relief portion, wherein the rear spring push is suitable for attaching to the main barrel;
- a spring for biasing the inner barrel to a forward position; and
- a weatherproofing collar sized for being disposed about a portion of the main barrel.

12. The female fiber optic connector of claim 11, further comprising one or more caps that cooperate with the weatherproofing collar.

13. A female fiber optic connector having a connection port for receiving a mating fiber optic plug, comprising:
- a ferrule comprising one or more bores for receiving one or more optical fibers;
- an inner barrel comprising an inner barrel rear end and an inner barrel front end with an inner barrel passageway extending from the inner barrel rear end to the inner barrel front end, wherein the inner barrel rear end comprises an inner barrel rear end opening sized for receiving the ferrule;
- a main barrel comprising a main barrel rear end and a main barrel front end with a main barrel passageway extending from the main barrel rear end to the main barrel front end, wherein the main barrel rear end comprises a main barrel rear end opening sized for receiving the inner barrel and the main barrel front end comprises a connection port opening;
- a rocker latch arm comprising a pivot suitable for pivoting the rocker latch arm relative to the main barrel;
- one or more resilient members for biasing the rocker latch arm to a retain position, wherein a portion of the one or more resilient members is disposed between the inner barrel and the rocker latch arm;
- a rear spring push suitable for attaching to the main barrel;
- a spring for biasing the inner barrel to a forward position in the main barrel; and
- a weatherproofing collar sized for being disposed about a portion of the main barrel.

14. A female fiber optic connector having a connection port for receiving a mating fiber optic plug, comprising:
- a ferrule comprising one or more bores for receiving one or more optical fibers;
- an inner barrel comprising an inner barrel rear end and an inner barrel front end with an inner barrel passageway extending from the inner barrel rear end to the inner barrel front end, wherein the inner barrel rear end comprises an inner barrel rear end opening sized for receiving the ferrule;
- a main barrel comprising a main barrel rear end and a main barrel front end with a main barrel passageway extending from the main barrel rear end to the main barrel front end, wherein the main barrel rear end comprises a main barrel rear end opening sized for receiving the inner barrel and the main barrel front end comprises a connection port opening; and
- a rocker latch arm comprising a pivot suitable for pivoting the rocker latch arm relative to the main barrel.

15. The female fiber optic connector of claim 14, further comprising a rear spring push suitable for attaching to the main barrel.

16. The female fiber optic connector of claim 14, wherein the rocker latch arm comprises a portion that protrudes into the connection port when in a retain position.

17. The female fiber optic connector of claim 14, further comprising a spring for biasing the inner barrel to a forward position.

18. The female fiber optic connector of claim 17, the rear spring push comprising a cable strain relief portion.

19. The female fiber optic connector of claim 14, further comprising a weatherproofing collar sized for being disposed about a portion of the main barrel.

20. The female fiber optic connector of claim 19, wherein one or more ends of the weatherproofing collar (80) comprise an integrally-formed sealing portion (80SL).

21. The female fiber optic connector of claim 14, wherein a portion of the one or more resilient members is disposed between the inner barrel and the rocker latch arm.

22. The female fiber optic connector of claim 14, further comprising one or more resilient members for biasing the rocker latch arm to a retain position.

23. The female fiber optic connector claim 22, wherein a portion of the one or more resilient member cooperates with a rear end of the rocker latch arm.

24. The female fiber optic connector of claim 22, wherein the one or more resilient members comprising a coil spring, a leaf spring, a wave spring, or a torsional spring.

25. The female fiber optic connector of claim 22, wherein the one or more resilient members is a coil spring.

26. The female fiber optic connector of claim 22, wherein the one or more resilient members are a first coil spring and a second coil spring.

27. The female fiber optic connector of claim 22, wherein the one or more resilient members provide a downward retention force for maintaining the rocker latch arm in the retain position between 5 Newtons and 15 Newtons (N).

28. The female fiber optic cable assembly of claim 14, wherein the main barrel comprises one or more windows.

29. The female fiber optic connector of claim 14, wherein the main barrel comprises a recess shaped for receiving a portion of the rocker latch arm.

30. The female fiber optic connector of claim 14, wherein an interface between the inner barrel and the main barrel comprises one or more clocking features for rotational alignment.

31. The female fiber optic connector of claim 14, the main barrel further comprising at least one slot sized for receiving a latch of the rocker latch arm.

32. The female fiber optic connector of claim 14, the ferrule is allowed limited movement between about 100-400 microns of movement in two degrees of freedom in the unmated state.

33. The female fiber optic connector of claim 14, the main barrel further comprising a keying feature.

34. The female fiber optic connector of claim 14, wherein the fiber optic connector is a portion of a cable assembly comprising a fiber optic cable having one or more optical fibers.

35. The female fiber optic connector of claim 34, wherein the fiber optic cable is secured to the spring push using a crimp band, adhesive, epoxy, or glue.

36. The female fiber optic connector of claim 34, wherein the fiber optic cable comprises one or more tensile yarns that are secured to the spring push.

37. The female fiber optic connector of claim 35, further comprising a plug disposed within the spring push.

38. The female fiber optic connector of claim 34, wherein an adhesive is used for securing the one or more optical fibers, one or more strength members and the fiber optic cable.

39. The female fiber optic connector of claim 34, wherein the fiber optic cable comprises a round cross-section or a non-round cross-section.

40. The female fiber optic connector of claim 14, further comprising one or more heat shrinks.

41. The female fiber optic connector of claim 14, further comprising a ferrule boot having a portion that fits within the ferrule.

42. The female fiber optic connector of claim 14, further comprising a connector boot.

43. A method of making a fiber optic cable assembly having a female fiber optic connector having a connection port, comprising:
attaching one or more optical fibers of a fiber optic cable to a ferrule;
inserting the ferrule into a passageway of an inner barrel, wherein the inner barrel comprises an inner barrel rear end and an inner barrel front end with an inner barrel passageway extending from the inner barrel rear end to the inner barrel front end, wherein the inner barrel rear end comprises an inner barrel rear end opening sized for receiving the ferrule;
placing the inner barrel within a main barrel, the main barrel comprising a main barrel rear end and a main barrel front end with a main barrel passageway extending from the main barrel rear end to the main barrel front end, wherein the main barrel rear end comprises a main barrel rear end opening sized for receiving the inner barrel and the main barrel front end comprises a connector port opening; and
attaching a rocker latch arm to the main barrel.

44. The method of claim 43, installing one or more resilient members for biasing the rocker latch arm to a retain position.

45. The method of claim 44, wherein the one or more resilient members are a first coil spring and a second coil spring.

46. The method of claim 44, wherein the one or more resilient members comprises a coil spring, a leaf spring, a wave spring, or a torsional spring.

47. The method of claim 43, placing a weatherproofing collar about a portion of the main barrel.

48. The method of claim 43, wherein the main barrel further comprises at least one slot sized for receiving a latch of the rocker latch arm.

49. The method of claim 43, wherein the main barrel comprises a recess shaped for receiving a portion of the rocker latch arm.

50. The method of claim 43, wherein attaching the rocker latch arm to the main barrel comprises using a retainer.

51. The method of claim 43, further comprising injecting an adhesive into the female connector for securing the fiber optic cable, one or more optical fibers and one or more strength members of the fiber optic cable.

* * * * *